(12) United States Patent
Mankin et al.

(10) Patent No.: US 7,546,571 B2
(45) Date of Patent: Jun. 9, 2009

(54) DISTRIBUTED ELECTRONIC DESIGN AUTOMATION ENVIRONMENT

(75) Inventors: Richard Mankin, Medway, MA (US); Henry Potts, Ft. Collins, CO (US); Reddy Tera, Milford, MA (US)

(73) Assignee: Mentor Graphics Corporation, Wilsonville, OR (US)

( * ) Notice: Subject to any disclaimer, the term of this patent is extended or adjusted under 35 U.S.C. 154(b) by 374 days.

(21) Appl. No.: 10/935,749

(22) Filed: Sep. 8, 2004

(65) Prior Publication Data

US 2006/0095882 A1 May 4, 2006

(51) Int. Cl.
*G06F 17/50* (2006.01)
*G06F 3/00* (2006.01)
*G06F 19/00* (2006.01)

(52) U.S. Cl. ............... 716/15; 716/1; 716/11; 715/748; 715/751; 700/96; 700/103; 700/110

(58) Field of Classification Search ............ 716/1, 716/5, 6, 11, 15, 21; 717/103; 715/511; 707/203; 705/34; 703/1; 700/96, 110; 365/1
See application file for complete search history.

(56) References Cited

U.S. PATENT DOCUMENTS

| | | | |
|---|---|---|---|
| 5,107,443 A | 4/1992 | Smith | |
| 5,258,920 A | 11/1993 | Haller et al. | |
| 5,295,081 A | 3/1994 | Habra | |
| 5,333,312 A | 7/1994 | Wang | |
| 5,333,315 A | 7/1994 | Saether et al. | |
| 5,333,316 A | 7/1994 | Champagne et al. | |
| 5,392,400 A | 2/1995 | Berkowitz | |
| 5,452,218 A | * 9/1995 | Tucker et al. | ............... 700/110 |

(Continued)

FOREIGN PATENT DOCUMENTS

EP 0558006 9/1993

(Continued)

OTHER PUBLICATIONS

Printout of web page at <http://www.stella.co.jp/system/data.htm> and English language translation thereof; date of first publication unknown, but prior to Sep. 9, 2003; (2 pages).

(Continued)

*Primary Examiner*—Helen Rossoshek
(74) *Attorney, Agent, or Firm*—Banner & Witcoff, Ltd.

(57) ABSTRACT

PCB Logical design data is stored in a database according to a connectivity-based data model. Circuit functional blocks, inputs and outputs of functional blocks, and signals are stored as separate data structures. Those structures may be edited by users at separate clients during concurrent editing sessions. Profile data for each of multiple users specifies logical design data elements accessible by, and PCB design software to be provided to, that user. The PCB design software may be plug-ins executable within a web browser at a client, and the client computers may communicate with the database via the Internet. Layout data may also be stored in the database, with elements of the layout data mapped to elements of the logical design data. Constraint data may also be stored in the database, with elements of the constraint data being mapped to elements of the layout data.

6 Claims, 69 Drawing Sheets

U.S. PATENT DOCUMENTS

| | | |
|---|---|---|
| 5,544,067 A | 8/1996 | Rostoker et al. |
| 5,555,388 A | 9/1996 | Shaughnessy |
| 5,583,993 A | 12/1996 | Foster et al. |
| 5,604,680 A | 2/1997 | Bamji et al. |
| 5,745,747 A | 4/1998 | Chang et al. |
| 5,806,058 A | 9/1998 | Mori et al. |
| 5,809,240 A | 9/1998 | Kumagai |
| 5,826,265 A | 10/1998 | Van Huben et al. |
| 5,892,900 A | 4/1999 | Ginter et al. |
| 5,950,201 A | 9/1999 | Van Huben et al. |
| 5,966,707 A | 10/1999 | Van Huben et al. |
| 5,983,277 A | 11/1999 | Heile et al. |
| 6,023,565 A | 2/2000 | Lawman et al. |
| 6,026,230 A | 2/2000 | Lin et al. |
| 6,094,654 A | 7/2000 | Van Huben et al. |
| 6,094,658 A | 7/2000 | Araki |
| 6,110,213 A * | 8/2000 | Vinciarelli et al. ............. 703/1 |
| 6,110,223 A | 8/2000 | Southgate et al. |
| 6,134,705 A | 10/2000 | Pedersen et al. |
| 6,182,115 B1 | 1/2001 | Cuomo et al. |
| 6,240,414 B1 | 5/2001 | Beizer et al. |
| 6,289,254 B1 * | 9/2001 | Shimizu et al. ............... 700/96 |
| 6,327,594 B1 | 12/2001 | Van Huben et al. |
| 6,356,796 B1 | 3/2002 | Spruiell et al. |
| 6,424,959 B1 | 7/2002 | Bennett, III et al. |
| 6,442,570 B1 | 8/2002 | Wu |
| 6,484,177 B1 | 11/2002 | Van Huben et al. |
| 6,530,065 B1 | 3/2003 | McDonald et al. |
| 6,578,174 B2 | 6/2003 | Zizzo |
| 6,594,799 B1 | 7/2003 | Robertson et al. |
| 6,654,747 B1 | 11/2003 | Van Huben et al. |
| 6,671,699 B1 | 12/2003 | Black et al. |
| 6,678,871 B2 * | 1/2004 | Takeyama et al. ............. 716/6 |
| 6,678,876 B2 | 1/2004 | Stevens et al. |
| 6,678,877 B1 | 1/2004 | Perry et al. |
| 6,687,710 B1 | 2/2004 | Dey |
| 6,708,313 B2 * | 3/2004 | Pfeil et al. ..................... 716/1 |
| 6,711,718 B2 * | 3/2004 | Pfeil et al. ..................... 716/1 |
| 6,721,922 B1 | 4/2004 | Walters et al. |
| 6,751,781 B2 | 6/2004 | Lin et al. |
| 6,782,511 B1 | 8/2004 | Frank et al. |
| 6,851,094 B1 * | 2/2005 | Robertson et al. ............. 716/1 |
| 6,851,100 B1 * | 2/2005 | You et al. ..................... 716/11 |
| 6,931,369 B1 | 8/2005 | Perry et al. |
| 6,983,232 B2 * | 1/2006 | Nguyen et al. ................. 703/7 |
| 6,983,434 B1 * | 1/2006 | Frank et al. .................... 716/5 |
| 7,024,433 B2 * | 4/2006 | Arai et al. .................. 707/203 |
| 7,036,101 B2 | 4/2006 | He et al. |
| 7,039,892 B2 | 5/2006 | Mantey et al. |
| 7,103,434 B2 * | 9/2006 | Chernyak et al. ............. 700/98 |
| 7,134,096 B2 * | 11/2006 | Brathwaite et al. ............. 716/1 |
| 7,143,134 B2 | 11/2006 | Petrie et al. |
| 7,143,341 B1 * | 11/2006 | Kohli ......................... 715/511 |
| 7,219,311 B2 | 5/2007 | Koga et al. |
| 7,240,309 B2 | 7/2007 | Saito et al. |
| 7,246,055 B1 | 7/2007 | Singh |
| 7,305,648 B2 * | 12/2007 | Petunin et al. ................. 716/15 |
| 7,337,093 B2 | 2/2008 | Ramani et al. |
| 2002/0059054 A1 | 5/2002 | Bade |
| 2002/0069220 A1 | 6/2002 | Tran |
| 2002/0120858 A1 | 8/2002 | Porter et al. |
| 2002/0144212 A1 | 10/2002 | Lev et al. |
| 2002/0188910 A1 * | 12/2002 | Zizzo ............................ 716/1 |
| 2003/0009727 A1 * | 1/2003 | Takeyama et al. ............. 716/1 |
| 2003/0101425 A1 | 5/2003 | Makinen |
| 2003/0131332 A1 | 7/2003 | Pfeil et al. |
| 2004/0093397 A1 | 5/2004 | Chiroglazov et al. |
| 2004/0199891 A1 | 10/2004 | Bentley et al. |
| 2004/0210854 A1 | 10/2004 | Pfeil et al. |
| 2004/0225988 A1 | 11/2004 | Petunin et al. |
| 2004/0268283 A1 | 12/2004 | Perry et al. |
| 2005/0044518 A1 * | 2/2005 | Petunin et al. ................. 716/11 |
| 2005/0080502 A1 | 4/2005 | Chernyak |
| 2005/0108663 A1 | 5/2005 | Bentley et al. |
| 2005/0114821 A1 | 5/2005 | Petunin et al. |
| 2005/0114865 A1 | 5/2005 | Petunin |
| 2005/0125763 A1 * | 6/2005 | Lin et al. ...................... 716/21 |
| 2005/0131783 A1 * | 6/2005 | Jin .............................. 705/34 |
| 2005/0160396 A1 * | 7/2005 | Chadzynski ................. 717/103 |
| 2005/0237776 A1 * | 10/2005 | Gropper et al. ................ 365/1 |
| 2005/0246672 A1 * | 11/2005 | Bois et al. ..................... 716/5 |
| 2006/0101368 A1 * | 5/2006 | Kesarwani et al. ............. 716/11 |
| 2008/0034342 A1 * | 2/2008 | Petunin et al. ................. 716/15 |
| 2008/0059932 A1 * | 3/2008 | Pfeil et al. ..................... 716/11 |

FOREIGN PATENT DOCUMENTS

| | | |
|---|---|---|
| EP | 750267 | 6/1995 |
| JP | 02-048774 | 2/1990 |
| JP | 02-056070 | 2/1990 |
| JP | 02-245865 | 10/1990 |
| JP | 04-068470 | 3/1992 |
| JP | 04-362783 | 12/1992 |
| JP | 05-073630 | 3/1993 |
| JP | 0574942 | 3/1993 |
| JP | 05-242174 | 9/1993 |
| JP | 06203108 | 7/1994 |
| JP | 07175842 | 7/1995 |
| JP | 08-235233 | 9/1996 |
| JP | 0962726 | 3/1997 |
| JP | 09-212530 | 8/1997 |
| JP | 09-288690 | 11/1997 |
| JP | 10-105586 | 4/1998 |
| JP | 10307855 | 11/1998 |
| JP | 11-288428 | 10/1999 |
| JP | 2003-186914 | 7/2003 |
| WO | 03050751 | 5/2003 |
| WO | WO 03/050726 | 6/2003 |
| WO | 03088095 | 10/2003 |

OTHER PUBLICATIONS

Printout of web page at <http://www.stella.co.jp/system/faq.htm> and English language translation thereof; date of first publication unknown, but prior to Nov. 18, 2003; (5 pages).

Printout of web page at <http://www.stella.co.jp/system/multi.htm> and English language translation thereof; date of first publication unknown, but prior to Sep. 9, 2003; (2 pages).

Printout of web page at <http://www.stella.co.jp/system/option.htm> and English language translation thereof; date of first publication unknown, but prior to Sep. 9, 2003; (2 pages).

Printout of web page at <http://www.stella.co.jp/system/pcb_cad.htm> and English language translation thereof; date of first publication unknown, but prior to Sep. 9, 2003; (2 pages).

Printout of web page at <http://www.stella.co.jp/system/print.htm> and English language translation thereof; date of first publication unknown, but prior to Sep. 9, 2003; (3 pages).

Printout of web page at <http:///www.stella.co.jp/system/stella_station.htm> and English language translation thereof; date of first publication unknown, but prior to Nov. 18, 2003; (3 pages).

Printout of web page at <http://www.stella.co.jp/system/system.htm> and English language translation thereof; date of first publication unknown, but prior to Sep. 9, 2003; (2 pages).

English language translation of web page formerly available at <http://www.ydc.co.jp/cad/epsilon/productC3Design/>; date of first publication unknown, but prior to Feb. 17, 2004; (6 pages).

U.S. Appl. No. 60/341,037, filed Jun. 19, 2003.

Michael K.W. Wu et al., Development of an Integrated CAD Tool for Switching Power Supply Design with EMC Performance Evaluation, IEEE Transactions on Industry Applications, vol. 34, No. 2 pp. pp. 364-373, Mar.-Apr. 1998.

Geppert, L. "IC Design on the World Wide Web", IEEE Spectrum. Oct. 2001. pp. 31-36.

CAD Framework Initiative, Inc., Printed from http://www.si2.org on Jun. 23, 2004 (date of first publication unknown).

"Version Management with CVS for CVS 1.12.9", Chapter 10: Multiple Developers, retrieved from the Internet: <http://ftp.gnu.org/non-gnu/cvs/source/feature/1.12.9/cederqvist-1.12.9.p> retrieved on Jan. 24, 2005; pp. 65-74.

Supplemental EP Search Report of EP 02797245 dated Dec. 15, 2006.

English translation of document titled "Exhibits and other documents" submitted Sep. 29, 2006 in Japanese Patent Application No. 2003-551734, pp. 1-5.

English Language Translation of Publication submission of Japanese Patent Application No. 2003-551734 dated Oct. 25, 2006.

English Language Translation of Japanese Kokai Patent Application No. Hei 5[1993]-242174 published Sep. 21, 1993 (filing No. Hei 4[1992]-41727).

English Language Translation of Japanese Kokai Patent Application No. Hei 11[1999]-288428, published Oct. 19, 1999 (filing No. Hei 10[1998]-91372).

English Language Translation of Japanese Kokai Patent Application No. Hei 9[1997]-288690, published Nov. 4, 1997 (filing No. Hei 8[1996]-122462).

English Language Translation of Japanese Kokai Patent Application No. Hei 2[1990]-245865, published Mar. 20, 1989 (filing No. Hei 1[1989]-65906).

English Language Translation of Japanese Public Patent Disclosure Bulletin No. 10105586, dated Apr. 24, 1998 (application 8-25457).

English Language Translation of Japanese Kokai Patent Application No. Hei 4[1992]-362783, published Dec. 15, 1992 (filing No. Hei 3[1991]-137766).

English Language Translation of Japanese Kokai Patent Application No. Hei 9[1997]-212530, published Aug. 15, 1997 (filing No. Hei 8[1996]-17325).

English Language Translation of Japanese Kokai Patent Application No. Hei 5[1993]-073630, published Mar. 6, 1993 (filing No. Hei 3[1991]-233515).

English Language Translation of Japanese Public Patent Disclosure Bulletin No. 08235233, dated Sep. 13, 1996 (application No. 7-38249).

English Language Translation of Japanese Kokai Patent Application No. Hei 2[1990]-056070, published Aug. 20, 1988 (filing No. Sho 63[1998]-205677).

English Language Translation of Japanese Kokai Patent Application No. Hei 7[1995]-175842 published Jul. 14, 1995 (filing No. Hei 5[1993]-345183).

English Language Translation of Japanese Kokai Patent Application No. Hei 4[1992]-293169 published Oct. 16, 1992 (filing No. Hei 3[1991]-57351).

English Language Translation of Japanese Public Patent Disclosure Bulletin No. 0696160, dated Apr. 8, 1994 (application No. 04244646).

English Language Translation of Japanese Public Patent Disclosure Bulletin No. 06203108, dated Jul. 22, 1994 (application No. 5-154).

English Translation of Toshio Hoshi, "e-PAL 2000" Printed Circuit Board CAD/CAM System, Denshi Zairyo [Electronic Parts and Materials], Oct. 2001, pp. 153-156 (Japanese original included).

English Translation of Yoshiki Koyanagi: Stella Station Multi CAD/CAM System for the Next Generation of Printed Circuit Boards, Denshi Zairyo [Electronic Parts and Materials], Oct. 2000, pp. 96-101 (Japanese original included).

English translation of Japanese Kokai Patent Application No. Hei 7 [1995]—98726, published Apr. 11, 1995 (filing No. Hei 5[1993]-311532), pp. 6-37.

English translation of Japanese Kokai Patent Application No. Hei 4[1992]-68470, published Mar. 4, 1992 (filing No. Hei 2[1990]-180448).

English translation of Japanese Kokai Patent Application No. Hei 5[1993]-74942, published Mar. 26, 1993 (filing No. Hei 3[1991]-259923).

English translation of Japanese Kokai Patent Application No. Hei 10[1998]-307855, published Nov. 17, 1998 (filing No. Hei 9[1997]-118134).

Translation of Japanese Patent Application No. Hei 2[1990]-48774, published Feb. 19, 1990 (filing No. Sho 63 [1988]-199358).

English language translation of Japanese Public Patent Disclosure Bulletin No. 9-62726, dated Mar. 7, 1997 (application 7-220142).

Horn, I., et al., "Estimation of the Number of routing Layers and Total Wirelength in a PCT Through Wiring Distribution Analysis", Design Automation Conference, 1996 Proceedings EURO-DAC '06, Sep. 16-20, 1996, pp. 31-315.

EP Search Report for EP02795797 dated Oct. 20, 2006.

Printout of web page at <http:///www.stella.co.jp/system/stella_station.htm> and English language translation thereof; date of first publication unknown, but prior to Nov. 18, 2003; (3 pages).

International Search Report of PCT/US02/39347 dated Mar. 27, 2003.

International Search Report of PCT/US02/39394 dated Jun. 19, 2003.

Translation of an Office Action for JP2003551712 dated Aug. 21, 2006.

Translation of an Office Action for JP2003551734 dated Aug. 21, 2006.

Hardwick, M., et al., "Using a Relational Database as an Index to a Distributed Object Database in Engineering Design Systems", IEEE, Oct. 16, 1989, pp. 4-11.

Anupam, V., et al., "Collaborative Multimedia Scientific Design in SHASTRA", 1993, pp. 1-12.

Anupam V., et al., "SHASTRA: Multimedia Collaborative Design Environment," IEEE Multimedia, vol. 1, No. 2, Jun. 21, 1994, pp. 39-49.

Anupam V., et al., "SHASTRA An Architecture for Development of Collaborative Applications", Enabling Technologies: Infrastructure for Collaborative Enterprises, Apr. 20-22, 1993, pp. 155-156.

Honghai, Shen, et al., "Access Control for Collaborative Environments", Oct. 31, 1992, pp. 51-58.

N. Shyamsundar, et al., "Internet-based Collaborative Product Design with Assembly Features and Virtual Design Spaces", Jun. 5, 2001, pp. 637-651.

English translation of an Office Action for JP2003551712 dated May 29, 2007.

Mar. 14, 2008 Official Communication in European Patent Application 02 797 245 (6 pages).

Mar. 25, 2008 Third Party Submission in European Patent Application 02 797 245, with attachments (44 pages).

Translation of Jan. 8, 2008 Decision of Refusal in Japanese Patent Application 2003-551734 (3 pages).

May 30, 2007 Office Action in European Patent Application 02 797 245 (6 pages).

Translation of May 29, 2007 Office Action in Japanese Patent Application 2003-551734 (3 pages).

International Preliminary Report on patentability for PCT/US2006/035374 dated Mar. 18, 2008.

Supplementary European Search Report for EP 02 795 797 dated Jul. 3, 2007.

May 14, 2007 Letter supplementing the Search Report and the Supplementary Party European Search Report dated Oct. 20, 2006.

Feb. 6, 2008 Office Action in EP 02 795 797.6 (3 pages).

English translation of Mar. 8, 2006, submission by undisclosed third party in Japanese Patent Application 2003-551734 (2 pages).

English translation of Mar. 8, 2006, submission by undisclosed third party in Japanese Patent Application 2003-551712 (2 pages).

English translation of Mar. 29, 2007, submission by undisclosed third party in Japanese Patent Application 2003-551734 (7 pages).

English translation of Oct. 25, 2007, submission by undisclosed third party in Japanese Patent Application 2003-551734 (4 pages).

English translation of Sep. 29, 2006, submission by undisclosed third party in Japanese Patent Application 2003-551712 (15 pages).

English translation of Apr. 4, 2007, submission by undisclosed third party in Japanese Patent Application 2003-551734 (9 pages).

English translation of Oct. 25, 2007, submission by undisclosed third party in Japanese Patent Application 2003-551712 (4 pages).

Konduri, et al., "A Framework for Collaborative Design and Distributed Web-Based Design", 1999, pp. 898-903.

Konduri, et al., "Vela Project on Collaborative Distributed Design: New Client/Server Implementations", May 6, 1999, pp. 1-8.

Datasheet for "Allegro PCB Design 220", by Cadence; Mar. 9, 2004, 8 pages.

Saha, et al., "Web-Based Distributed VLSI Design", MIT, published Jan. 4-7, 1998, pp. 449-454.

"Vela Project—Globally Distributed Microsystem Design" by CBL, Jun. 1998, 23 pages.

Google™ Search bearing date of Apr. 28, 2008; provided by examiner of U.S. Appl. No. 10/960,793.

* cited by examiner

PROJECTS

| Name | Cell | Cell | ... |
|---|---|---|---|
| ... | ... | ... | ... |
| Board 1 | E | F | - |
| ... | ... | ... | ... |

FIG. 3A

CELLS

| Name | Contained Cell | Contained Cell | ... | Port | Port | Port | Port | Port | Port | Port | ... |
|---|---|---|---|---|---|---|---|---|---|---|---|
| ... | ... | ... | ... | ... | ... | ... | ... | ... | ... | ... | ... |
| E | A | B | - | E_1 | E_2 | E_3 | E_4 | E_5 | - | - | - |
| F | C | D | - | F_1 | F_2 | F_3 | F_4 | F_5 | F_6 | - | - |
| ... | ... | ... | ... | ... | ... | ... | ... | ... | ... | ... | ... |
| A | - | - | - | A_1 | A_2 | A_3 | A_4 | - | - | - | - |
| B | - | - | - | B_1 | B_2 | B_3 | B_4 | - | - | - | - |
| C | - | - | - | C_1 | C_2 | C_3 | - | - | - | - | - |
| D | - | - | - | D_1 | D_2 | D_3 | D_4 | D_5 | - | - | - |
| ... | ... | ... | ... | ... | ... | ... | ... | ... | ... | ... | ... |

FIG. 3B

PORTS

| Name | Cell | Net | Net |
|---|---|---|---|
| ... | ... | ... | ... |
| A_1 | A | E_a | - |
| A_2 | A | E_b | - |
| A_3 | A | E_c | - |
| A_4 | A | E_d | - |
| B_1 | B | E_a | - |
| B_2 | B | E_d | - |
| B_3 | B | E_e | - |
| B_4 | B | E_f | - |
| C_1 | C | F_a | - |
| C_2 | C | F_b | - |
| C_3 | C | F_g | - |
| D_1 | D | F_g | - |
| D_2 | D | F_c | - |
| D_3 | D | F_d | - |
| D_4 | D | F_e | - |
| D_5 | D | F_f | - |
| E_1 | E | Clock | E_a |
| E_2 | E | Data1 | E_b |
| E_3 | E | Net11 | E_c |
| E_4 | E | Net13 | E_e |
| E_5 | E | Net14 | E_f |
| F_1 | F | Data2 | F_b |
| F_2 | F | Data3 | F_c |
| F_3 | F | Data4 | F_d |
| F_4 | F | Data5 | F_e |
| F_5 | F | Net12 | F_f |
| F_6 | F | Net11 | F_a |
| ... | ... | ... | ... |

FIG. 3C

NETS

| Name | Port | Port | Port | ... |
|---|---|---|---|---|
| ... | ... | ... | ... | ... |
| Clock | E_1 | ... | ... | ... |
| Data1 | E_2 | ... | ... | ... |
| Data2 | F_1 | ... | ... | ... |
| Data3 | F_2 | ... | ... | ... |
| Data4 | F_3 | ... | ... | ... |
| Data5 | F_4 | ... | ... | ... |
| ... | ... | ... | ... | ... |
| Net11 | E_3 | F_6 | - | - |
| Net12 | F_5 | ... | ... | ... |
| Net13 | E_4 | ... | ... | ... |
| Net14 | E_5 | ... | ... | ... |
| ... | ... | ... | ... | ... |
| E_a | E_1 | A_1 | B_1 | ... |
| E_b | E_2 | A_2 | | ... |
| E_c | E_3 | A_3 | - | ... |
| E_d | A_4 | B_2 | - | ... |
| E_e | E_4 | B_3 | - | ... |
| E_f | E_5 | B_4 | - | ... |
| F_a | F_6 | C_1 | - | ... |
| F_b | F_1 | C_2 | - | ... |
| F_c | F_2 | D_2 | - | ... |
| F_d | F_3 | D_3 | - | ... |
| F_e | F_4 | D_4 | - | ... |
| F_f | F_5 | D_5 | - | ... |
| F_g | C_3 | D_1 | - | ... |
| ... | ... | ... | ... | ... |

FIG. 3D

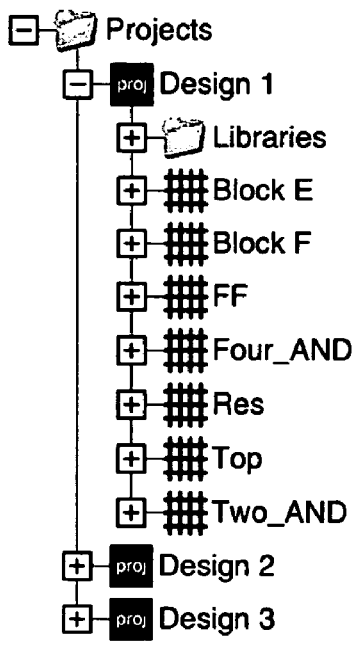

```
□─📁 Projects
      □─[proj] Design 1
              ⊞─📁 Libraries
              ⊞─▦ Block E
              ⊞─▦ Block F
              ⊞─▦ FF
              ⊞─▦ Four_AND
              ⊞─▦ Res
              ⊞─▦ Top
              ⊞─▦ Two_AND
      ⊞─[proj] Design 2
      ⊞─[proj] Design 3
```

Key

▦    Cell object

⊡    CellInstance object (intermediate level in hierarchy branch)

⊳    CellInstance object (lowest level in hierarchy branch)

🔧    Configuration object

📚    Library object

⌐E    Net object o│o    Port or PortInstance object

[proj]    Project object

🔒    Representation object

📜    Script

FIG. 6A

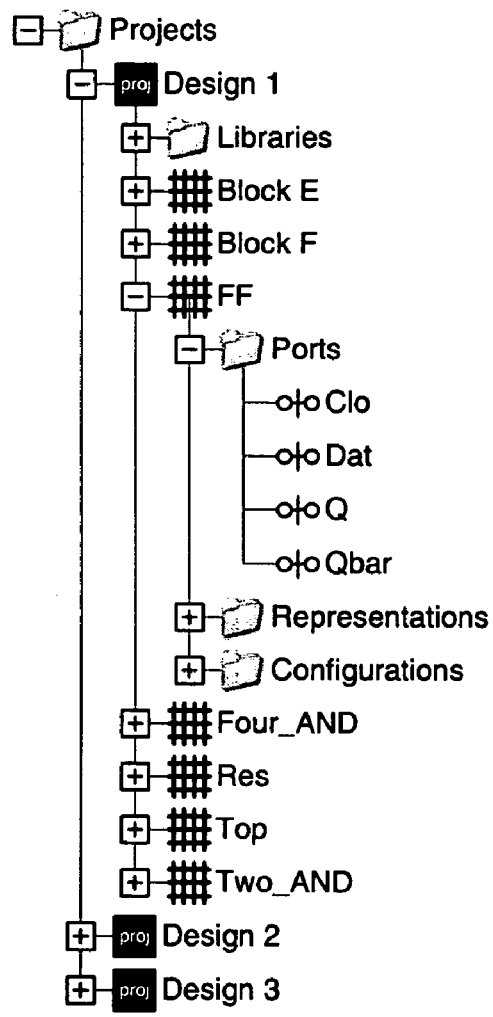
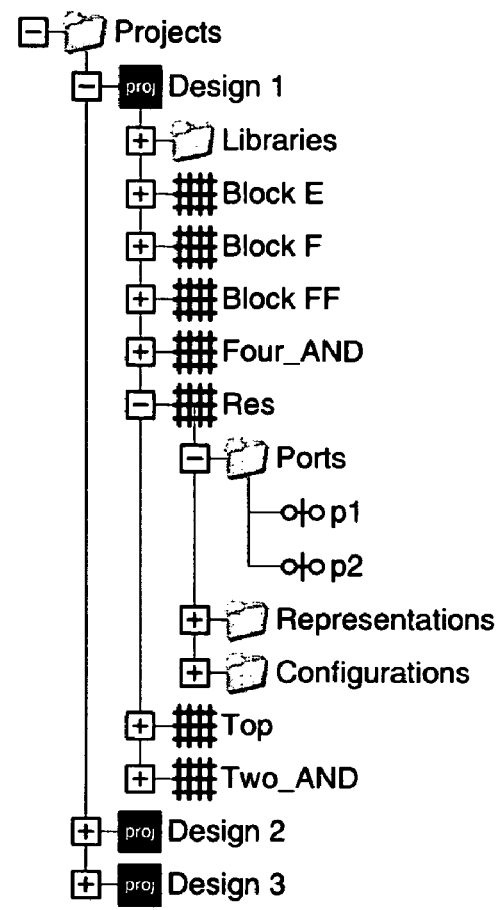
FIG. 6B
FIG. 6C

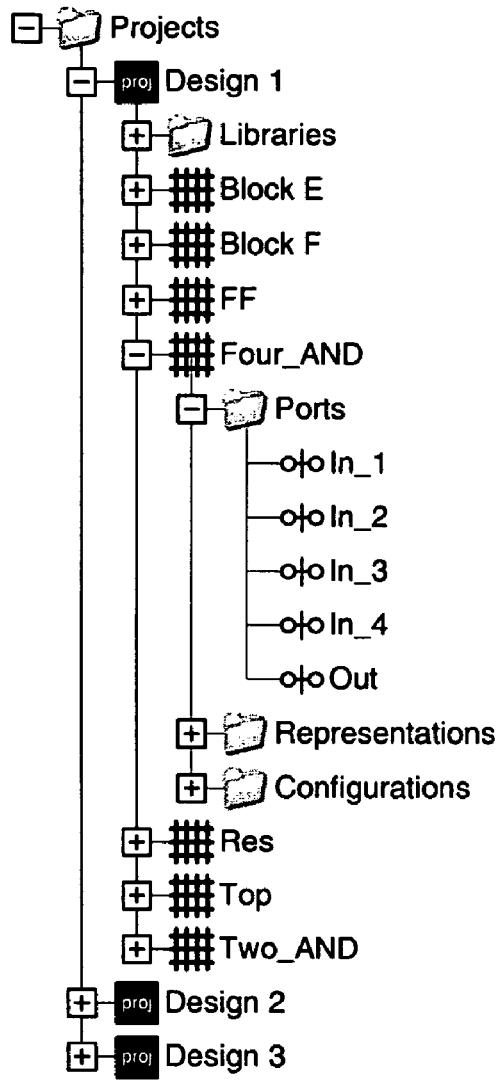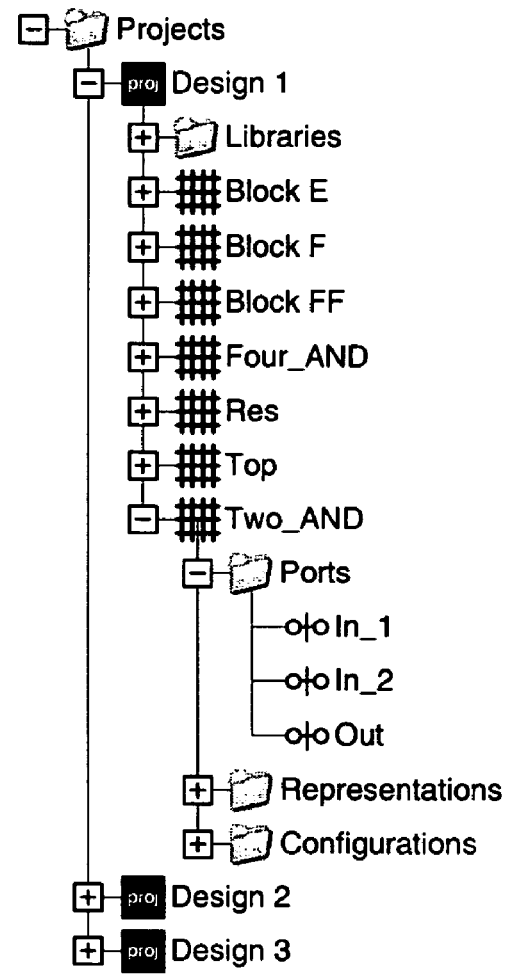
FIG. 6D
FIG. 6E

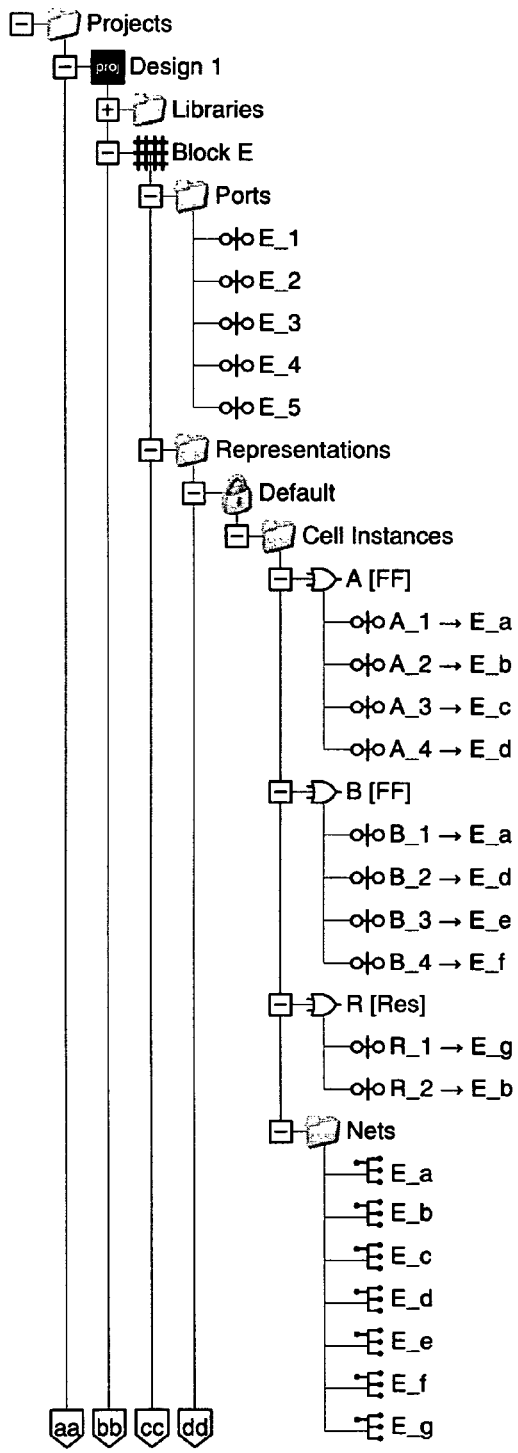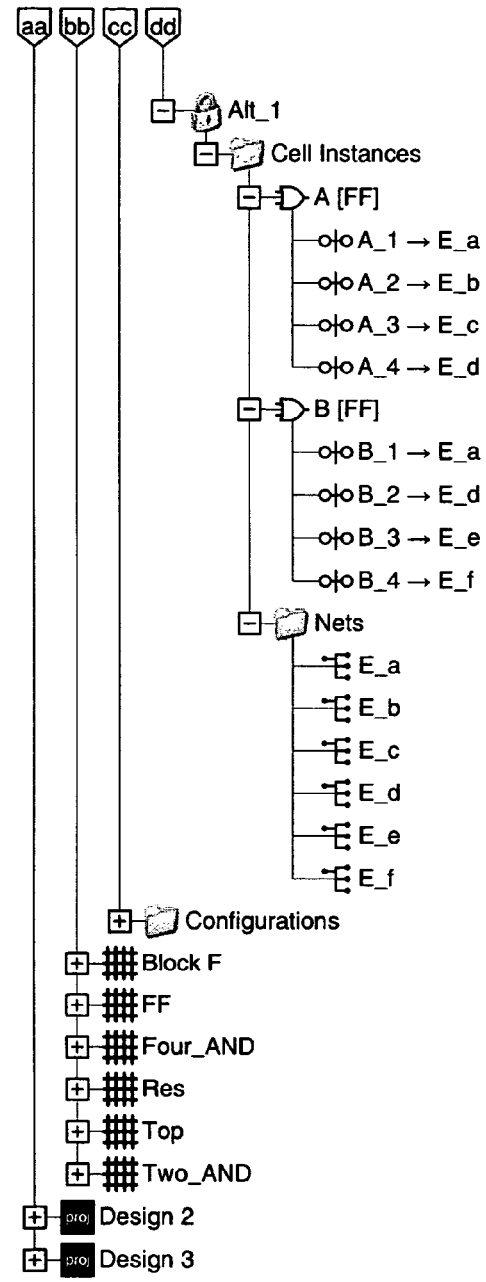
FIG. 6F
FIG. 6G

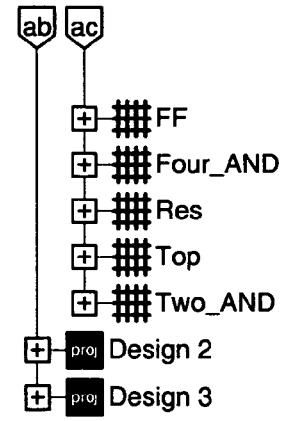
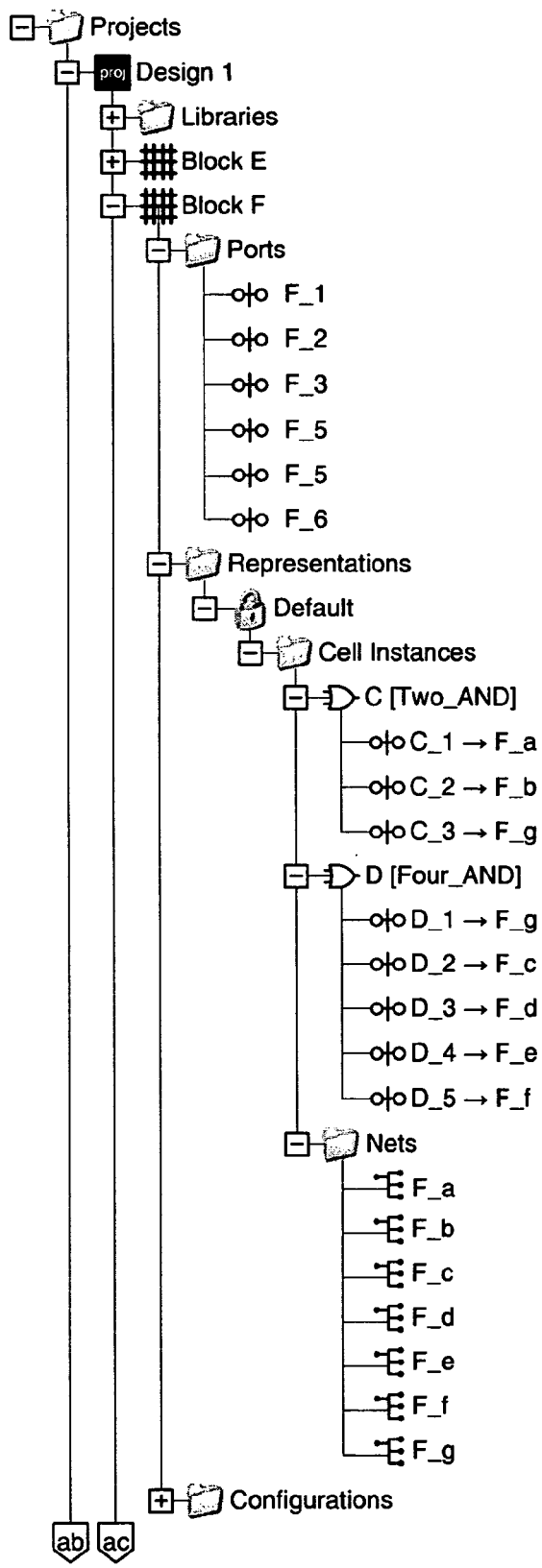
FIG. 6I
FIG. 6H

To: User Z
Sent: 10/01/04
Subj.: Change Request 12345-abcde-67890-fghij-uudu2ye72dh Following change request needs your approval:

Change Request ID: 12345-abcde-67890-fghij-uudu2ye72dh

Requested By: User X

List of approvers:

List of approvers:
   User Y
   User Z

List of changes:
   <change description>
   <change description>
   <change description>

Do you approve these changes? YES

Click here if you want to see all the change requests.

FIG. 13C

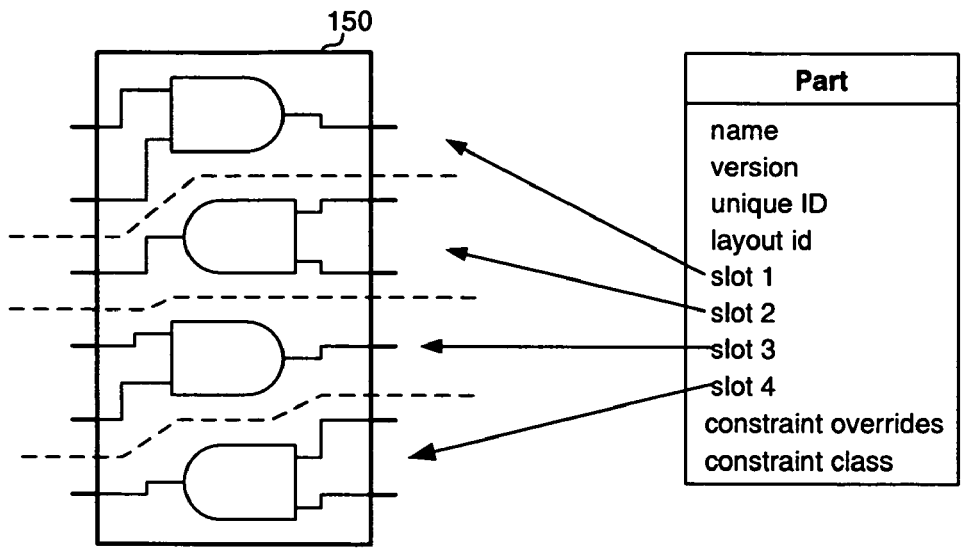
FIG. 16
FIG. 17
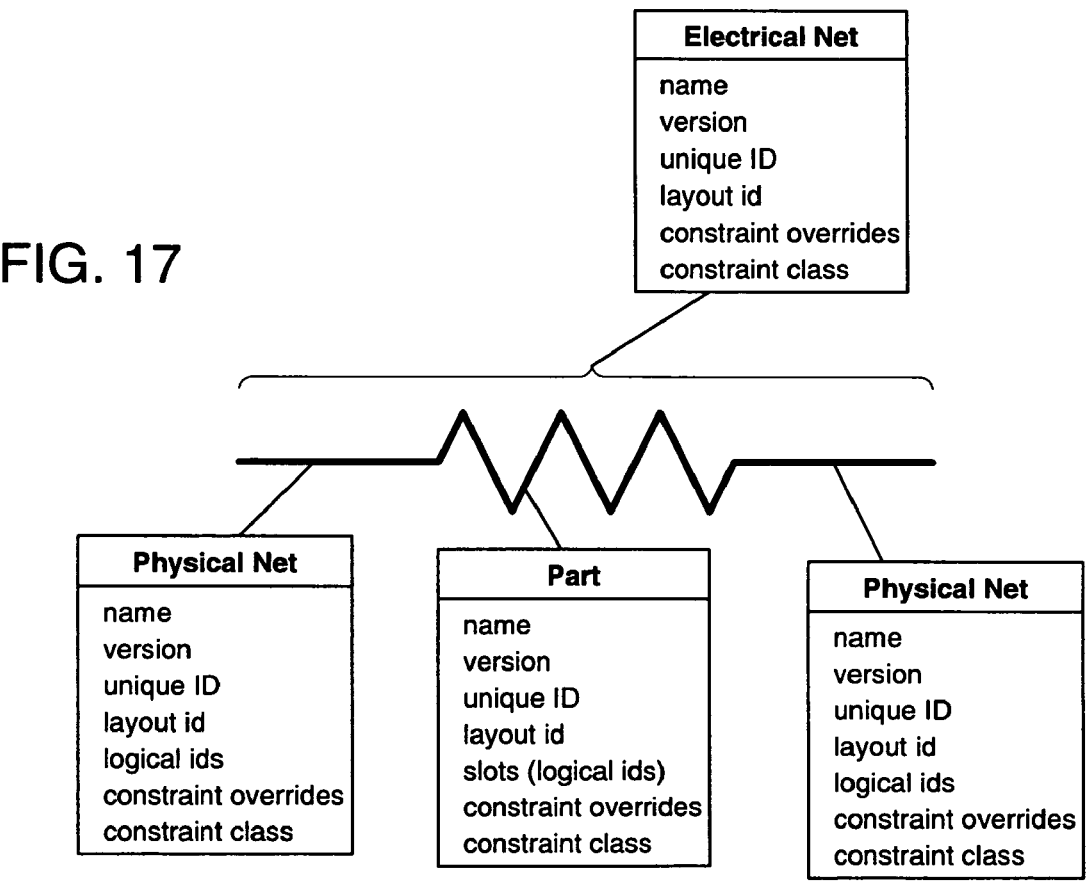

DISTRIBUTED ELECTRONIC DESIGN AUTOMATION ENVIRONMENT

COPYRIGHT NOTICE

A portion of the disclosure of this patent document may contain material which is subject to copyright protection. To the extent that it does, the copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2004, Mentor Graphics Corp., All Rights Reserved.

FIELD OF THE INVENTION

This invention relates to the field of electronic design automation tools, and more specifically, to concurrent design activities distributed among multiple users.

BACKGROUND OF THE INVENTION

As used throughout this specification and claims, a "design" for an electronic device generally refers to information needed to construct that device. As can be appreciated from this broad definition, an electronic design has numerous aspects. Logical aspects of a design (sometimes known as a logical design or the "front end" design) include the identification of various functional elements. These functional elements may be specific electronic components (e.g., particular microprocessors, memory chips, and other components). These functional elements may also be more generic (e.g., an AND gate, an OR gate, a multiplexer, a resistor or capacitor having a certain resistance or capacitance value, etc.). The logical aspects of a design also include interconnections between inputs and outputs of these functional elements. Physical aspects of a design (also known as the "layout" or the "back end" design) include the actual size and location of various physical components associated with logical design elements. Notably, there is not necessarily a one-to-one correspondence between logical and physical elements. For example, a logical design element such as a gate must be implemented as an actual physical component. However, available chips and other physical components may have multiple "slots," each of which contains a separate gate or other element having its own input and output pins. A single physical component may thus correspond to multiple logical elements. There are numerous other logical and physical design elements. In many cases, a particular element in the logical domain will have no directly corresponding element in the physical domain, and vice versa.

Traditionally, the schematic diagram has been the basis for electronic design. More specifically, front end designers often record the various functional elements of the logical design and the necessary interconnections on one or more graphical schematic diagrams. After completing the logical design, the front end designers then provide one or more sheets of schematic diagrams to the back end designers. The front end designers might also include a netlist (i.e., a list of all signals in the logical design and the logical elements connected to each signal) and information regarding constraints (e.g., restrictions on the manner in which components and nets can be placed and/or connected). The netlist is typically a separate document (or computer file), and the constraint information might be annotated onto the schematic or provided as a separate document. Using this front end information, the back end designers determine the actual placement of physical components on one or more circuit boards and route the physical connections (e.g., conductive circuit board traces) between the pins of those components. Frequently, the back end designers must also assign elements from the schematic to a particular physical component (e.g., assigning a gate to a slot of a chip). In some cases, the back end designer may add a physical component (e.g., a filter capacitor) to the layout design that is not represented on the schematics, or may make other types of changes that may implicitly affect the logical design.

This traditional approach to electronic design presents numerous problems. In the past, typical designs included numerous Small Scale Integration (SSI) and/or Medium Scale Integration (MSI) parts, and perhaps a few Large Scale Integration (LSI) parts. The SSI and MSI parts would typically have a limited number of pins, and the LSI parts might have on the order of 100 pins. With such designs, a schematic can be a useful representation. As designs have evolved, however, the schematic diagram has become less valuable. For example, current designs may include LSI or Very Large Scale Integration (VLSI) parts having up to thousands of pins. Such parts can be difficult or impossible represent on a single sheet of a schematic diagram. Drawing pieces of the same part on multiple drawing sheets can be tedious, and the resulting diagram is often confusing. Similarly, modern designs often have complex patterns of interconnections which run throughout the entire design, and must thus span numerous sheets of schematic diagrams. Following such interconnection patterns across multiple sheets is also tedious and confusing.

A schematic-driven design approach has numerous other shortcomings. Using traditional schematic-driven methods, front end and back end design are generally performed as serial processes with limited communication between the two. However, the complexity of electronic designs and market pressures to rapidly complete designs are continuing to increase. In such an environment, it is beneficial (and often necessary) for front and back end design tasks to be performed concurrently. In turn, this requires rapid (and sometimes frequent) exchange of design information between front and back ends. Existing methods inhibit such a rapid exchange, as entire design files (e.g., schematics, constraint data, net lists, etc.) must be transferred and then converted to an appropriate form. For example, a back end designer receiving an updated schematic must identify what symbols and/or interconnections have changed and then determine whether a part must be added, a trace added or re-routed, etc.

Traditional methods can also inhibit collaboration among multiple front-end designers. Separating a design project into manageably-sized portions and assigning those portions to different designers can be difficult. Moreover, managing design data as a collection of design data computer files limits the granularity with which design data can be "locked" to prevent conflicting edits by multiple users. File-based systems pose additional challenges for designers wishing to collaborate on a project. For example, a designer may often be unsure whether he or she has all of the files needed for a particular project. This also makes transfer of a design between designers a time-consuming process.

Traditional electronic design methods are increasingly less valuable in other ways. In addition to often having more LSI and VLSI parts, modern designs are becoming increasingly dense. In other words, designs must fit into increasingly smaller spaces. In turn, this requires printed circuit boards (PCBs) to have more and more layers. Modern designs also have increasing numbers of high speed signals. These factors make constraints upon the physical design more and more critical. Both front and back end designers must be able to track, access and/or modify these constraints. However, existing methods for constraint management become less useful as designs become more complex. Constraint data must often be synchronized among multiple users in real time, and waiting for an updated schematic (with revised constraint annotations) or a separate constraint document can require too much time. More important, lack of an automated system for synchronizing constraint data may result in a failure to effectively communicate constraint data between front and back ends.

Traditional design methods present other challenges for numerous persons working in parallel, particularly when those persons are in widely dispersed locations. For example, logical and/or layout design may be performed by teams of engineers working in different cities (or even in different countries). Various design tasks may be outsourced to other companies. Still other groups (e.g., manufacturing, purchasing) located in other locations may have need for the information contained in the layout and/or logical design data. Ensuring that all of these groups have the appropriate software needed to edit or view design data can impose significant administrative burdens. Yet a further complication arises when trying to limit the type of information accessible by certain groups. For example, purchasing department personnel may need access to design data when determining which parts to order, but do not need the ability to edit that design. As another example, it would be highly advantageous if a company could more easily assign a design task to an outside designer working for another company, provide that designer with the necessary software tools for the assigned task, and limit the designer's access to design data relevant to that task.

For these and numerous other reasons, there remains a need for improved systems and methods for electronic design automation.

SUMMARY OF THE INVENTION

In at least some embodiments of the invention, logical design data for a PCB is stored in a database. The design data is organized according to a connectivity-based data model. Also stored are profiles for multiple users. The profile data for each user specifies logical design data elements accessible by that user and PCB design software to be provided to that user for accessing or editing logical design data. In accordance with the stored profiles, elements of the logical design data and one or more PCB design software programs are transmitted to client computers. The PCB design software may include plug-ins executable within a web browser at a client. Logical design data edits are received from the clients and applied to the logical design data stored in the database.

Additional embodiments of the invention include storing PCB logical design data which is organized according to a connectivity-based data model. In some embodiments, circuit functional blocks, inputs and outputs of functional blocks, and signals are stored as separate data structures. Those separate data structures may be edited by users at separate clients during concurrent editing sessions conducted at said separate clients. Still further embodiments include scripted design data objects, each of the scripted design data objects including at least one data object and at least one associated script. An associated script is executable to automatically modify a data object.

In at least some embodiments, logical design data and layout data are stored in a database. Elements of the layout data are mapped to elements of the logical design data. Edits to logical design data are automatically mapped to layout design data. Constraint data may also be stored in the database, with elements of the constraint data being mapped to elements of the layout data.

Yet other embodiments of the invention include automated change requests. A request to edit one or more logical design data elements is received from a first of plural users. A change request message is then sent to others of the plural users. That message identifies the requested edit and offers the other users the ability to approve the requested edit. Upon receiving approvals from at least a portion of the users receiving the change request message, a database is automatically updated to include the requested edit. Still further embodiments include filtering notifications, received by a user, of logical design data edits by other users.

These and other features and advantages of the present invention will be readily apparent and fully understood from the following detailed description of preferred embodiments, taken in connection with the appended drawings.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-3D show an example of storing electronic design data using relational database tables.

FIGS. 13A-13C show user interfaces, according to at least some embodiments of the invention, related to change requests.

FIG. 16 is a diagram showing multiple slot fields of a Part object.

FIG. 17 is a diagram showing an Electrical Net object.

DETAILED DESCRIPTION OF THE PREFERRED EMBODIMENTS

Connectivity-Centric Data Model

Figure 1:
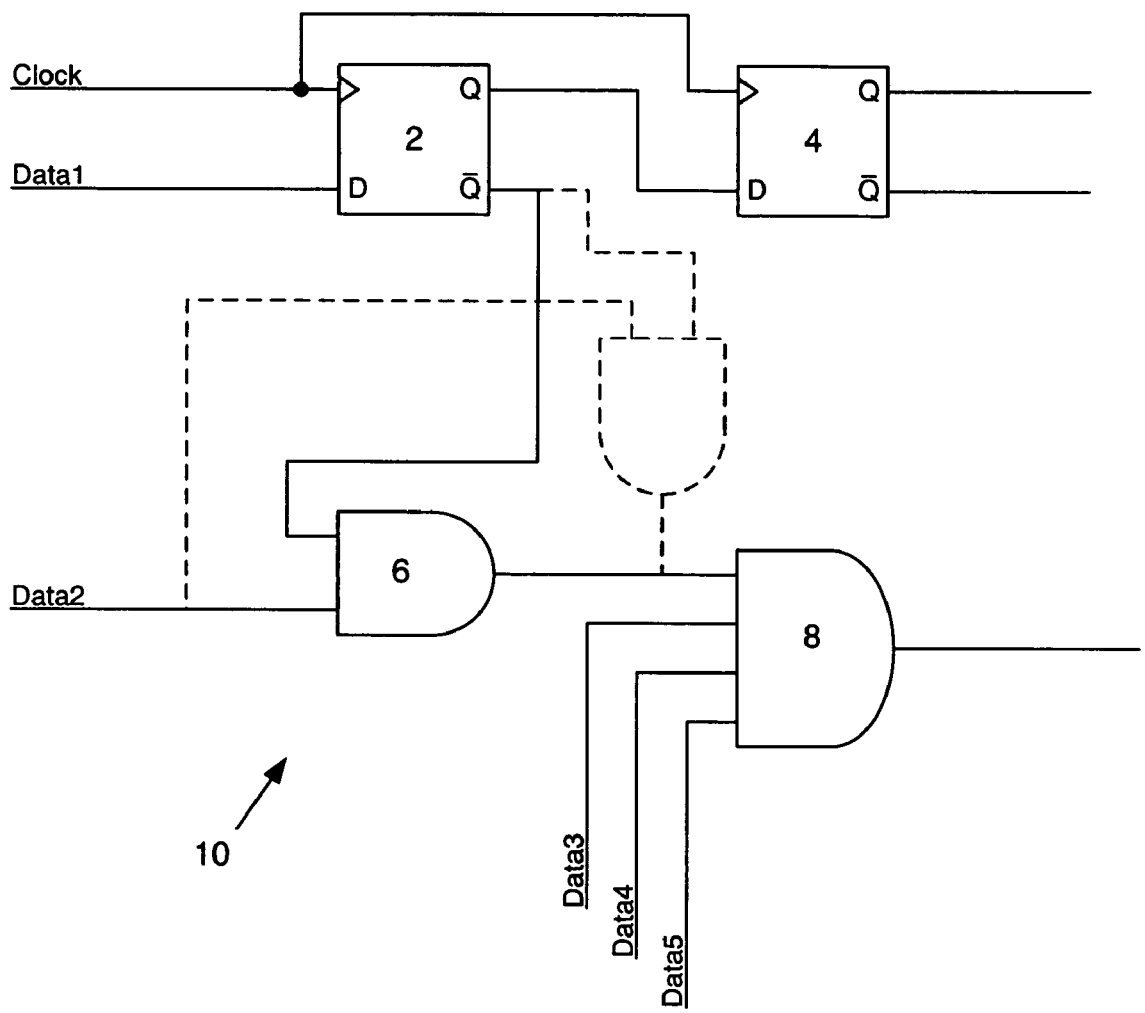
FIG. 1 is a schematic diagram for a hypothetical circuit used to illustrate at least some embodiments of the invention.

In many parts of the design process (in both the front and back ends), connectivity between circuit elements is more critical than a particular graphical representation of the circuit. FIG. 1, a schematic diagram for a portion of a hypothetical circuit 10, illustrates this point. Included in FIG. 1 are two flip-flops 2 and 4, an AND gate 6 and a four-way AND gate 8. Also shown in FIG. 1 are interconnections between inputs and outputs of these circuit elements, as well as connections to various signal lines (e.g., "Clock," "Data1," etc.) connected to other circuit elements not shown in FIG. 1. Although a schematic such as FIG. 1 may assist in visualizing signal flows and in understanding other aspects of a circuit design, the specific graphical form and arrangement of circuit element symbols is generally not critical to a front end designer. For example, the logical functionality of the circuit in FIG. 1 is unaffected if AND gate 6 is reoriented and moved to a different location (shown in dashed lines). A schematic diagram is similarly not critical to a back end designer laying out a circuit represented by the schematic. The arrangement of symbols on a schematic is generally not used when determining the placement of actual physical components on a printed circuit board (PCB), and the precise arrangement of signal lines on a schematic diagram is generally unhelpful when routing PCB traces between component pins.

Accordingly, at least some embodiments of the invention implement a connectivity-based data model for electronic design. Such a data model can be stored and manipulated non-graphically, and offers numerous advantages (as described herein). In at least some of these embodiments, a connectivity-based data model describes a circuit design using the concepts of cells, ports and nets. A cell is a functional block of a circuit. A cell may be an individual circuit element (e.g., a single microprocessor, memory chip, capacitor, AND gate, etc.), or may be a collection of individual elements. A port is an input and/or output of a cell. A net is a signal communicated to or from one or more ports.

Figure 2:
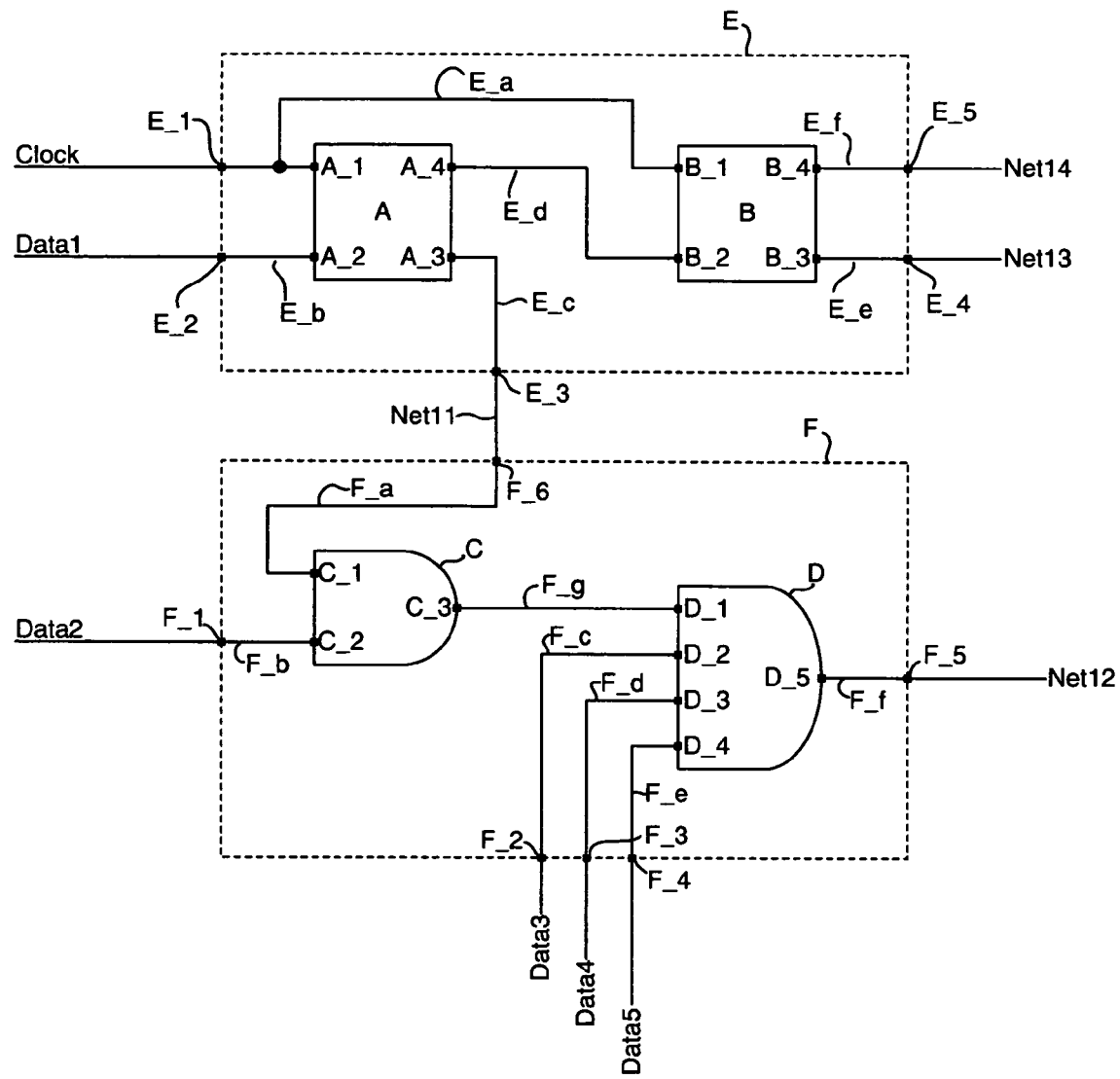
FIG. 2 is a diagram showing description of the circuit of FIG. 1 using the concepts of cells, ports and nets.

FIG. 2 shows one way in which the circuit of FIG. 1 can represented as a collection of cells, ports and nets. Referring to FIG. 2, flip flops 2 and 4, AND gate 6 and four-way AND gate 8 correspond to cells A-D, respectively. Another cell ("E") is defined to include cells A and B, and an additional cell ("F") is defined to include cells C and D. Each cell has ports, shown as small solid squares in FIG. 2 for clarity. Cell A, for example, has four ports (A_1, A_2, A_3 and A_4) corresponding to the Clock, Data, $\overline{Q}$ and Q inputs and outputs, respectively, of flip flop 2. Similarly, Cell B has ports B_1 through B_4 corresponding to the Clock, Data, $\overline{Q}$ and Q inputs and outputs, respectively, of flip flop 4. Cell C corresponds to AND gate 6 and has input ports C_1 and C_2 and an output port C_3. Cell D corresponds to four-way AND gate 8, and has four input ports D_1 through D_4 and an output port D_5.

Cell E is shown in FIG. 2 with a broken line surrounding cells A and B. The ports of cell E are labeled in FIG. 2 as E_1 through E_6 and represent inputs provided to, or outputs from, the functional block defined by cell E. Cell E also includes multiple nets E_a through E_f connecting ports of cells A and B and of cell E. Net E_a connects ports E_1, A_1 and B_1. Net E_b connects ports E_2 and A_2, and net E_c connects ports A_3 and E_3. Net E_d connects ports A_4 and B_2, net E_e and connects ports B_3 and E_4, and net E_f connects ports B_4 and E_5. Cell F is shown with a broken line surrounding cells C and D, and has ports F_1 through F_6 and internal nets F_a through F_g. Additional nets connecting cells E and F to each other or to additional signals include "Clock," "Data1" through "Data5," and "Net11" through "Net14." Some of these nets may be "global," i.e., they may run throughout the entire design (or throughout much of the design) and connect to numerous other cells (either single- or multi-element cells). Other nets may be "local," i.e., only connecting a few cells.

Cells E and F are arbitrarily defined for purposes of example. However, a designer might choose to define a cell to include other cells for various reasons. For example, a particular collection of logical elements may represent a functional block that the designer will use in several parts of a circuit design, or perhaps in several different circuit designs. Instead of recreating individual component cells for those logical elements (and their interconnections) in each of multiple locations, the designer simply reproduces the multi-component cell in another part of the design.

By representing a circuit design as a collection of cells, ports and nets, the design can readily be described non-graphically. For example, a circuit design can be stored as a collection of tables in a relational database. FIGS. 3A-3D show a simplified example of such storage as applied to the design of FIG. 2. FIG. 3A is a table titled "Projects." Each row in the "Projects" table corresponds to a particular design project, identified by the value in the first column. In the present example, a row corresponds to the design of FIG. 2 (renamed "Board 1" for convenience). Additional columns hold values identifying cells of the project. FIG. 3B is a table labeled "Cells," and contains a separate row for each cell. Fields of FIG. 3B hold values identifying cells within ("contained cell"), and ports of, a cell to which a row corresponds. FIG. 3C is a "Ports" table, each row of which corresponds to a port. The fields of the "ports" table rows hold values identifying the cell for which a particular port is an input and/or output, as well as nets connected to that port. FIG. 3D is a "Nets" table. Each row of FIG. 3D corresponds to a net, and has fields identifying ports to which that net connects.

Although storing data for the design of FIG. 2 in the tables of FIGS. 3A-3D may initially appear more complicated than a graphic representation, such storage offers numerous advantages. Data can be accessed more quickly and to a finer degree of granularity than is possible with a graphical representation. Moreover, adding additional design information is a relatively simple matter of adding new fields and/or tables. Use of tables also facilitates rapid identification of circuit elements of interest. For example, a user can determine all components receiving a particular signal by using the Nets table. This would generally be much faster than attempting to find the same information from a complex schematic.

Still further advantages can be obtained through use of an object-oriented design data model. An object-oriented approach offers many of the advantages of tables such as in FIGS. 3A-3D (e.g., accessing design data rapidly and to a fine degree of granularity), but simplifies development and distribution of application programs for editing and managing design data. In at least some embodiments, cells, ports and nets are stored as objects. As will be understood by persons skilled in the art, an "object" is a data structure that may contain both data values and programming routines (also known as methods). The methods within an object can be configured to access data within the object, to replicate the object, to create other objects, to modify data within other objects, and for numerous other purposes. In at least some embodiments of the invention, an object-oriented design data model is implemented using the JAVA programming language available from Sun Microsytems, Inc. of Santa Clara, Calif. Details of the JAVA programming language are well known, and available from, e.g., Sun Microsystems at <http://www.sun.com>.

Figure 4:
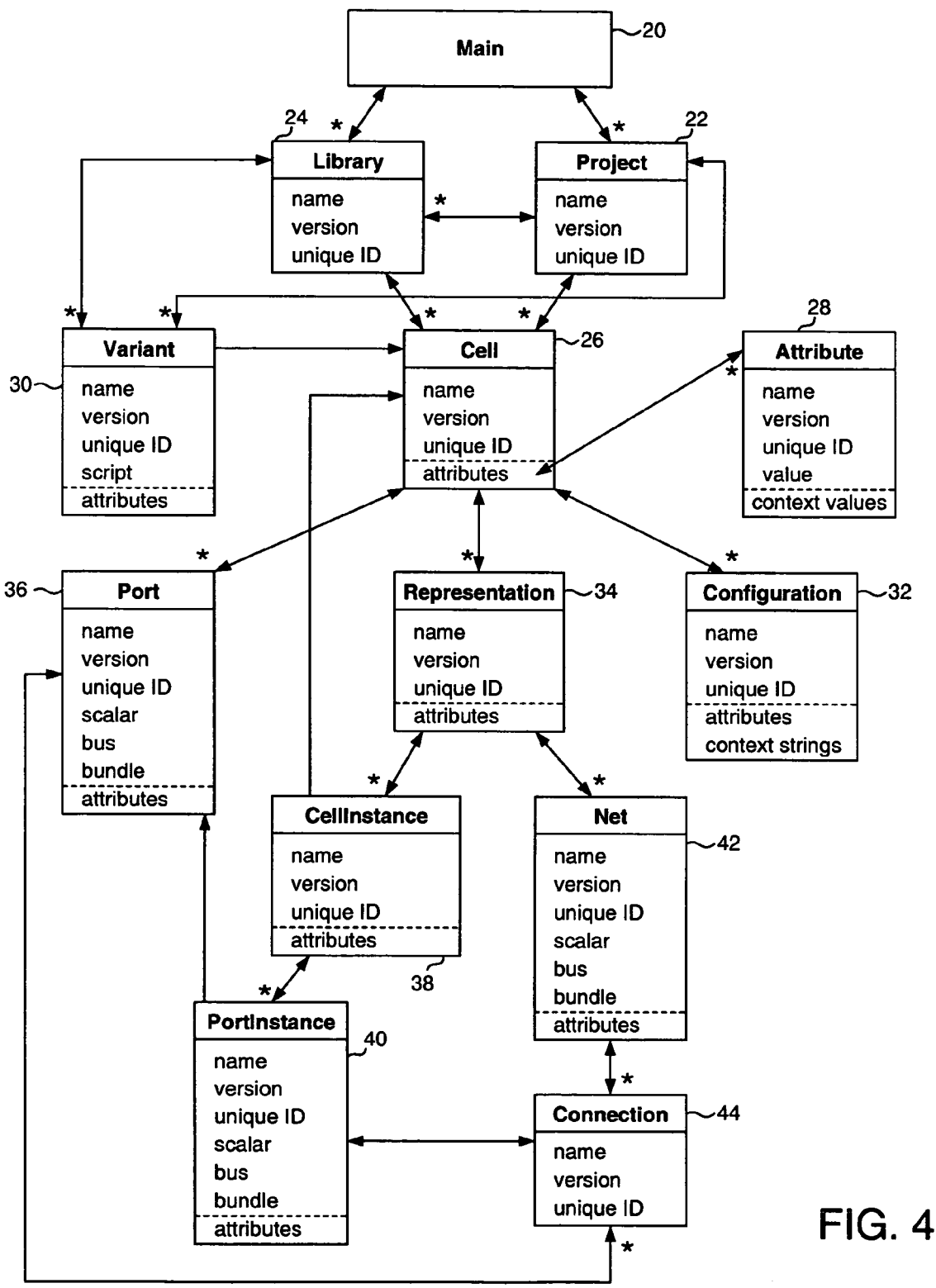
FIG. 4 is an object diagram for a Design Data Object Model (DDOM) according to at least some embodiments of the invention.

FIG. 4 is an object diagram for a design data object model (DDOM) according to at least some embodiments of the invention. The DDOM is a collection of objects used to describe the logical design of one or more design projects. In particular, the objects of the DDOM hold the data corresponding to one or more front end designs that are described using the cell, port and net concepts described above. In addition to this design data, DDOM objects also contain programming instructions (e.g., JAVA methods). Using these programming instructions, DDOM objects can access, modify, create and/or delete other DDOM objects. For example, creation (or modification or deletion) of one object can generate an event. This event can be detected by other objects, which then perform various tasks based on the detected event.

FIG. 4 shows general types of objects used to describe logical design data, as well as the relationship between those object types. A line between two blocks having an arrow at both ends indicates a two-way association between the object types represented by those two blocks. In other words, a data object of the type on one end of a double-arrow line refers back to an object of the type on the other end of that line. An asterisk (*) on one end of a line indicates that there may be one or more objects of the type at the end of the line having the asterisk. For example, a "Project" object (block 22) may have one or more associated "Cell" objects (block 26). A line having an arrow at only one end indicates that an object of the type at the headless end of the line is an instance of an object of the type at the other end of the line (the "parent object"). Both an instance object and its parent object can be used to hold design data. For example, a Cell object (block 26) may describe a particular type of cell (e.g., a capacitor and resistor in parallel). That cell type may then be repeated in various portions of the design as CellInstance objects (block 38). Individual ones of those CellInstance objects may be different from one another. One CellInstance object of the parent may describe a capacitor-resistor pair having one set of capacitance and resistance values, and another CellInstance object may describe a capacitor-resistor pair having different resistance and capacitance values.

The DDOM includes a main object 20. The main object can be analogized to a container for other objects of the DDOM. Main object 20 is often the starting point from which other objects are accessed. For example, when initially loading logical data for one or more designs, main object 20 is first accessed so as to determine what other DDOM objects may be available. In some cases, main object 20 also detects various events that occur in a program for editing logical design data. By way of example, a user may select a graphically-displayed icon corresponding to a logical design element. Main object 20 would detect that selection event and pass the necessary data to one or more other DDOM objects. As another example, and as discussed more fully below, objects within various other data models could be accessed and/or modified. Main object 20 detects such events for other object model objects and then invokes one appropriate methods within one or more DDOM objects.

Associated with main object 20 are one or more Project objects (block 22). Each project object corresponds to a particular design project (e.g., an effort to develop a specific electronic device or a portion thereof). So as not to confuse the general concept of a "project" with a Project data object, a Project data object will hereinafter be called a "Project object." Each Project object has name, version and unique identification (unique id) fields. As used herein in connection with describing an object type, "field" refers generically to a type of information contained or referenced by an object. When used in this context, "field" does not require that an object contain a table or other specific type of data structure. A field within an object may be a name/value pair (e.g., name=Cell 1), a pointer or other reference to a value stored elsewhere, or may be any of various other types of data structures. The name field may hold a name that a designer has assigned to a particular project, and which will be used by (or displayed to) the designer when accessing project design data in a computerized electronic design automation (EDA) system. For example, a design for an input/output interface board for a new computer might be named "IO Interface." Each Project object also has a version. For example, one or more designers may create multiple versions of design data for a particular project in order to maintain information about alternative designs. As one illustration, a first designer may disagree with design changes made by a second designer. The first designer may therefore save a separate copy of the design data that does not include the second designer's changes. The version field for a Project object may hold a number or other alphanumeric value. The unique id for a Project object is an identifier used to reference the Project object by other DDOM objects and elsewhere in an EDA. In some embodiments, the unique id is an alphanumeric string (e.g., "ABC-DEFG123456789") that is assigned automatically when the object is created.

Associated with a Project object may be one or more Attribute objects (block 28). An Attribute object represents a name=value pair used to link some type of additional information to the object associated with the Attribute object. For example, an Attribute object associated with a Project object may be used to link a lifecycle state to the object (e.g., "Lifecycle State=Under Construction"; lifecycle states are described below), to identify permission levels or roles of users authorized to access the object, etc. In addition to name, value, version and unique id fields, an Attribute object may also have context value fields, which are described below.

Each Project object may have one or more associated Cell objects (block 26). As discussed in connection with FIG. 2, a cell conceptually refers to a functional block of a circuit. That block may be a single logical element (e.g., one resistor) or may be a collection of logical elements and their interconnections. A Cell Object generally corresponds to a description of a functional block. So as not to confuse the general concept of a "cell" with a Cell data object, a Cell data object will hereinafter be called a "Cell object." As with a Project object, a Cell object also has name, version and unique id fields. Associated with a Cell object may be one or more Attribute objects (a double-headed arrow between blocks 26 and 28 is omitted for clarity).

As described in more detail below, an upper level of a design hierarchy can be represented as a single Cell Object. For example, the entire design of FIG. 2 could correspond to a single Cell Object named "Top." A CellInstance Object (block 38) corresponds to an instantiation of a Cell Object. By way of illustration, the functional block corresponding to a "Top" Cell Object of the FIG. 2 design could be replicated in other designs. Those replicated blocks (which need not be identical to each other) would correspond to separate CellInstance objects. Each of those CellInstance objects would be a separate instantiation of the "Top" Cell object. Each CellInstance object has name, version and unique id fields, and may have one or more associated Attribute objects (a double-headed arrow between blocks 38 and 28 is omitted for clarity). Additional aspects of Cell and CellInstance objects are discussed below.

Associated with a Cell object may be one or more Representation objects (block 34). As indicated above, a Cell object corresponds to a functional block of a design. That functional block can often be described using various combinations of logical sub-elements and interconnections between those sub-elements. Although alternative representations of the same cell may often correspond to blocks of sub-elements that perform identical functions, this need not be the case. Each Representation object also has name, version and unique id fields. Each Representation object may also have one or more associated Attribute objects. So as not to confuse the diagram of FIG. 4, a double-headed arrow connecting blocks 34 and 28 is omitted from FIG. 4.

Figure 5A:
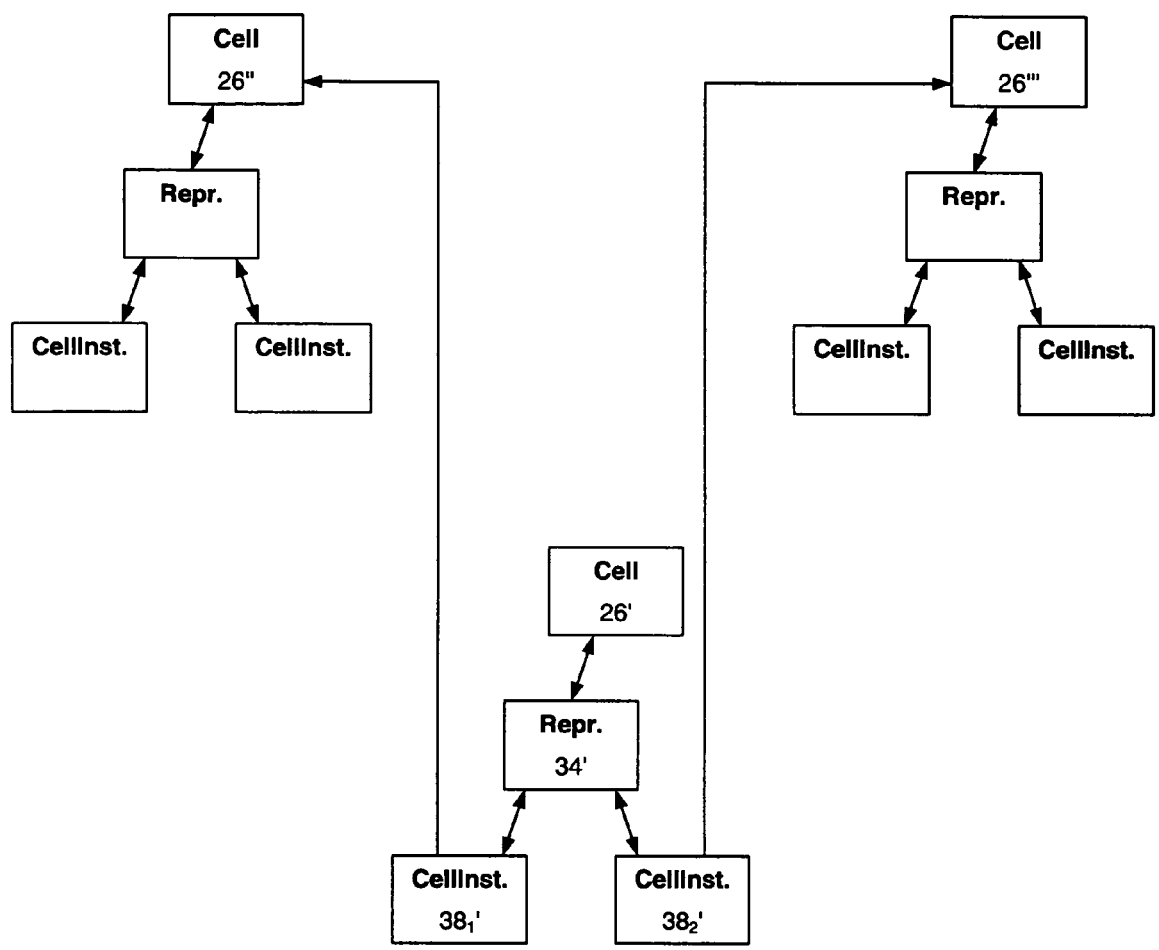
FIG. 5A is a diagram showing relationship among individual objects.

As seen in FIG. 4, blocks 26 (Cell) and 38 (CellInstance) are linked directly by a single arrow line, as well as indirectly through block 34 (Representation). It should be remembered, however, that the blocks in FIG. 4 (with the exception of block 20) represent object types, not individual objects per se. Thus, FIG. 4 does not require that a CellInstance object be an instantiation of the Cell object with which it is indirectly linked via a Representation object. This is shown diagrammatically in FIG. 5A, in which the blocks do represent individual objects. For simplicity, objects of certain types described in FIG. 4 are not included in FIG. 5A. Cell object 26' has an associated Representation object 34', which has associated CellInstance Objects $38_1'$ and $38_2'$. CellInstance object $38_1'$ is an instantiation of Cell object 26" and CellInstance object $38_2'$ is an instantiation of Cell object 26'''.

Returning to FIG. 4, each Cell object is also associated with one or more Port objects (block 36). Each Port object corresponds to an input to and/or output of a functional block corresponding to a Cell object with which the Port object is associated. So as not to confuse the general concept of a "port" with a Port data object, a Port data object will hereinafter be called a "Port object." As with other object types, each Port object has name, version and unique id fields, and may have one or more associated Attribute objects (a double-headed arrow between blocks 36 and 28 is omitted for clarity). Each Port object further has scalar, bus and bundle fields to indicate whether the corresponding port is of a scalar, bus or bundle type. A scalar port connects to a scalar net, and receives (or outputs) a single bit signal. Examples of scalar ports include ports which receive or output a clock or reset signal, a prescribed voltage level (e.g., "VDD"), etc. A bus port connects to a bus net, and receives a multibit signal. An example includes an N-bit wide memory addressing line. A bundle port connects to a bundle net, and receives (or outputs) a combination of bus and scalar signals.

Similarly, a CellInstance object (block 38) may have one or more associated PortInstance objects (block 40). Each PortInstance object corresponds to an input to (our output from) the functional block corresponding to an associated CellInstance object. A PortInstance object has name, version and unique id fields, and may have one or more associated Attribute objects (a double-headed arrow between blocks 40 and 28 is omitted for clarity). Like Port objects, PortInstance objects also have fields to indicate whether the corresponding port is of a scalar, bus or bundle type. A PortInstance object is an instantiation of a Port object. In particular, a PortInstance object is an instantiation of a Port object associated with the Cell object from which the CellInstance object is instantiated.

Both Port and PortInstance objects are associated with Connection objects (block 44). A Connection object (which has name, version and unique id fields) links a Port or PortInstance object to a Net object (block 42). Each Net object corresponds to a net providing a signal to (or receiving a signal from) the linked Port or PortInstance object. Accordingly, each Net object also has fields indicating whether the corresponding net is of a scalar, bus or bundle type. A Net object also has name, version and unique id fields, and may have one or more associated Attribute objects (a double-headed arrow between blocks 42 and 28 is omitted for clarity). Because a single Net may be connected to many ports, the asterisk is on the block 44 side of the line connecting blocks 42 and 44.

Returning to block 26, a Cell object is associated with one or more Configuration objects. A Configuration object contains data indicating which Representation object is to be used when instantiating a cell at a particular hierarchical design level. The concept of design hierarchy can be illustrated with FIG. 2. If the entire design of FIG. 2 is treated as a single cell, that entire-design cell would be at the highest (or "top") level of the design hierarchy. Cells E and F are at intermediate levels of the hierarchy, while cells A, B, C and D are at lower levels of the hierarchy.

Figures 5B, 5C:
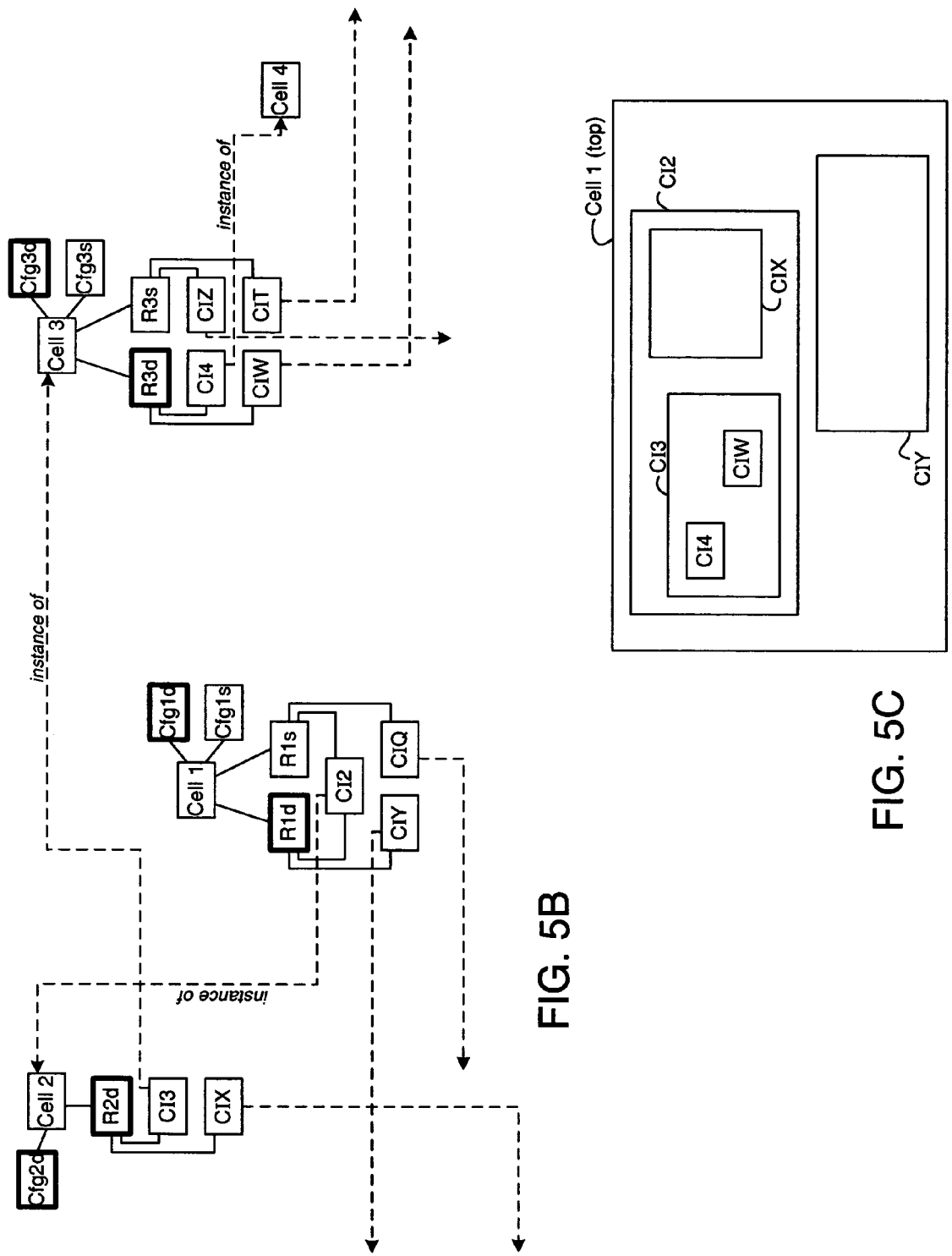
FIGS. 5B-5E are block diagrams explaining, according to at least some embodiments, the interaction of Cell, CellInstance, Representation and Configuration objects in connection with establishing design hierarchy.

FIGS. 5B-5E further explain the interaction of Cell, CellInstance, Representation and Configuration objects in connection with establishing design hierarchy. In FIG. 5B, the rectangular blocks signify individual objects. The Cell 1 object is associated with Representation objects R1d and R1s and with Configuration objects Cfg1d and Cfg1s. Configuration object Cfg1d specifies that a default representation (i.e., the representation corresponding to object R1d) should be used for the Cell 1 functional block. Conversely, Configuration object Cfg1s specifies that a specified representation (i.e., the representation corresponding to object R1s) should be used for the Cell 1 functional block. The Cfg1d configuration is active in FIG. 5B. In other words, the Cell 1 functional block is currently being represented according to the R1d Representation object. Representation object R1d is associated with two CellInstance objects CI2 and CIY. CellInstance object CIY is an instantiation of a Cell object not shown in FIG. 5B. CellInstance object CI2 is an instantiation of Cell object 2. Representation object R1s is also associated with CellInstance object CI2, as well as with CellInstance object CIQ (an instance of a Cell object not shown in FIG. 5B).

The Cell 2 object has a single associated Configuration object (Cfg2d) and a single, default Representation object (R2d). Associated with the R2d object are CellInstance objects CI3 and CIX. Object CIX is an instantiation of a Cell object not shown in FIG. 5B, while object CI3 is an instantiation of Cell object Cell 3.

Cell object Cell 3 has two associated Configuration objects Cfg3d and Cfg3s and two associated Representation objects R3d and R3s. Configuration object Cfg3d specifies that a default representation (i.e., the representation corresponding to object R3d) should be used for the Cell 3 functional block. Configuration object Cfg3s specifies that a specified representation (i.e., the representation corresponding to object R3s) should be used for the Cell 3 functional block. The R3d object is associated with CellInstance objects CI4 and CIW. Object CIW is an instantiation of a Cell object not shown in FIG. 5B, while object CI4 is an instantiation of Cell object Cell 4. The Cell 4 object corresponds to the lowest level of the design hierarchy (e.g., a single component such as a capacitor or resistor), and there is only one representation of the corresponding functional block. The R3s object is associated with CellInstance objects CIZ and CIT; CIZ and CIT are instances of other Cell objects not included in FIG. 5B.

FIG. 5C is a block diagram of a design corresponding to the active configurations of FIG. 5B. The top level (Cell 1) contains one cell (CI2) corresponding to the default representation (R2d) of Cell 2. Cell 1 also contains a cell corresponding to a representation of the Cell object from which CIY is instantiated (the details of which are omitted for simplicity). The cell CI2 contains a cell (CI3) corresponding to the default representation (R3d) of Cell 3. Cell CI2 also contains a cell corresponding to a representation of the Cell object from which CIX is instantiated (details also omitted for simplicity). Cell CI3 contains a cell (CI4) corresponding to the only representation of Cell 4. Cell CI3 also contains cell CIW corresponding to a representation of the cell from which CIW is instantiated (details also omitted for simplicity).

Figures 5D, 5E:
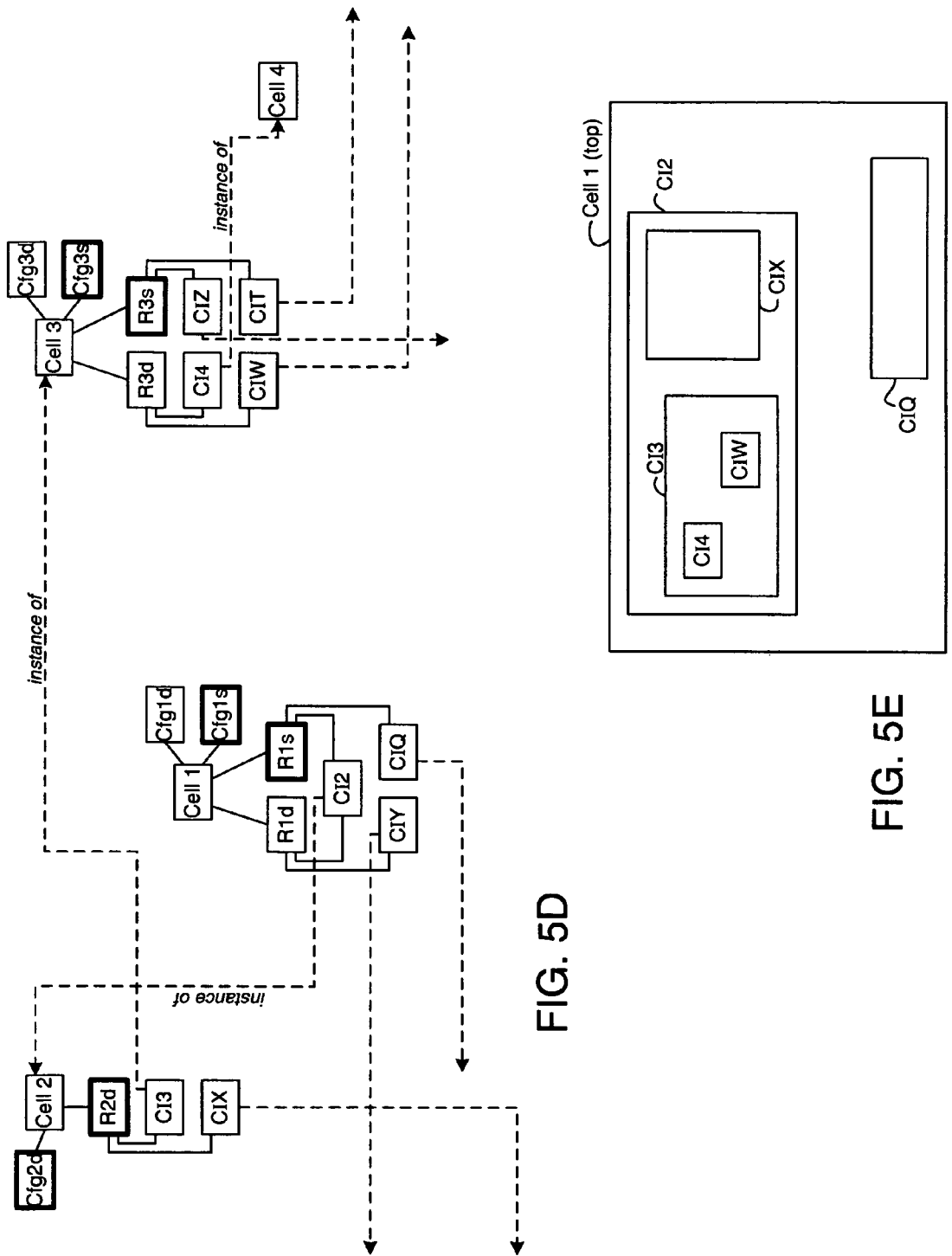

FIGS. 5D and 5E show what occurs if the Cfg1s configuration for the Cell 1 object is made active. Because configuration Cfg1s specifies representation R1s, Cell 1 now contains cells CI2 (corresponding to the R2d representation of Cell 2) and CIQ (corresponding to a representation of another Cell object not shown in FIG. 5D). Cell CI2 again contains cells CIX and CI3. Although configuration Cfg3s is active for Cell object CI3 in FIG. 5D, cell CI3 of FIG. 5E still contains cells CI4 and CIW. In at least some embodiments of the invention, an active non-default configuration for a top-level Cell object supercedes an active configuration for a Cell object instantiated at a lower level. In the example of FIGS. 5D and 5E, configuration object Cfg1s specifies that default representations should be used at all lower levels. Thus, and not withstanding the active Configuration object Cfg3s for Cell 3, the Cell 3 object is instantiated using the default representation R3d. Were Cell 3 to be instantiated elsewhere as a top level, however, the Cfg3s configuration would then be used. If desired, the Cfg1s configuration for Cell 1 could be modified to specify the R3s representation of Cell 3.

Two additional blocks of the DDOM are blocks 24 (Library object type) and 30 (Variant object type). The DDOM may have one or more Library objects, each of which is associated with one or more Cell objects. In this manner, each Library object corresponds to a collection (or a library) of various Cell objects. In some cases, a library may be a database identifying actual physical components that can be used on a PCB (e.g., resistors, capacitors, memory chips, etc.); associated with those components may be Cell objects which can be added to a design (i.e., associated with a Project object). A library may also include other types of Cell objects which can be accessed by users and added to a project (i.e., associated with a Project object). For example, a Cell object may previously have been developed for a functional block used in numerous types of projects. Instead of recreating that functional block each time it is needed in a new project, the pre-existing Cell object can be associated with new Project objects. A Library object has name, version and unique id fields. Each Projects object is also associated with one or more Library objects.

A Variant object (block 30) corresponds to a particular Cell object that has been modified in some way so as to provide an alternate design. Unlike separate versions of a Cell object, which are typically used to store interim design variations before a design is complete, a Variant object often corresponds to a design that is intended for a slightly different end use. For example, a particular electronic device may require some modifications in order to be used in another country having different standards (e.g., NTIS vs. PAL video standards), but a large portion of the underlying design may be the same. A Variant object also has name, version and unique id fields, and may have one or more associated Attribute objects (a double-headed arrow between blocks 30 and 28 is omitted for clarity). A Variant object may also have a script. As discussed below, scripts can be used to specially modify an object in some way.

Figure 6J:
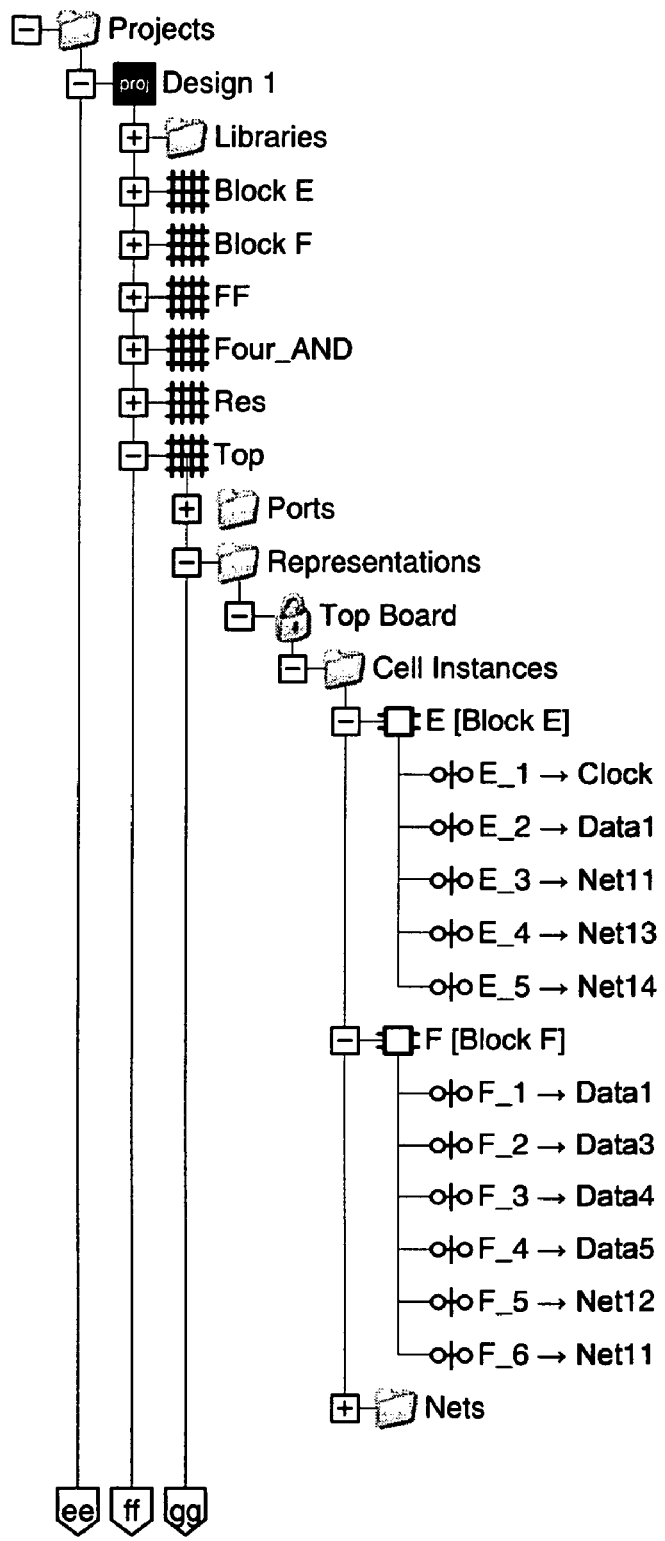
FIGS. 6A-6T are drawings of projects trees according to at least some embodiments of the invention.
Figure 6K:
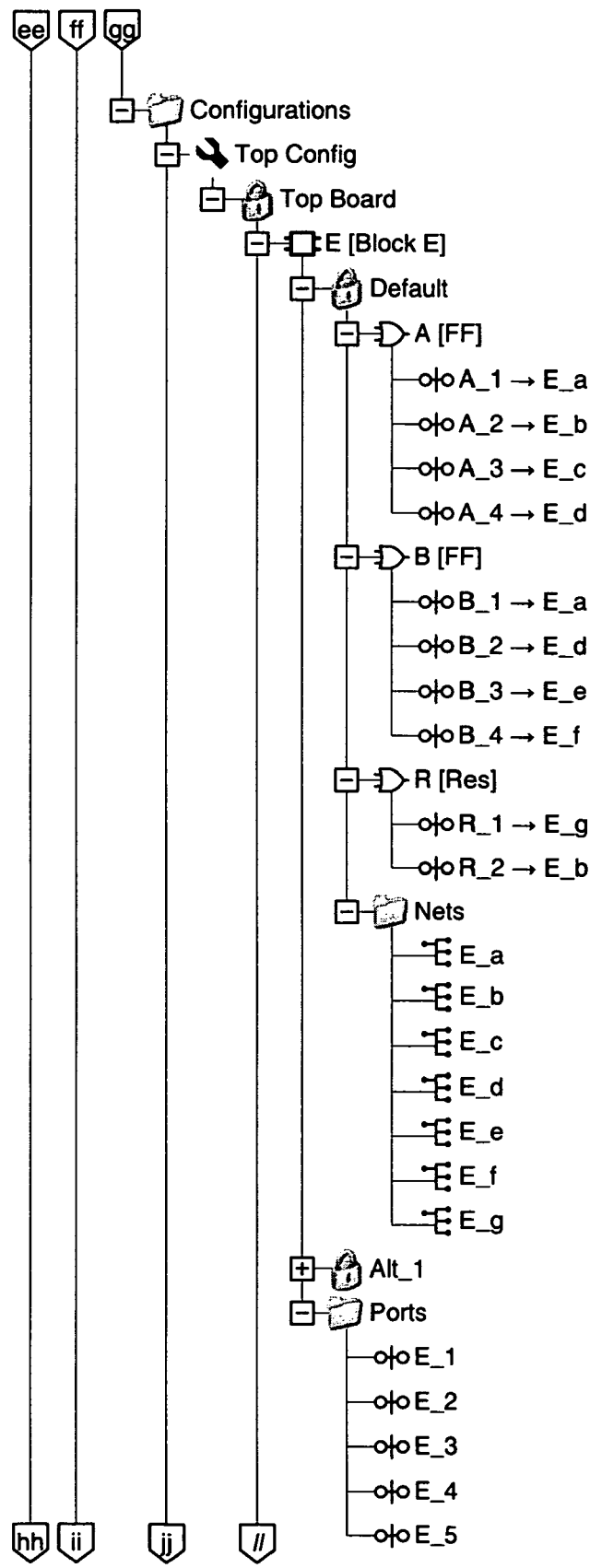
Figure 6L:
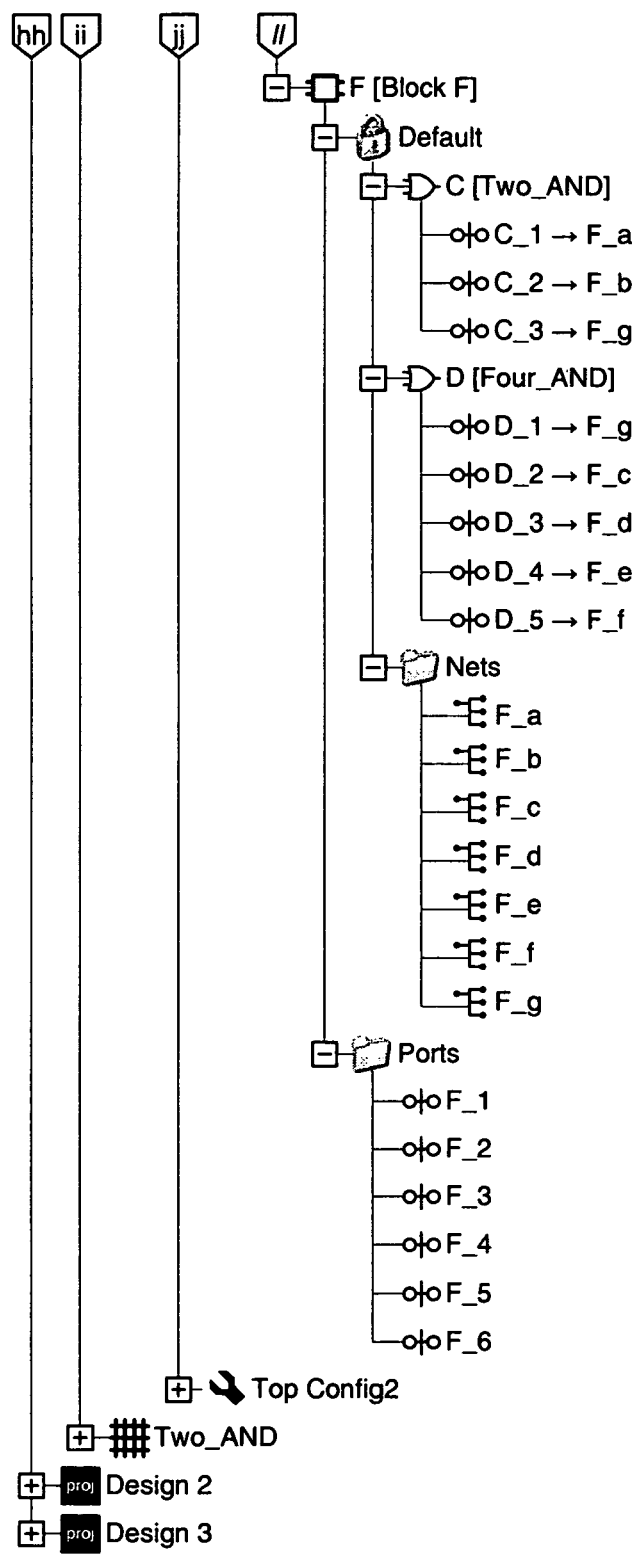
Figure 6M:
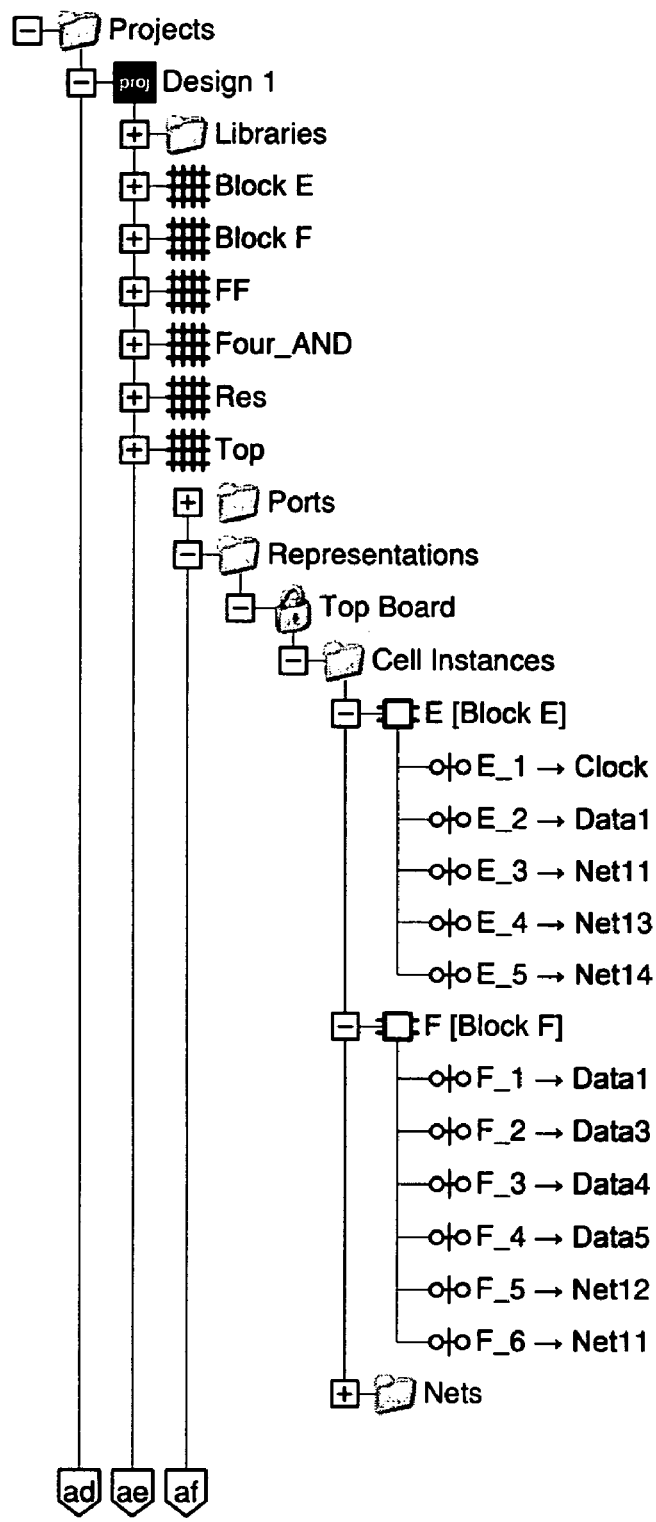
Figure 6N:
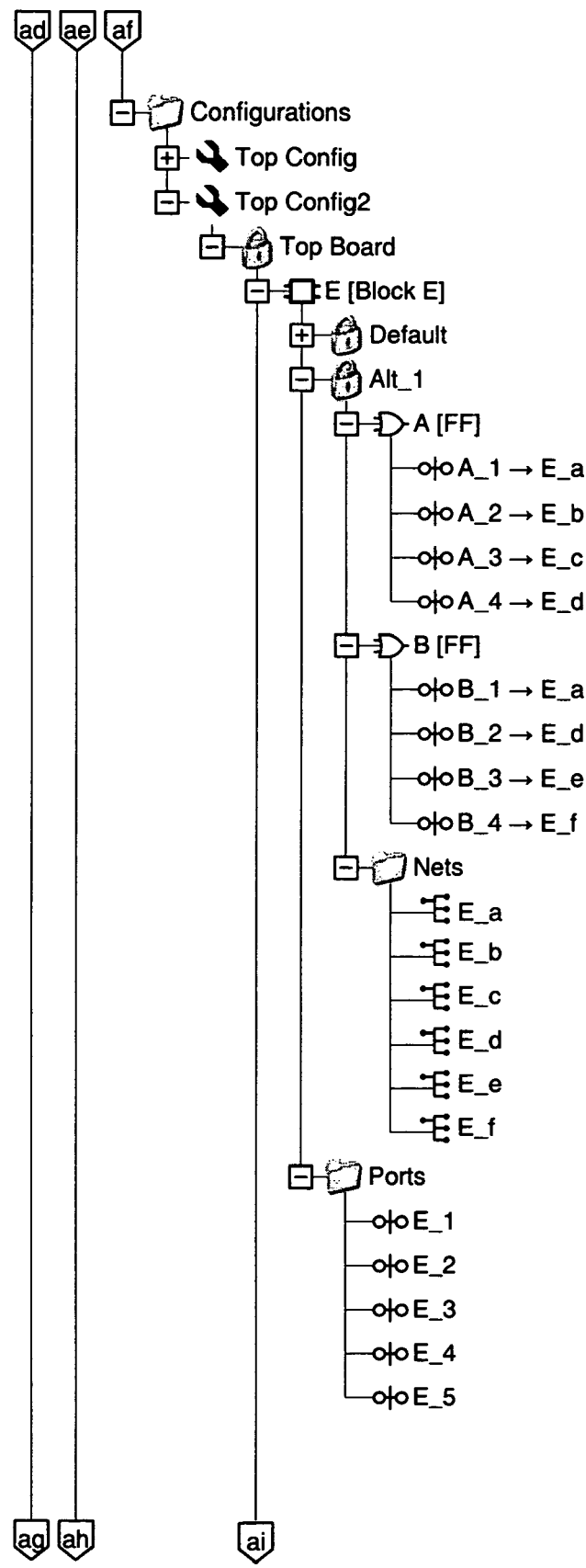
Figure 6O:
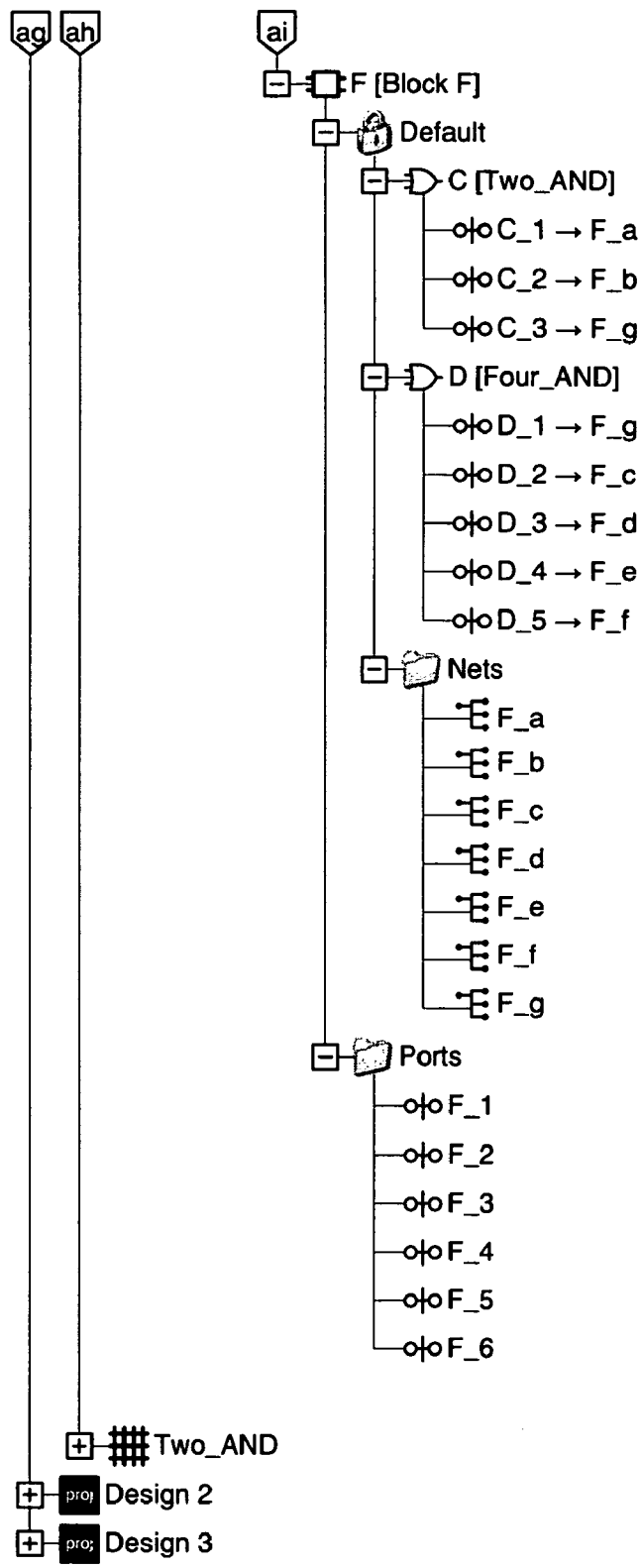
Figure 6P:
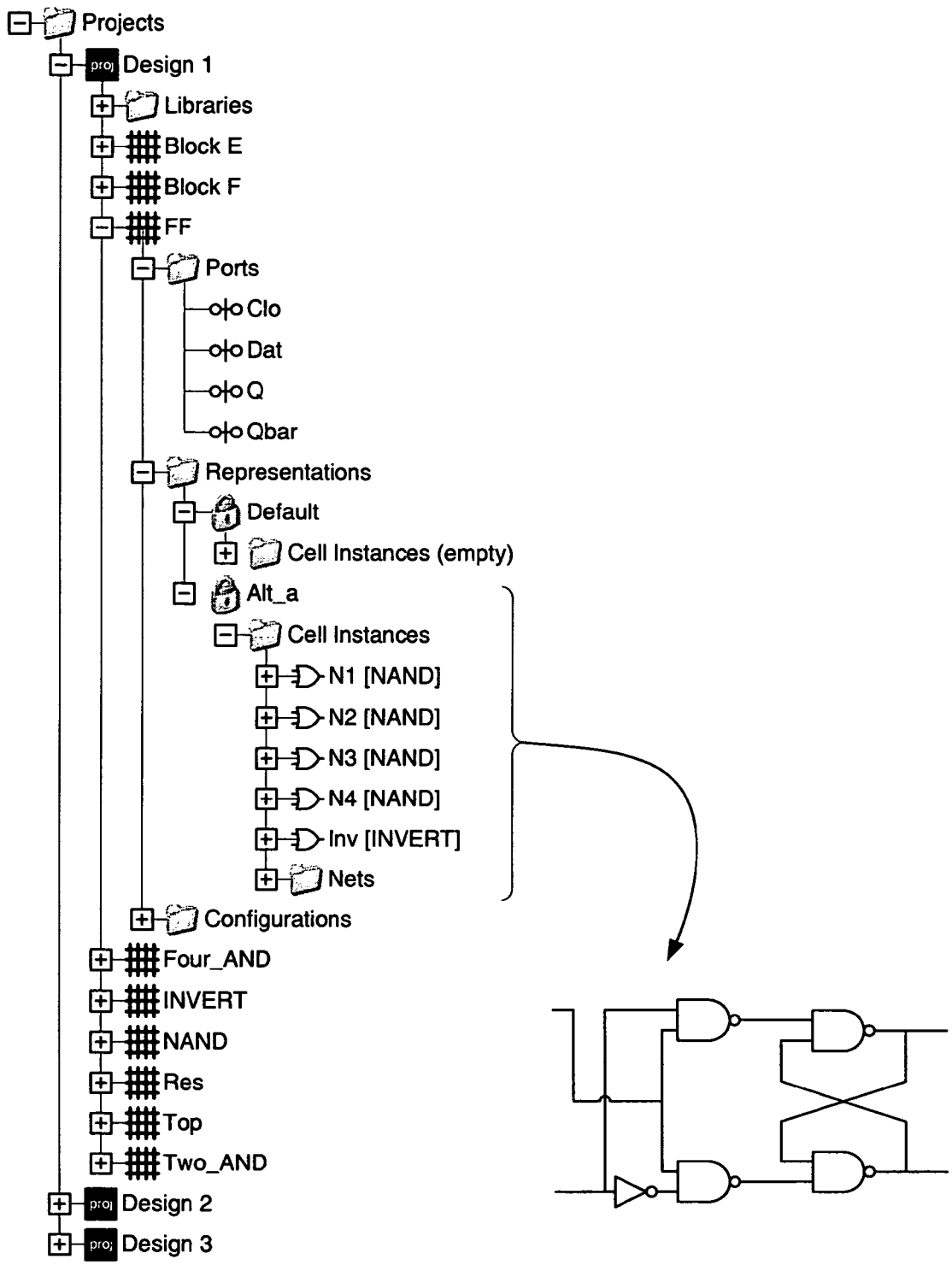
Figure 6Q:
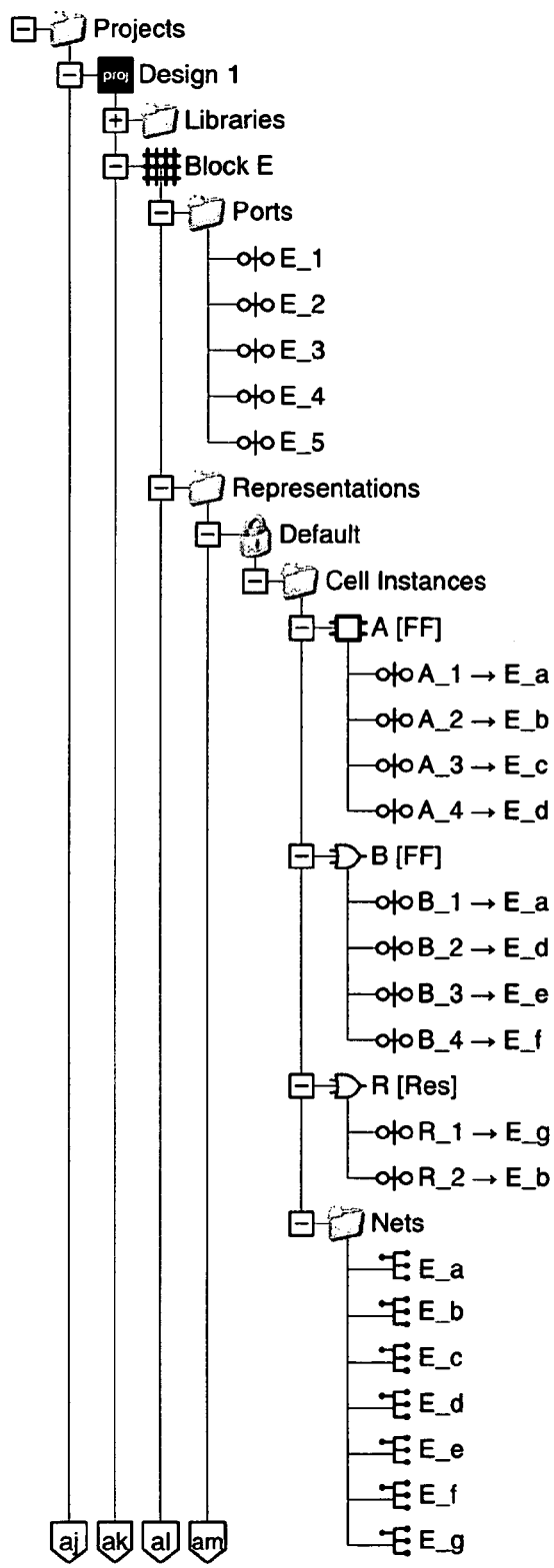
Figure 6R:
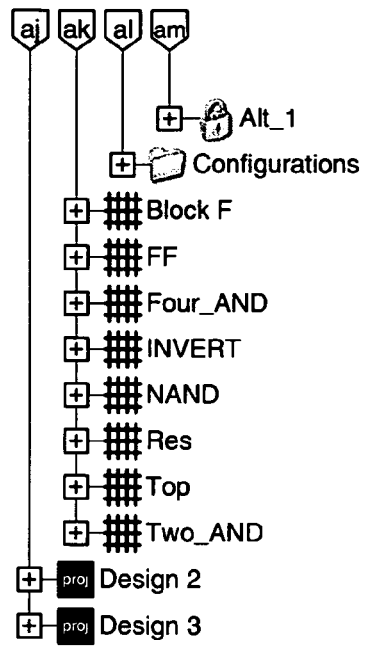
Figure 6S:
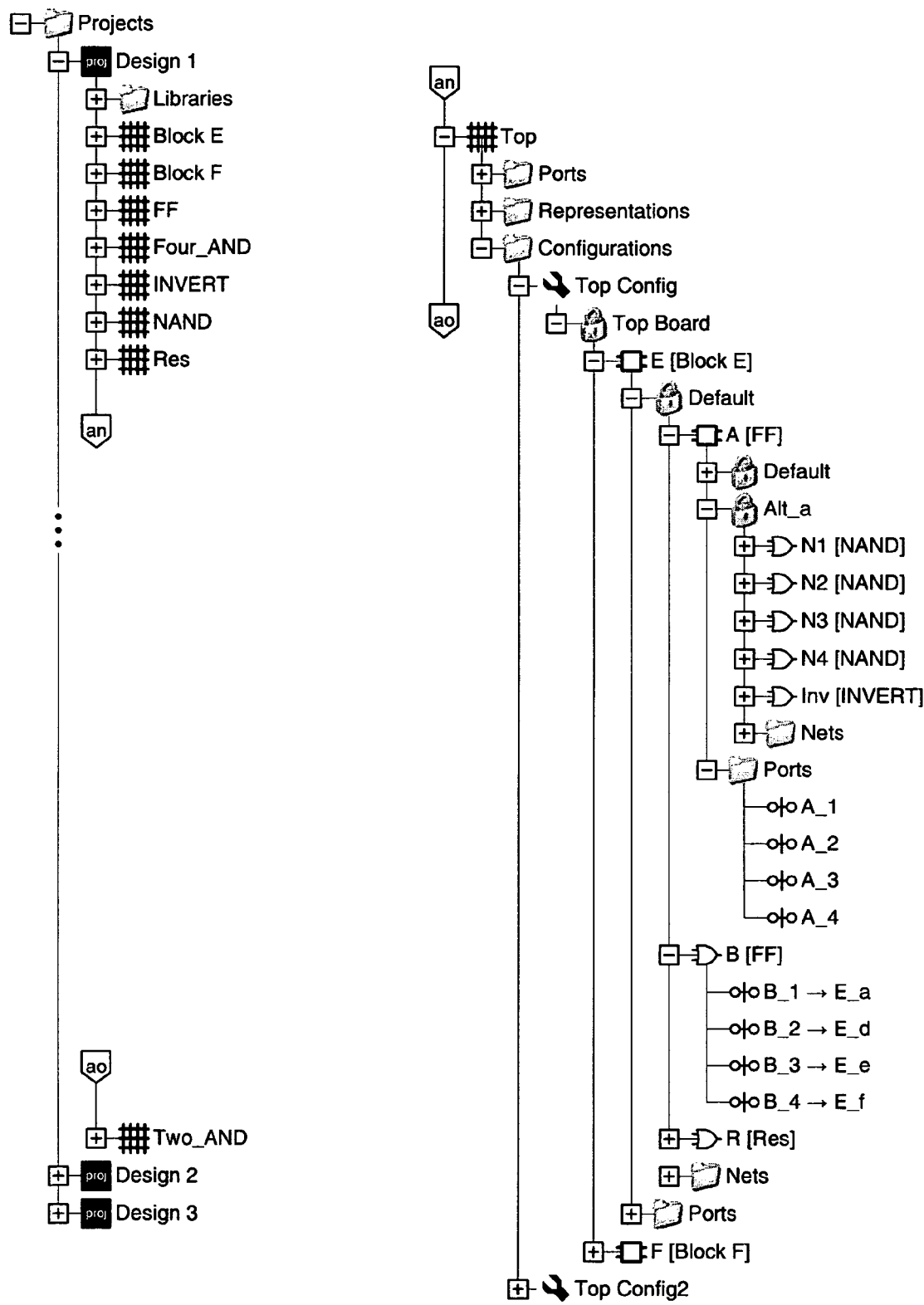
Figure 6T:
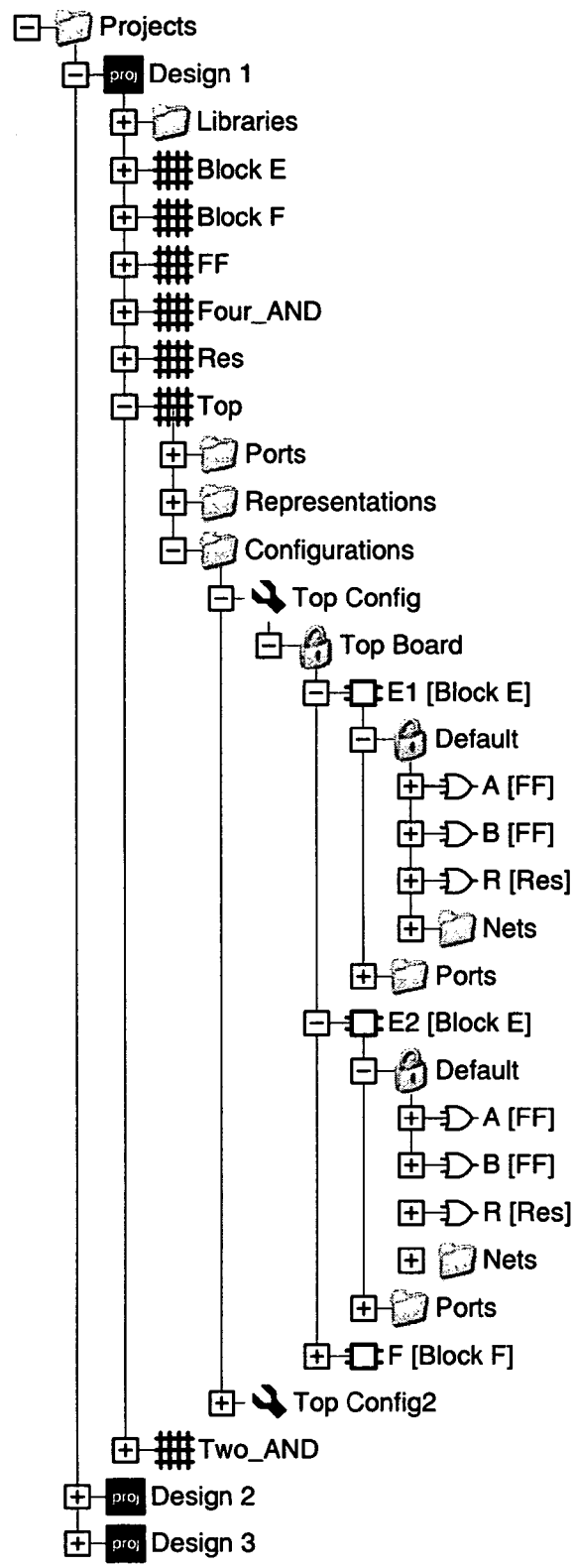

FIGS. 6A-6T further illustrate the relationship and use of various DDOM objects. Shown in FIGS. 6A-6T are various forms of a projects tree listing logical elements for one or more designs. In at least some embodiments, various nodes of a projects tree correspond to DDOM objects, and the tree is displayed to a designer. From this display, the designer can expand or collapse portions of the tree, select objects in the tree, add and/or delete objects in the tree, edit objects in the tree, and perform numerous other design tasks. Examples of manipulating a projects tree from such a display are provided below.

Figure 2A:
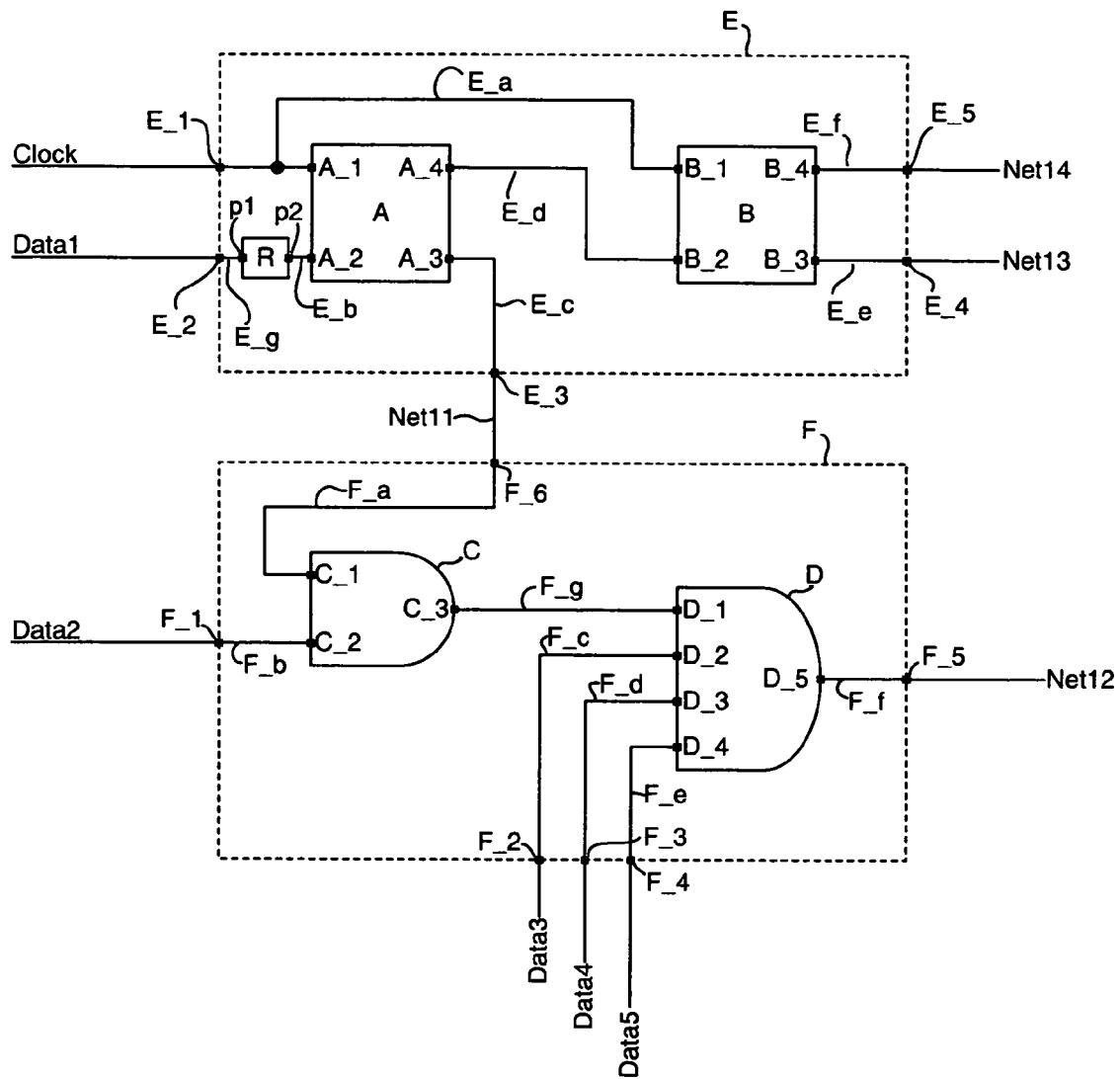
FIG. 2A is a modified version of the design of FIG. 2.

In FIG. 6A, the project tree is partially collapsed. At the first level of the tree is a node for "Projects" This node is expanded in FIG. 6A to show numerous projects (titled "Design 1," "Design 2" and "Design 3"); each node corresponds to a separate Project object. Although only three projects are shown, more or less could be present. The node for the project "Design 1" is also partially expanded. The first node ("Libraries") can be expanded to show various Library objects that are associated with, and may be used in connection with, the "Design 1" Project Object. Following the Libraries node are nodes for all of the Cell objects associated with the "Design 1" Project object. For purposes of example, the "Design 1" Project object corresponds to the designs shown in FIGS. 2 and 2A. FIG. 2A is substantially the same as FIG. 2, except that a resistor ("R") and an additional net ("E_g") have been added. The "Block E" Cell object corresponds to the functional blocks represented as cell E in FIGS. 2 and 2A. The "Block F" Cell object corresponds to the functional block represented as cell F in FIGS. 2 and 2A. The "FF," "Two_AND," "Four_AND" and "Res" Cell objects respectively correspond to a D-type flip-flop, a two-input AND gate, a four-input AND gate and a resistor. The "Top" Cell object corresponds to the function block for the entire circuit of FIG. 2 or FIG. 2A. For convenience, FIG. 6A also contains a key listing the various icons used in FIGS. 6A-6T and 8K. The icons shown are only examples, and other icons could be used.

In FIGS. 6B-6E, respectively, the nodes for Cell objects "FF", "Res," "Four_AND" and "Two_AND" have been partially expanded. The "Ports" node for each of these Cell objects lists the Port objects associated with each of these Cell objects. Cell object FF is associated with Port objects "Clo," "Dat," "Q" and "Qbar" (FIG. 6B); Cell object Res is associated with Port objects "p1" and "p2" (FIG. 6C); Cell object Four_AND is associated with Port objects "In_1" through "In_4" and "Out" (FIG. 6D); and Cell object Two_AND is associated with Port objects "In_1," "In_2" and "Out" (FIG. 6E). Although some nodes in FIGS. 6D and 6E have the same names ("In_1," "In_2" and "Out"), they correspond to different Port objects. For example, the In_1 Port object corresponding to FIG. 6D and the In_1 Port object corresponding to FIG. 6E would have different unique id values, even if their name values are the same. Included in the tree under nodes for Cell objects FF, Res, Four_AND and Two_AND are nodes labeled "Representations" and "Configurations." These nodes, once expanded, identify Representation objects and Configuration objects associated with the Cell Objects.

In FIGS. 6F and 6G, the tree node for the Block E Cell object is expanded. On-page connectors aa, bb, cc and dd link the tree portion of FIG. 6F with the tree portion of FIG. 6G. The first node under the Block E Cell Object ("Ports") is expanded to identify Port Objects (E_1 through E_5) associated with the Block E Cell object. The Representation node is also expanded. In this example, there are two Representation objects associated with the Block E object. The first, "Default," is shown in FIG. 6F. This Representation object, which corresponds to the design illustrated in FIG. 2A, includes CellInstance objects A, B and R. CellInstance objects A and B are separate instances of Cell Object FF. The "[FF]" after each CellInstance name indicates that each of the A and B CellInstance objects is an instance of the FF Cell object. CellInstance object R is an instance of Cell object Res. Identified under each of the tree nodes for CellInstance objects A, B and R are PortInstance objects associated with each of the CellInstance objects. For example, associated with CellInstance object A are PortInstance Objects A_1 through A_4. A_1 through A_4 are, respectively, instances of Port Objects "Clo," "Dat," "Qbar" and "Q" (FIG. 6B). PortInstance objects R_1 and R_2 are instances of Port objects p1 and p2 (FIG. 6C). Following the R node is a node labeled "Nets," under which are listed the Net objects associated with the "Default" Representation object for the Block E Cell object.

The second Representation object for the Block E cell is named "Alt 1" and is shown in FIG. 6G. This representation, which corresponds to the design illustrated in FIG. 2, is different than that corresponding to the Default Representation object. Associated with the Alt 1 Representation object are CellInstance objects A (having PortInstance objects A_1 through A_4) and B (having PortInstance objects B_1 through B_4), as well as Net objects E_a through E_f. The "Configurations" node is not expanded, in FIG. 6G. If that node were expanded, however, it would include a default configuration that, if active, specifies the Default representation of Block E. There would similarly be a configuration that, when active, specifies the Alt_1 representation.

The Block F Cell Object is partially expanded in FIGS. 6H and 6I. On-page connectors ab and ac link the tree portion of FIG. 6H with the tree portion of FIG. 6I. In the present example, there is only one Representation object ("Default") associated with the "Block F" Cell object. Although the Representation object has the same name as other Representation objects (e.g., "Default" in FIG. 6F), it has a different unique id value.

The "Top" Cell object is partially expanded in FIGS. 6J-6L. Off-page connectors ee, ff, and gg link the tree portion of FIG. 6J with the tree portion of FIG. 6K. Off-page connectors hh, ii, jj and ll link the tree portion of FIG. 6K with the tree portion of FIG. 6L. Cell object "Top" has a single Representation object ("Top Board"). Associated with the "Top Board" Representation object are CellInstance objects "E" (an instance of Cell object "Block E") and "F" (an instance of Cell Object "Block F"). Net objects associated with the "Top Board" Representation object are listed under the Nets node, which is not expanded in FIG. 6J.

The Configurations node and the node for Configuration object "Top Config" are expanded in FIGS. 6K and 6L. The "Top Config" object specifies the "Top Board" Representation object for the "Top" Cell object. As seen in FIG. 6J, the "Top Board" Representation object is associated with CellInstance objects "E" (and instance of the "Block E" Cell object) and "F" (an instance of the "Block F" Cell object). "Top Config" further specifies which representations of "Block E" and "Block F" to use when instantiating "E" and "F." In particular, and as seen in FIG. 6K, "Top Config" specifies that the "Default" representation of "Block E" should be instantiated. Similarly, and as seen in FIG. 6L, "Top Config" specifies that the "Default" representation for "Block F" should be instantiated.

A Cell object can have multiple configurations. In the present example, the "Top" object has another configuration known as "Top Config2" (shown unexpanded in FIG. 6L). In FIGS. 6M-6O, the tree node for the "Top Config2" object is made active and expanded. In at least some embodiments, only a tree node for an active configuration can be expanded. "Top Config2" specifies the "Alt_1" representation of "Block E" should be instantiated instead of the "Default" representation of "Block E." Off-page connectors ad, ae and af link the tree portion of FIG. 6M with the tree portion of FIG. 6N. Off-page connectors ag, ah and ai link the tree portion of FIG. 6N with the tree portion of FIG. 6O.

Only three hierarchical levels are included in the example of FIGS. 6A-6O. However, additional levels of design hierarchy are possible. For example, "Design 1" could be modified to include multiple representations of Cell object "FF." FIG. 6P shows the "FF" node further expanded (after such modification) to reveal two representations of Cell object "FF." The first Representation object ("Default") corresponds to a representation in which an instance of FF would be a leaf node (i.e., the lowest level of a branch in the projects tree). For example, the "Default" representation of Cell object "FF" could correspond to a discrete component bought from a vendor. The second Representation object ("Alt_a") corresponds to an implementation of a flip flop using 4 NAND gates and an inverter (such an implementation is shown in FIG. 6 P for convenience). FIGS. 6Q-6R show the tree node for "Block E" expanded to show (via a different type of icon) that CellInstance object A is no longer the lowest level of design hierarchy in that branch of the projects tree. On-page connectors aj, ak, al and am link the tree portion of FIG. 6Q with the tree portion of FIG. 6R. FIG. 6S shows the "Top Config" node expanded to now reveal four levels of design hierarchy: "Top," "E," "A" and "N1" through "Inv". On-page connectors an and ao link the separated tree portions of FIG. 6S. In the example of FIG. 6S, "Top Config" specifies that that the "Default" representation for "Block E" should be instantiated, that the "Alt_a" representation of Cell object FF should be instantiated for CellInstance A, and that the "Default" representation of FF should be instantiated for CellInstance B.

In FIG. 6T the Block E Cell object has been instantiated twice (CellInstance objects E1 and E2) under the "Top Board" representation for the Top Cell object. In other words, there are now three CellInstance objects associated with the "Top Board" Representation object for the Top Cell object (E1, E2 and F). Although there are now two CellInstance objects which are instantiations of the Block E Cell object, there are still only 2 instantiations of the FF Cell object ("A" and "B") and only one instantiation of the Res Cell object ("R"). Stated differently, the "A" node under the "E1" node and the "A" node under the "E2" node refer to the same CellInstance object; the same applies to the two "B" nodes and to the two "R" nodes. Although the two "A" nodes refer to the same object, the object has a different context in each tree location. This context can be used to vary the behavior of the object based on its location in the design hierarchy. For example, CellInstance object "R" could have associated attributes that depend upon context. One attribute may specify a first resistance value in one position of the design hierarchy (e.g., under "E1"), and another attribute may specify an different resistance value in a second position within the design hierarchy (e.g., under "E2"). As shown in FIG. 4, an Attribute object (block 28) may have multiple values ("context values") that depend upon context. A context string of a Configuration object (block 32) defines the context values to be used at various locations within the hierarchy (i.e., when the CellInstance object is in different contexts).

Although CellInstance objects have been discussed in connection with FIG. 6T, PortInstance, Connection and Net objects can also have context. For example, if the A nodes under E1 and E2 were expanded to identify ports of A, A_1 under A on the E1 branch and A_1 under A on the E2 branch would refer to the same PortInstance object, but with different contexts. If the Nets node under E1 and the Nets node under E2 were expanded, E_a under E1 and E_a under E2 would refer to the same Net object, but have different contexts values. The Connection object linking A_1 and E_a in the E1 context is the same Connection object linking A_1 and E_a in the E2 context, but likewise has a separate context value in each case.

Example System Architecture

In at least some embodiments, and using objects according to the DDOM of FIG. 4, design data is stored in an object-oriented database. Client computers (operated by front end designers) download a set of DDOM objects, via a Design Objects Server (DOS), from the object-oriented database. The downloaded DDOM objects include methods that act as application programming interfaces (APIs) for application programs executing on a client computer. Those client APIs are used by one or more application programs to edit and/or create design objects.

Figure 7:
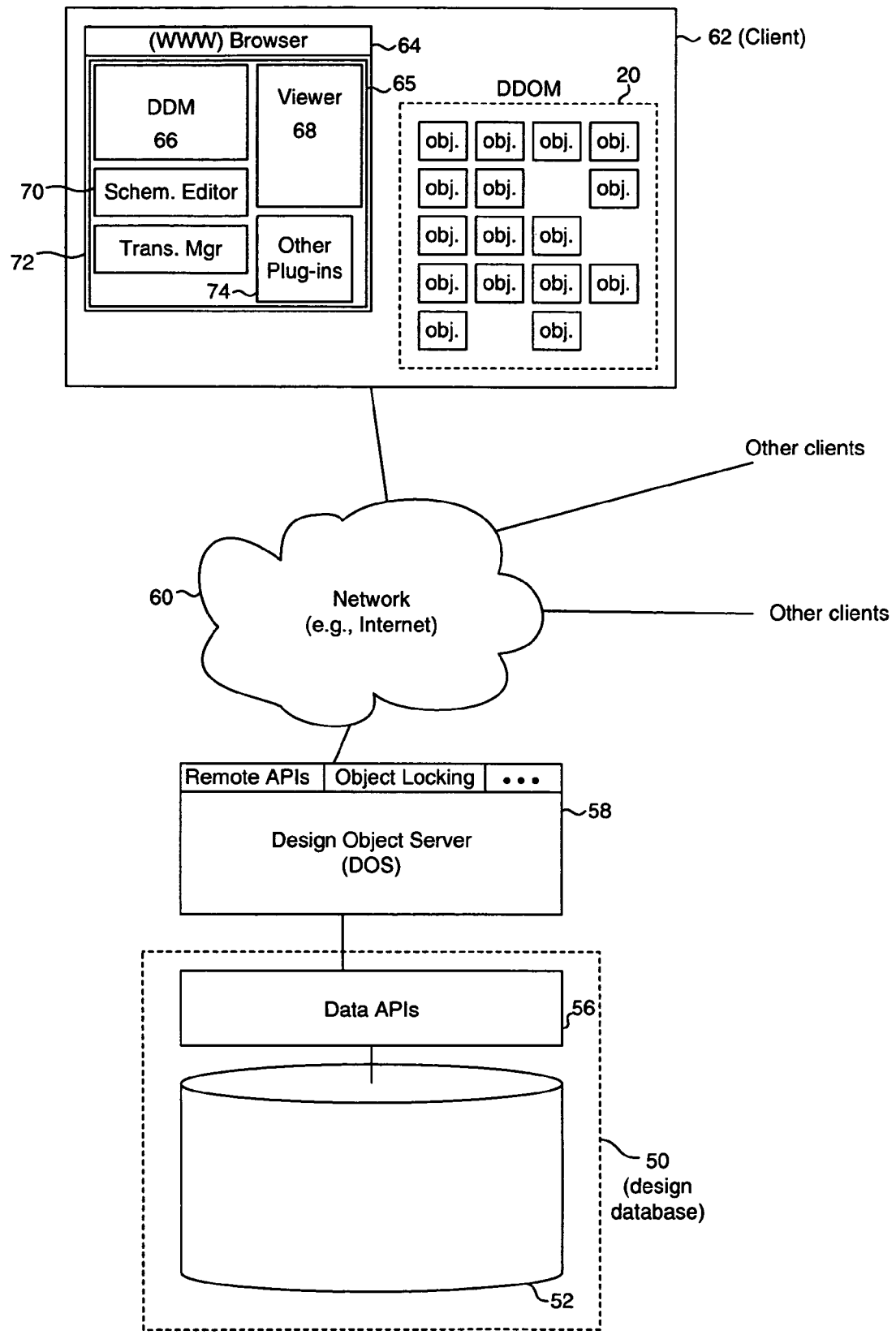
FIG. 7 is a block diagram showing an Electronic Design Automation (EDA) system architecture according to at least some embodiments of the invention.

FIG. 7 is a block diagram showing an architecture for an EDA system according to at least some embodiments of the invention. Design database 50 is located at the bottom of FIG. 7. Design database 50 stores data objects for one or more designs. Object-oriented databases are known in the art, and thus details of the operation of database 50 are not further described herein. Data in database 50 is accessed through a collection of data APIs 56. In at least some embodiments, design database 50 and data APIs 56 are implemented using the DMS design data management system and DATAFUSION APIs available from Mentor Graphics Corporation of Wilsonville, Oreg. Design database 50 is accessed through Design Object Server (DOS) 58. DOS 58, in turn, is accessed via network 60 by multiple clients 62 (for convenience, only a single client is shown in FIG. 7). Network 60 includes, in at least some embodiments, the Internet. However, network 60 may also include (or consist of) one or more Wide Area Networks and/or Local Area Networks. Client 62 may be any of numerous types of computer. Typically, a client computer will have one or more processors, memory, and some form of visual display (e.g., a video screen), as well as various devices for user input (e.g., a keyboard, a mouse, etc.). Such computers are well known, and thus not further described herein. Similarly, various aspects of the invention can be embodied as programming instructions on a medium readable by a computer or other device.

Executing on client 62 are various design applications 66-74. In at least some embodiments, these applications are implemented as plug-ins running within a container application 65. In at least some embodiments, the container application is written in the aforementioned JAVA programming language and can be run in three different modes: as an applet within a browser (such as the INTERNET EXPLORER browser program available from Microsoft Corporation of Redmond, Wash.); by invocation using JAVA WEB START (described at <http://java.sun.com/products/javawebstart/architecture.html>); or as a standalone application. These plug-ins, also written using the JAVA language, are designed to address different design and data management tasks. The creation of JAVA-based applications and plug-ins and execution of such applications and plug-ins in one of the above-described modes are well known in the art, and therefore not further described herein.

In the present example, plug-in 66 is a Design Data Manager (DDM). DDM 66 allows a designer to display a logical design element listing (such as the projects tree described above) and to edit those design elements. Plug-in 68 is a viewer application, and allows the designer to view the contents of (or other information about) one or more design elements (or other objects) selected in another application. Plug-in 70 is a schematic editor. Schematic editor 70 allows a designer to generate a schematic diagram from design data contained in DDOM objects, as well as to modify DDOM objects by manipulating graphical images on a displayed schematic. Plug-in 72 is a transaction manager, which is discussed in more detail below. Other plug-ins 74 could include an attribute editor (which allows a designer to edit one or more attributes of a design object), a constraint editor (which allows a front end designer to specify constraints for physical components that a back end designer may use to implement the logical design elements), a parts selector (which allows a designer to access one or more libraries), an output window (which displays status information from other plug-ins or scripts), and a scripting plug-in (which allows a user to write, paste and edit scripts; scripts are discussed below). Plug-ins 66-74 are only a few examples of the types of plug-ins executable by client 62 in connection with embodiments of the invention. Also stored in memory of client 62 are local copies of DDOM objects for one or more design projects.

Client Editing of Design Data

FIGS. 8A-8J provide illustrations of how a designer may use various client applications to modify, create and otherwise act upon various DDOM objects. It should be noted that the various user interfaces shown in FIGS. 8A-8J have been adapted for printed illustration and to comply with U.S. Patent and Trademark Office drawing requirements. Actual displays could include additional plug-in windows and/or show more information in a particular window. The size, number and content of windows shown in the drawings has been limited so as to, e.g., avoid use of very small type fonts.

Figure 8A:
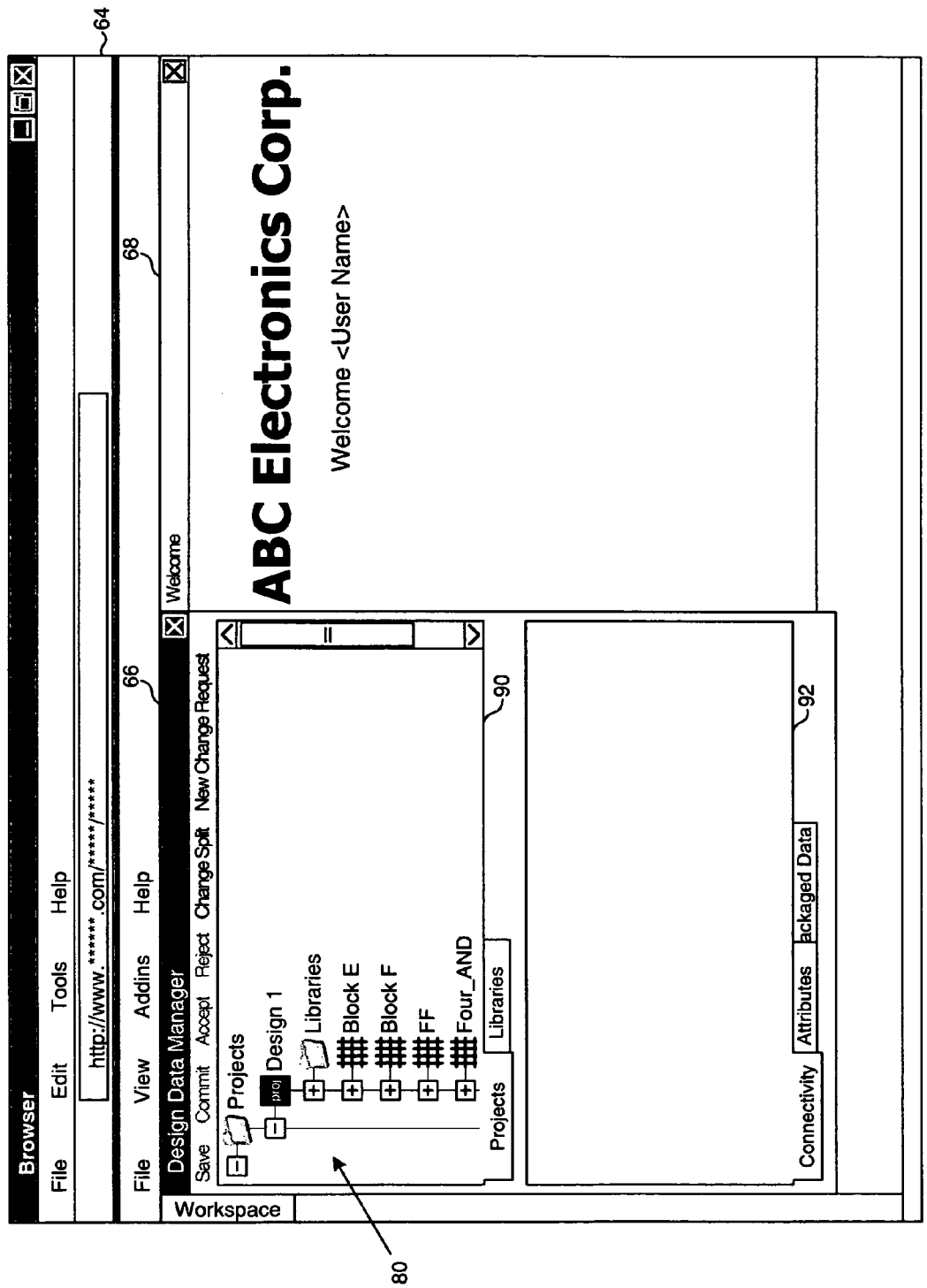
FIGS. 8A-8J show access and editing of design data according to at least some embodiments of the invention.

Shown in FIG. 8A is a user interface for DDM 66. A first pane 90 of DDM 66 contains selectable folder tabs labeled "projects" and "libraries." By selecting the projects tab, and as shown in FIG. 8A, the user is able to see a projects tree 80 displayed in pane 90. In at least some embodiments, DDM 66 includes a second pane 92. Pane 92 also includes various selectable tabs, such as "Connectivity," "Attributes" and "Packaged Data." As discussed in more detail below, selection of various tabs in pane 92 allows a user to obtain additional details about an object selected in pane 90. All of the tabs shown for pane 92 may not be present in a particular case. The available tabs in panes 90 and 92 can vary based on program configurations and/or the currently loaded project data. In at least some embodiments, selecting the "Change Split" command causes panes 90 and 92 to re-orient relative to one another (e.g., from pane 90 over pane 92 to panes 90 and 92 being side by side, or vice versa).

Also shown in FIG. 8A is a viewer plug-in 68. In at least some embodiments, viewer plug-in 68 performs various functions. When the front end design environment is initially loaded onto a client computer, viewer 68 provides a "welcome" screen as shown in FIG. 8A. The welcome screen can provide a portal by which a user may access administrative and other screens. The welcome screen can also be used to provide system messages (e.g., "database will be down for maintenance from 12:00 to 4:00 a.m."), to summarize design projects for the user, to summarize pending change requests for the user (change requests are discussed below), and to provide numerous other types of information. Viewer 68 also allows a user to view information about objects that may be selected in DDM plug-in 66. In some cases, that information may be in the form of a textual description of the selected object. In other cases, that information may be a schematic diagram or HDL code associated with the object.

Figure 8B:
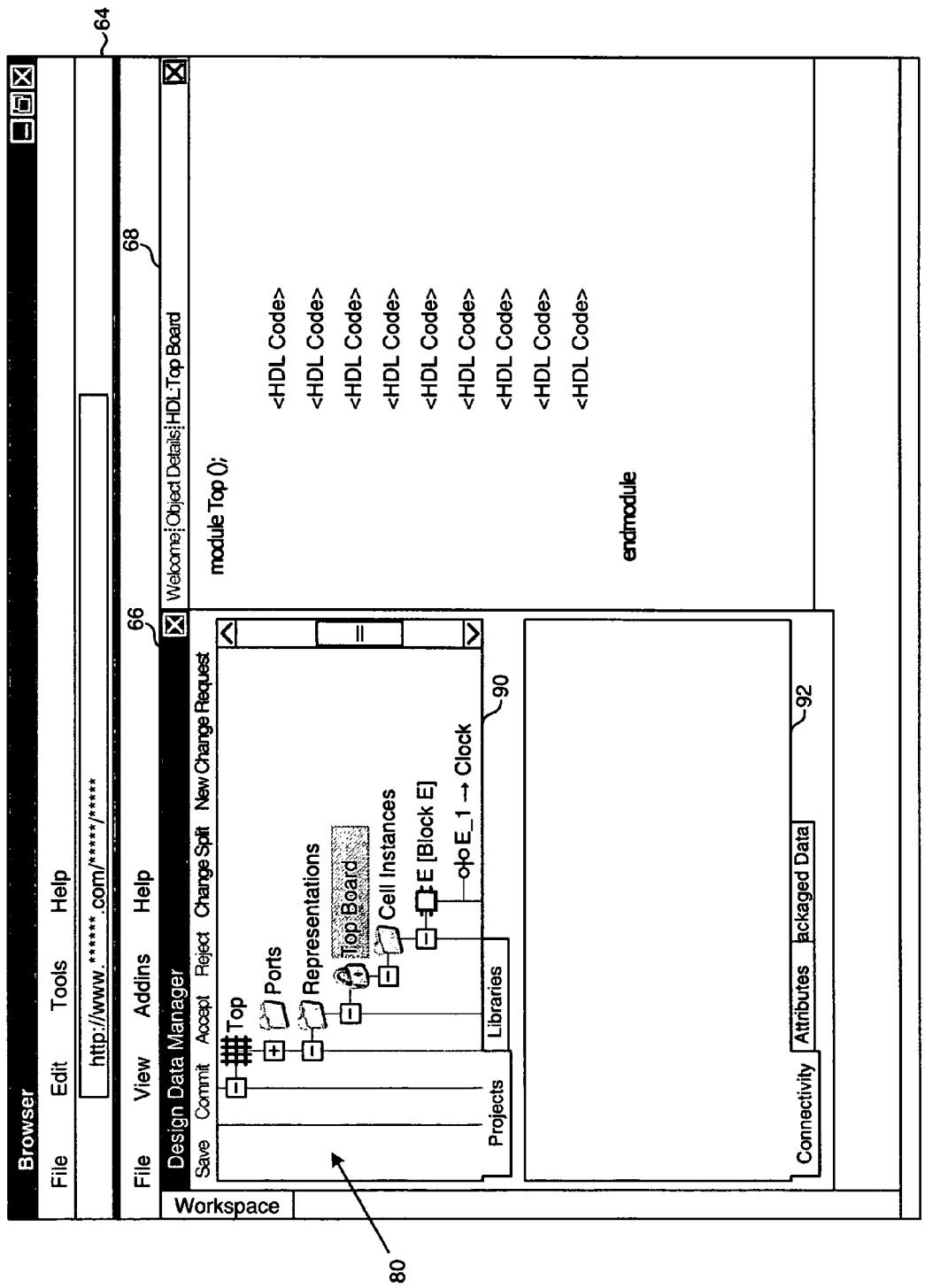
Figure 8C:
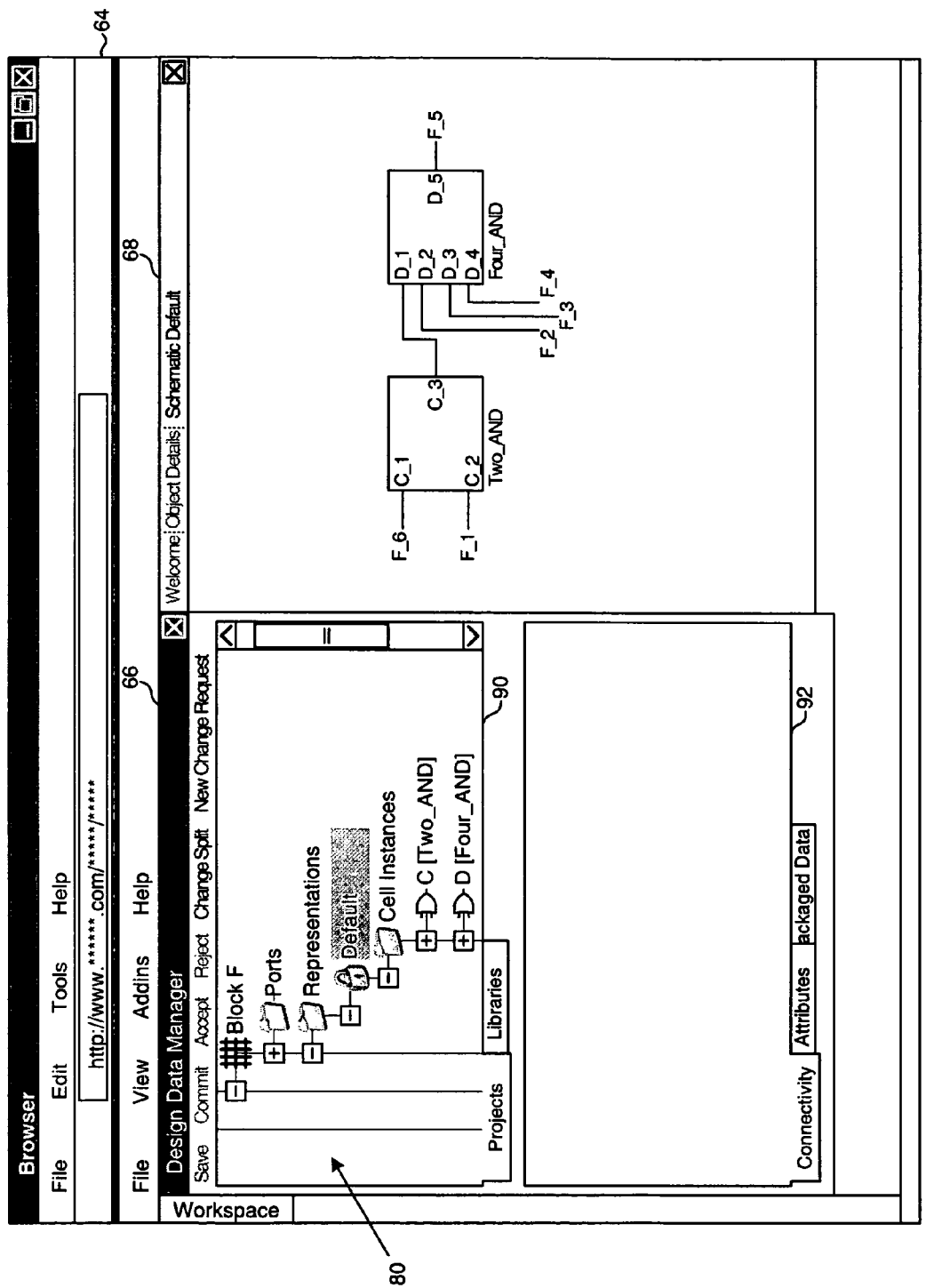

The projects tree in pane 90 can be expanded in a manner similar to that described in connection with FIGS. 6A-6T. When expanded, different parts of projects tree 80 may be seen by manipulating and on-screen scroll bar or other user interface. In FIG. 8B, HDL code for a selected Representation object is shown in viewer 68. In FIG. 8C, a schematic diagram for a selected Representation object is shown.

Figure 8D:
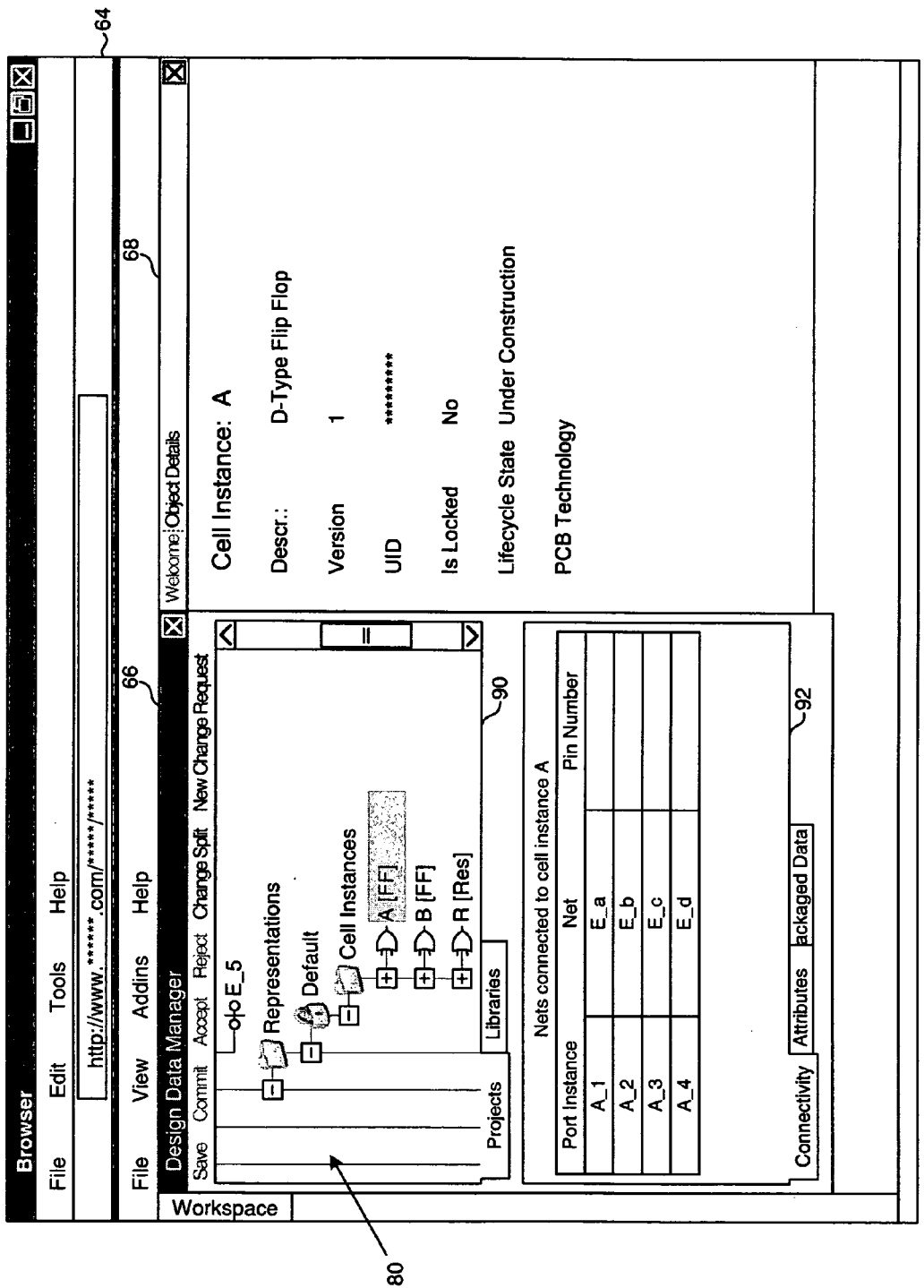

FIGS. 8D-8J further illustrate selection of elements in projects tree 80. In FIG. 8D the user has selected a node for CellInstance object A. Upon selection, details of object A are displayed in viewer 68 and in pane 92 of DDM 66. As shown in FIG. 8D, the "Connectivity" tab is selected in pane 92, and indicates the "port instances" and "nets" associated with CellInstance object A. The third column ("pin number") is used to provide information regarding the number assigned by a back end designer to a pin of a physical component that will implement cell instance A. Physical design data (or layout data) is discussed in more detail below. Additional details are also shown in the "Object Details" view of viewer plug-in 68. The displayed information includes the name of the selected object ("Cell Instance: A"), a description of the object ("D-Type Flip-Flop"), version information ("Version 1"), an unique identification number ("UID *******"; throughout this description and drawings, multiple asterisks indicate an arbitrary collection of characters) and whether or not the object is locked. As explained in more detail below, an object in a design is locked by DDM 66 when another user selects that object. Locking an object prevents other users from editing the object. Viewer 68 may also provide the lifecycle state for a selected object. In the example, the selected object is "under construction," meaning that the design incorporating this element is still being developed. If the design was complete, the lifecycle state might indicate that the design is "in production." In that case, and as described in more detail below, a user could be required to undertake additional steps to modify a design element. Viewer 68 further indicates a technology type for the selected element. In the example, the technology is "PCB Technology." In FIG. 8E, the Attributes tab is selected in pane 92**, and shows various attributes of another selected object.

Figure 8E:
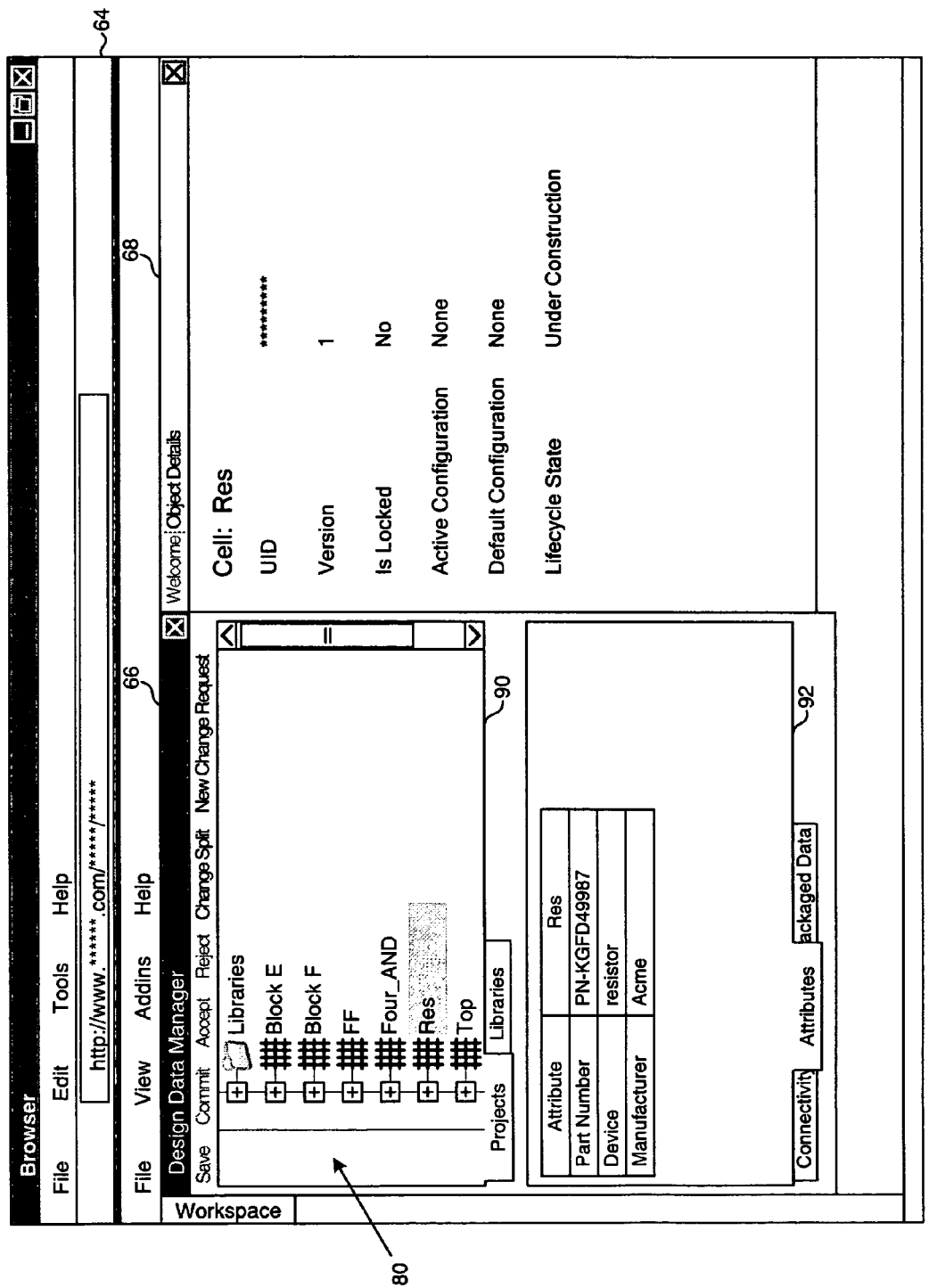

FIGS. 8D and 8E merely provide some examples of the types of information that might be displayed in viewer 68 and/or in pane 92. In other embodiments, some of the information shown in FIGS. 8D and 8E might not be displayed, and/or other types of information provided (e.g., manufacturer name and part number for a corresponding component, special warnings regarding a long purchase lead time for a part, identification of parts libraries containing the part, etc.). In at least some embodiments, the user may also configure DDM 66 and/or viewer 68 to display only desired information. Of course, the type of information displayed by viewer 68 and/or pane 92 may also change based on the type of design element selected. In at least some embodiments, additional information about a particular object may be included in the projects tree (e.g., as parentheticals beside the object name, as an additional "information" node, etc.). For example, a version of an object could be shown in the object name portion of the tree (e.g., "A[FF(1)]," where "(1)" indicates version number 1).

Figure 8F:
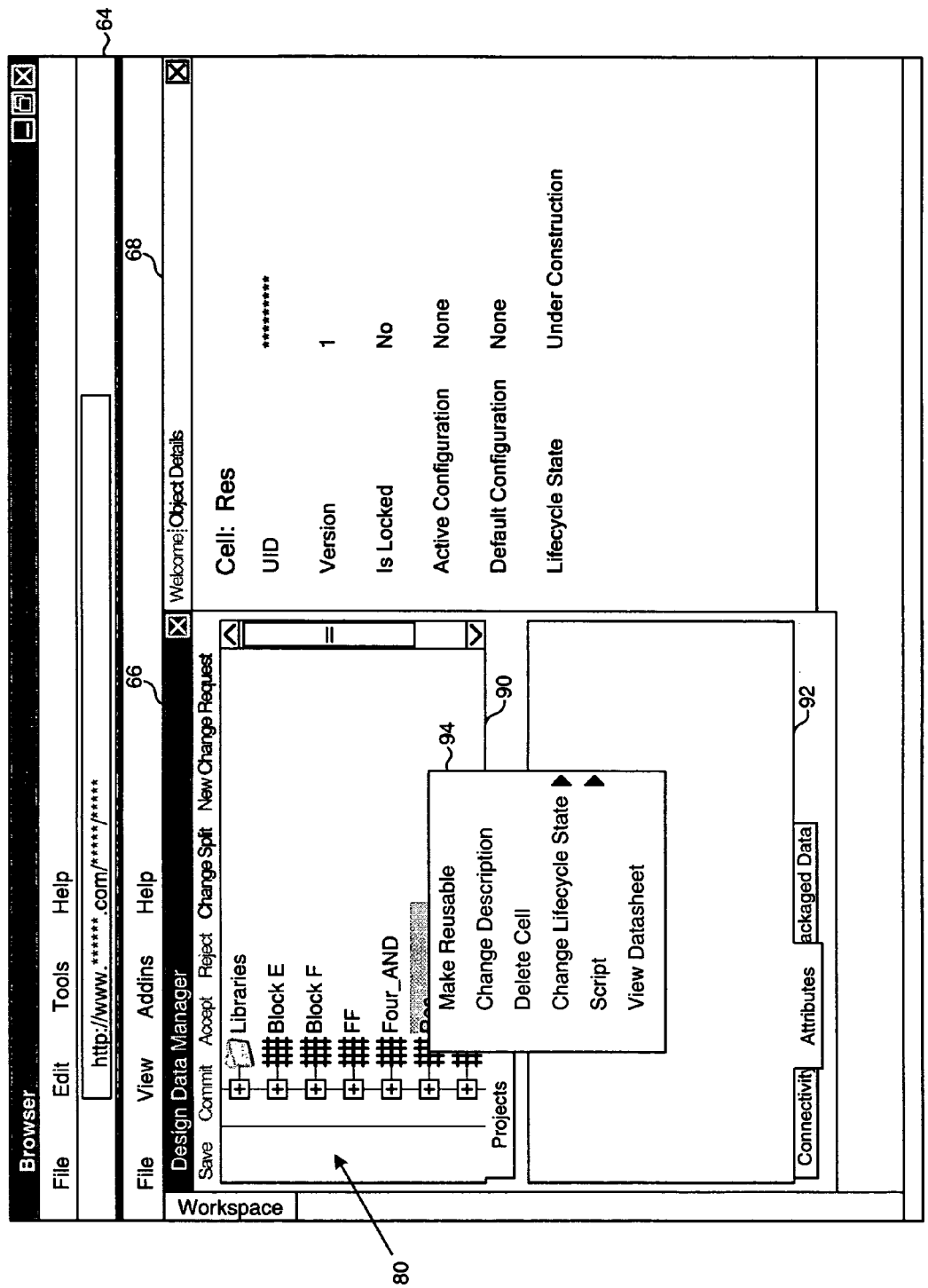

Using DDM 66 and/or other plug-ins executing on a client, a designer can make changes to a design in various manners. FIGS. 8F-8I illustrate ways in which a designer can make design modifications using DDM 66. In at least some embodiments, a designer may select a design element in the projects tree using a computer mouse. When the designer selects a node on the tree (using, e.g., a "right click"), the designer is provided a context menu presenting various options. For example, as shown in FIG. 8F, the designer has right-clicked upon a projects tree node for a Cell object, bringing up a context menu 94. The first selection in context menu 94 ("Make Reusable") makes the selected cell accessible by other users and/or projects, and may cause the selected cell to be added to one or more libraries (i.e., associated with one or more Library objects). The "Change Description" menu option allows a designer to add, delete or modify textual information used to describe the Cell object. The "Delete Cell" option permits a designer to delete the object. The "Change Lifecycle State" option allows a designer to change the lifecycle state for the object. The "Script" option allows a designer to execute one or more scripts with regard to the selected object. For example, a script may be selected and executed for a Cell object to automatically perform certain tasks applicable to that object. The "View Datasheet" option allows a user to see information for a particular electronic component associated with a particular design object. For example, a datasheet for the Res Cell object (FIG. 6A) could include information such as manufacturer name, part number, tolerances, etc.

Figure 8G:
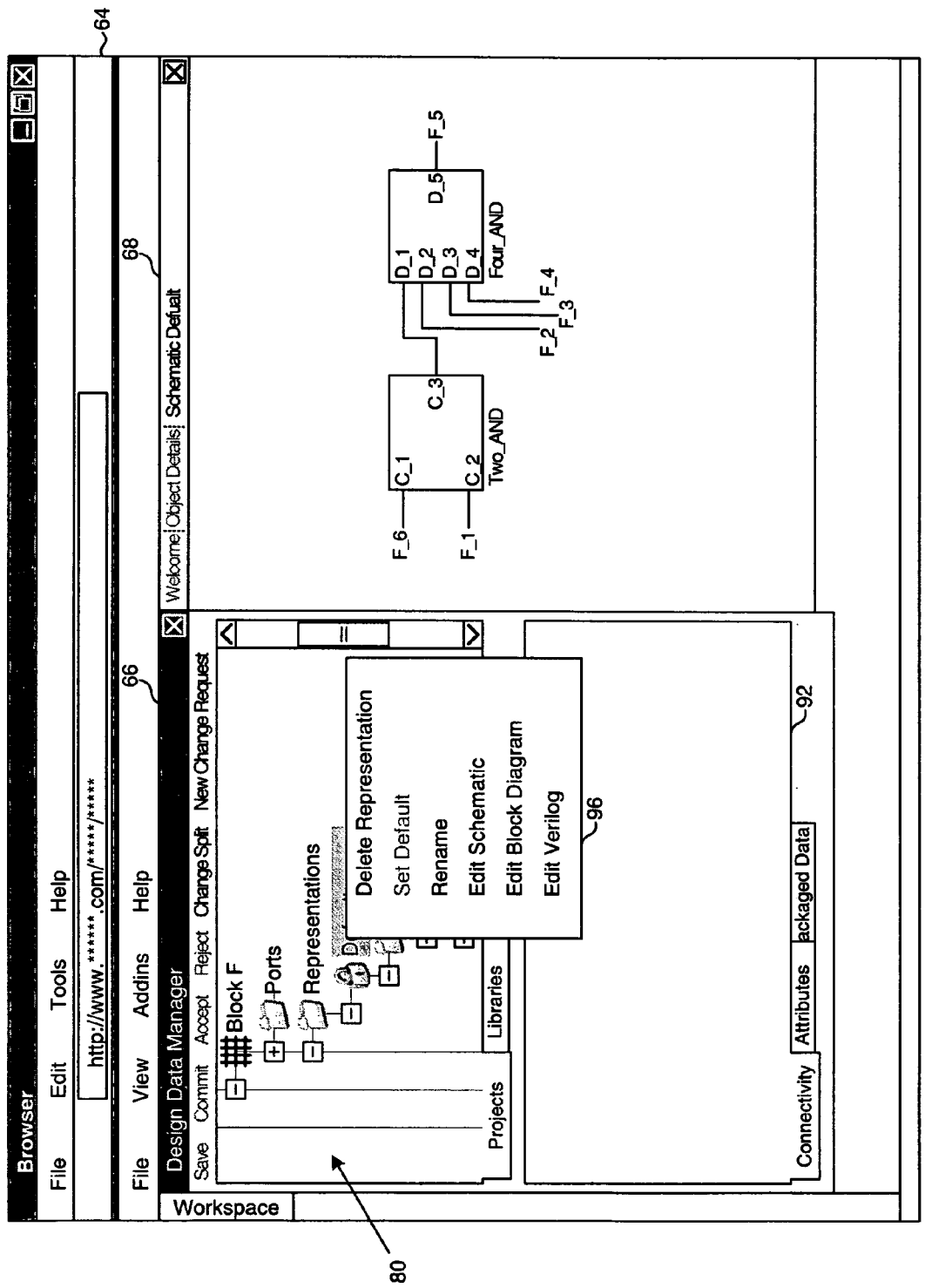

In FIG. 8G, the designer has right-clicked a Representation object to display another context menu 96. The "Delete Representation" option allows a designer to delete the object. The "Rename" option allows renaming of the object. The "Set Default" option allows the designer to make a particular representation the default representation for its associated Cell object. The "Edit Schematic," "Edit Block Diagram" and "Edit Verilog" permit a designer to edit these types of views of the object.

Figure 8H:
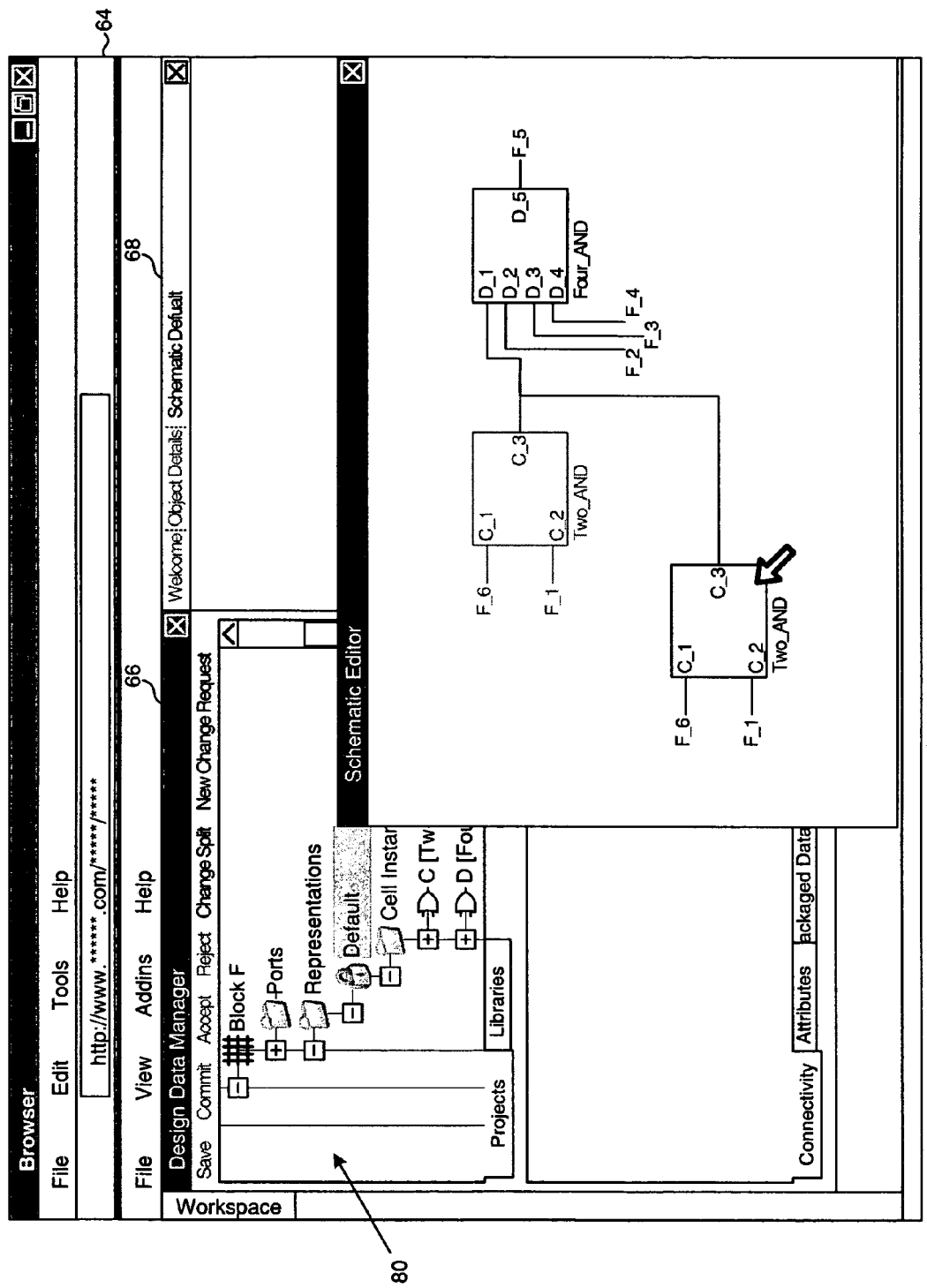

Editing of a schematic for a selected object is shown in FIG. 8H. After selecting "edit schematic" in context menu 96, a separate schematic editor 98 is invoked. Using schematic editor 98, the user can move symbols in the schematic, add or delete symbols, etc. In some embodiments, viewer 68 can also operate as an editor. Changes made to the schematic are back-propagated to the selected representation object, and any necessary changes to the project tree automatically made. In at least some embodiments, graphics for a schematic are automatically generated in real-time based on the connectivity information for a selected element in the DDM projects tree. A specific graphical symbol for a particular type of component may be associated with a Cell object (e.g., as an attribute). Even if a specific symbol is not associated with a Cell object, a block or other graphic having the proper number of ports can be automatically generated. As another example of automatic schematic generation, a group of Net objects can be selected in the DDM and a graphic automatically generated to show components receiving the signals corresponding to those Net objects.

Returning to FIG. 8G, "edit block diagram" in menu 96 allows a user to edit (using a separate block diagram editor or viewer 68) a block diagram for the selected object. In at least some embodiments, a block diagram is similar to a schematic diagram, but may not use conventional schematic symbols. "Edit Verilog" in menu 96 allows a user to edit (using a separate HDL editor, a text editor, or viewer 68) Verilog or other HDL code for a selected object. As with the "edit schematic" option, changes made to a block diagram or HDL code for an object are back propagated to the object, and the projects tree updated automatically.

Figure 8I:
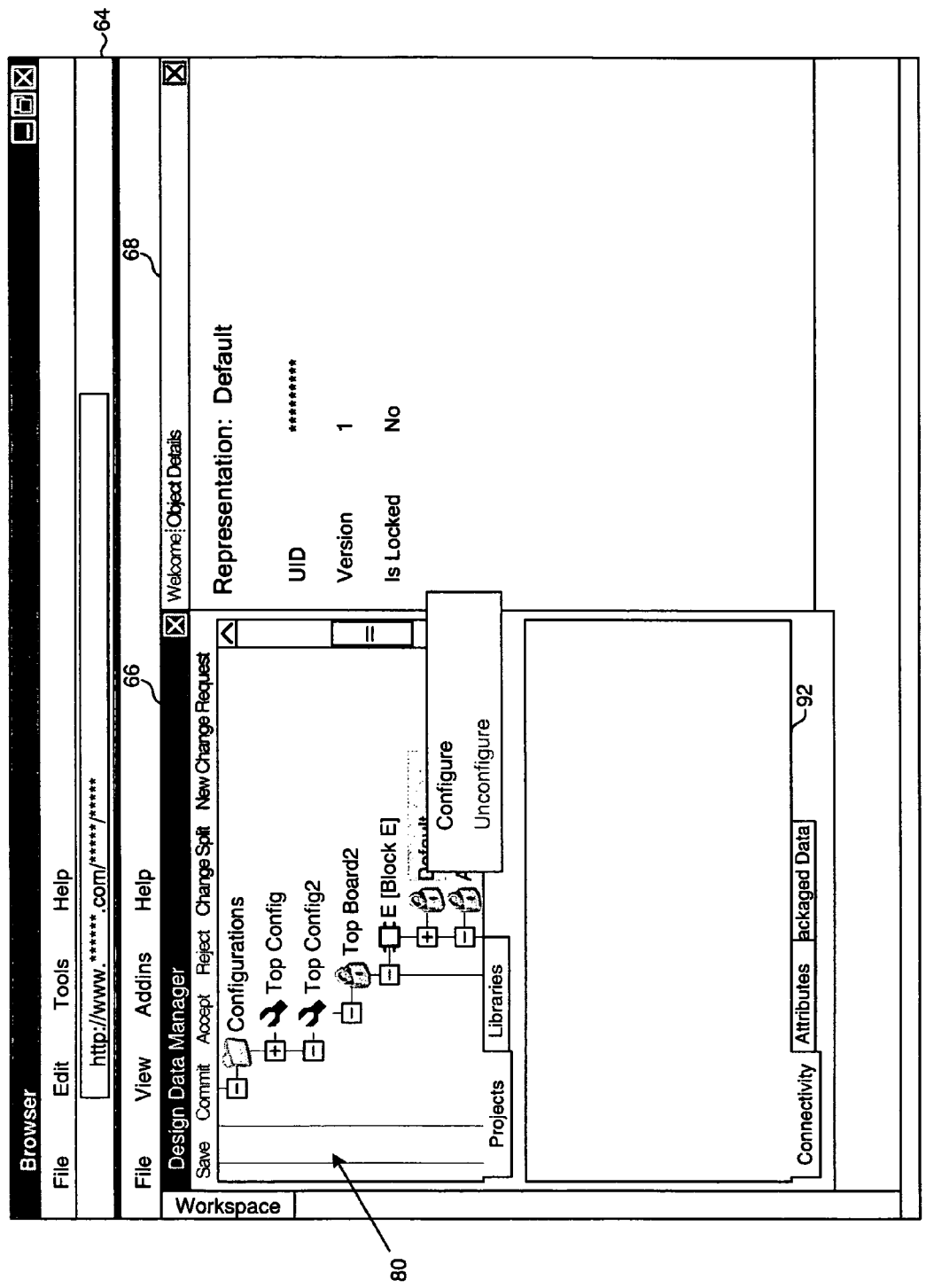

In FIG. 8I, the designer has right-clicked a representation node within a hierarchy shown under the Configurations node to invoke a context menu 98. If the selected Representation object is not currently specified by the active Configuration object for the top level Cell object in the hierarchy, the "configure" command causes the Representation object to be specified by the active Configuration object. If a Representation object is already specified by the active configuration of the top level Cell object, "unconfigure" will cause the Representation object to no longer be specified.

DDM user interfaces for editing a design can be invoked in other manners. In at least some embodiments, a designer may first select an element in the projects tree (by, e.g., clicking once with a left mouse button), and then select various pull-down menus from a tool bar or other menu. Changes to a design can also be made using other plug-ins in combination with the DDM plug-in. For example, a designer may select a design element listed in another plug-in window (e.g., a window for a parts library database viewer) and then drag and drop that element into a particular location on the projects tree. Upon doing so, a dialog (not shown) can be automatically displayed to obtain any additional information needed from the designer to complete the modification. In some embodiments, a separate interconnect table plug-in (not shown in the drawings) can be invoked. Upon selection of a Representation object in the projects tree, for example, a table is displayed. Rows of that table may correspond to Net objects, with columns corresponding to CellInstance objects. An appropriate symbol in a row/column intersection signifies a connection between a Net object and a specified PortInstance object. By selecting a field of the table and modifying the entry (e.g., "B" for bidirectional connection), connectivity between Nets and CellInstances is changed. These changes are then back-propagated to the appropriate objects and the projects tree updated. The interconnect table (or other spreadsheet) can also be used to initially populate a projects tree.

Figure 8J:
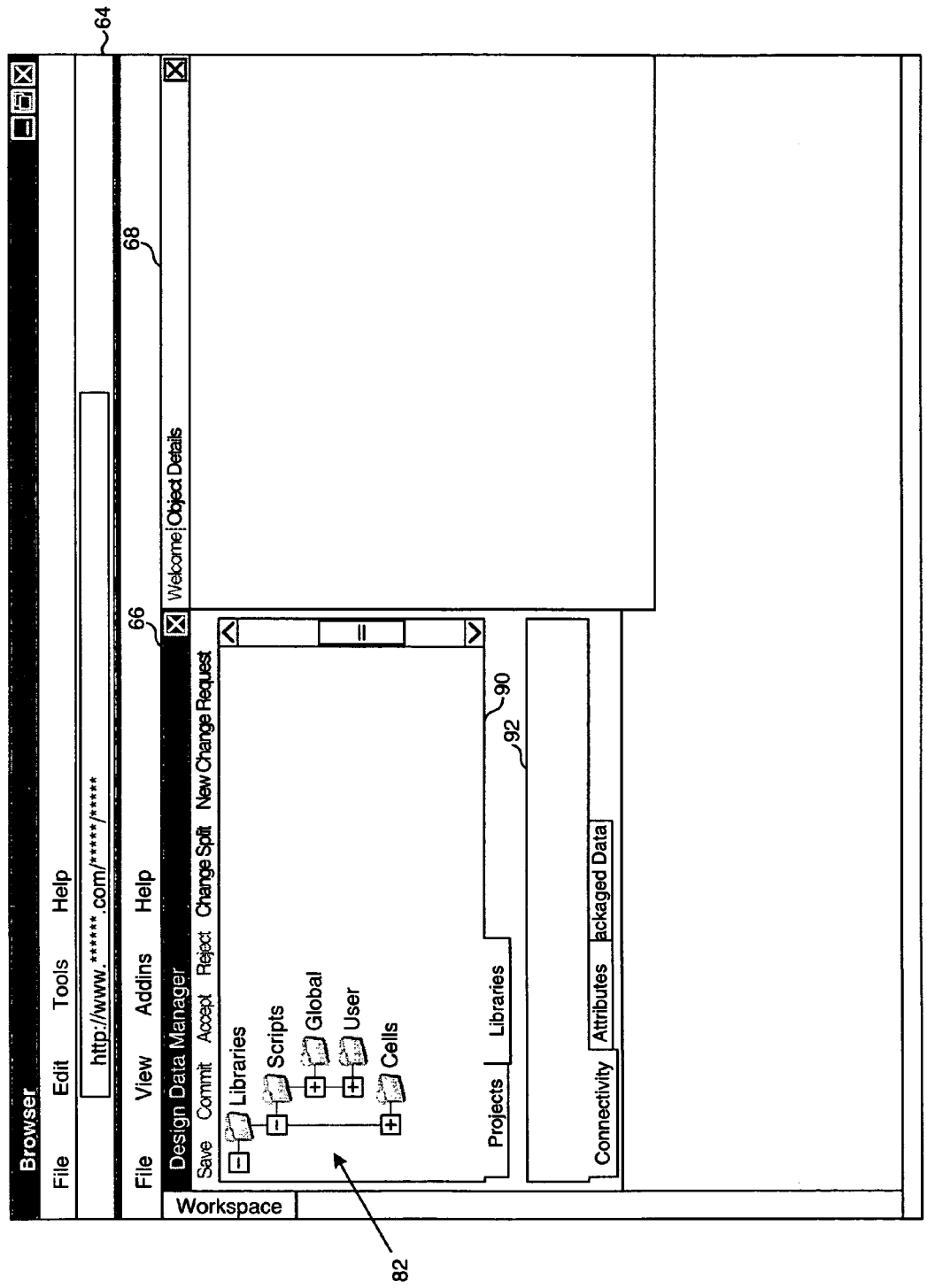
Figure 8K:
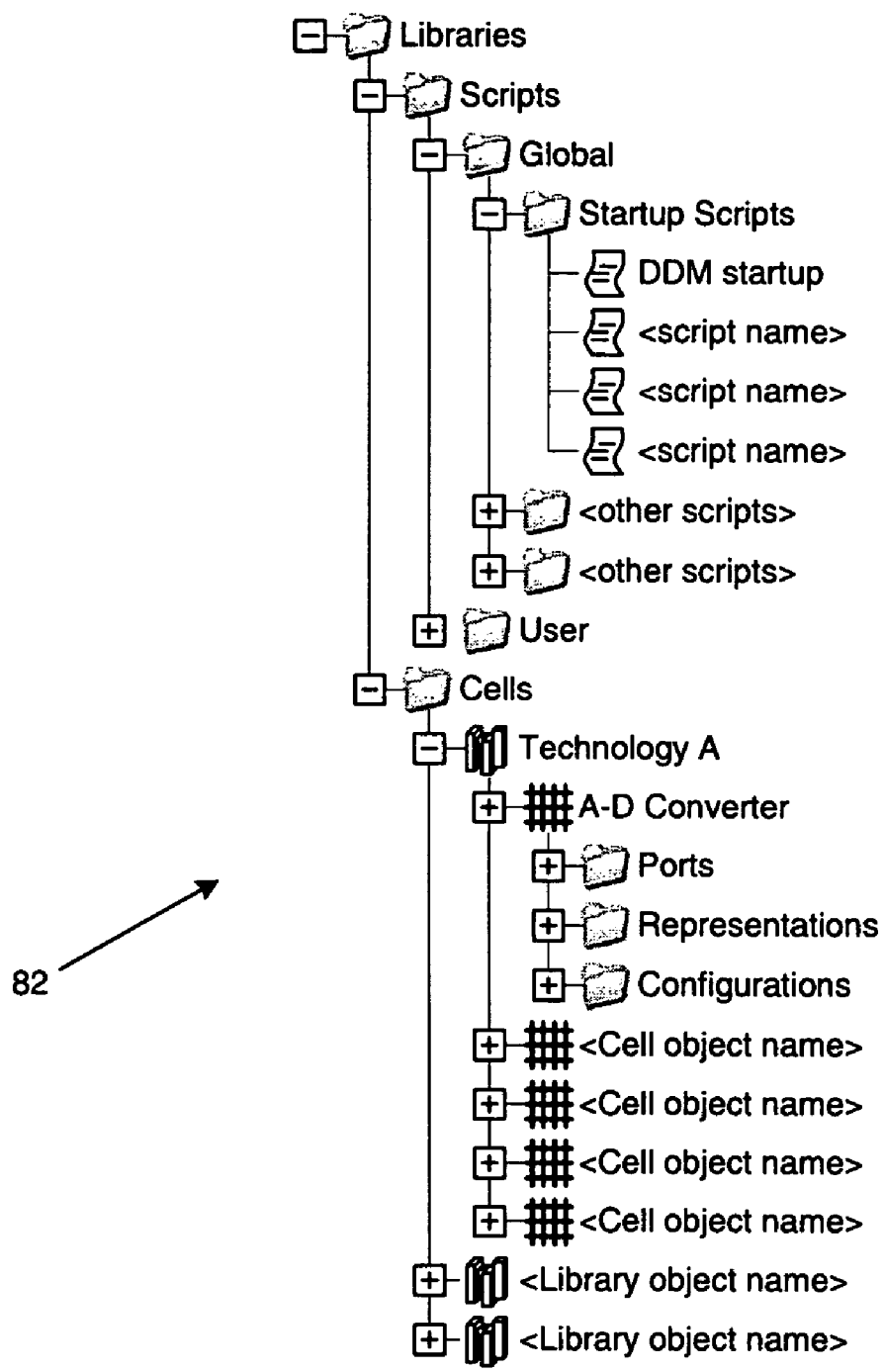
FIG. 8K is a drawing of a libraries tree according to at least some embodiments of the invention.

FIG. 8J shows the "Library" tab of DDM pane 90 selected. Displayed in pane 90 is a "libraries" tree 82. For convenience, tree 82 is shown in FIG. 8K in a more expanded form. The first node under the Libraries node is labeled "Scripts." As explained in more detail below, scripts are used in at least some embodiments of the invention to automate manipulation of various design data objects, to configure front end design program(s), and for various other purposes. Users may select these scripts from the projects tree and then edit and/or execute those scripts. Some scripts are "global," i.e., applicable to all (or many) system users. Other scripts may be specific to a particular user ("User"). Various scripts and script folders are identified generically in FIG. 8K as <script name> or <other scripts>. A node for "Cells" follows the "Scripts" node. Listed under the Cells node are nodes for various Library objects (the first is called "Technology A"). Under each Library object node are entries for one or more Cell objects which a user can add to a design (i.e., associate with a particular Project object). Various Cell objects and Library objects are also identified generically in FIG. 8K.

Projects tree 80 also contains a node for "libraries" (see, e.g., FIG. 8A). A libraries node in the projects tree lists Library objects associated with a particular Project object. For example, the libraries node in FIG. 8A would contain Library objects associated with the "Design 1" Project object. The libraries tree 82 under the "Libraries" tab lists Library objects accessible by a particular user. This will often (though not necessarily always) include more Library objects than are listed under a projects tree libraries node.

Communicating Design Changes

Figure 9:
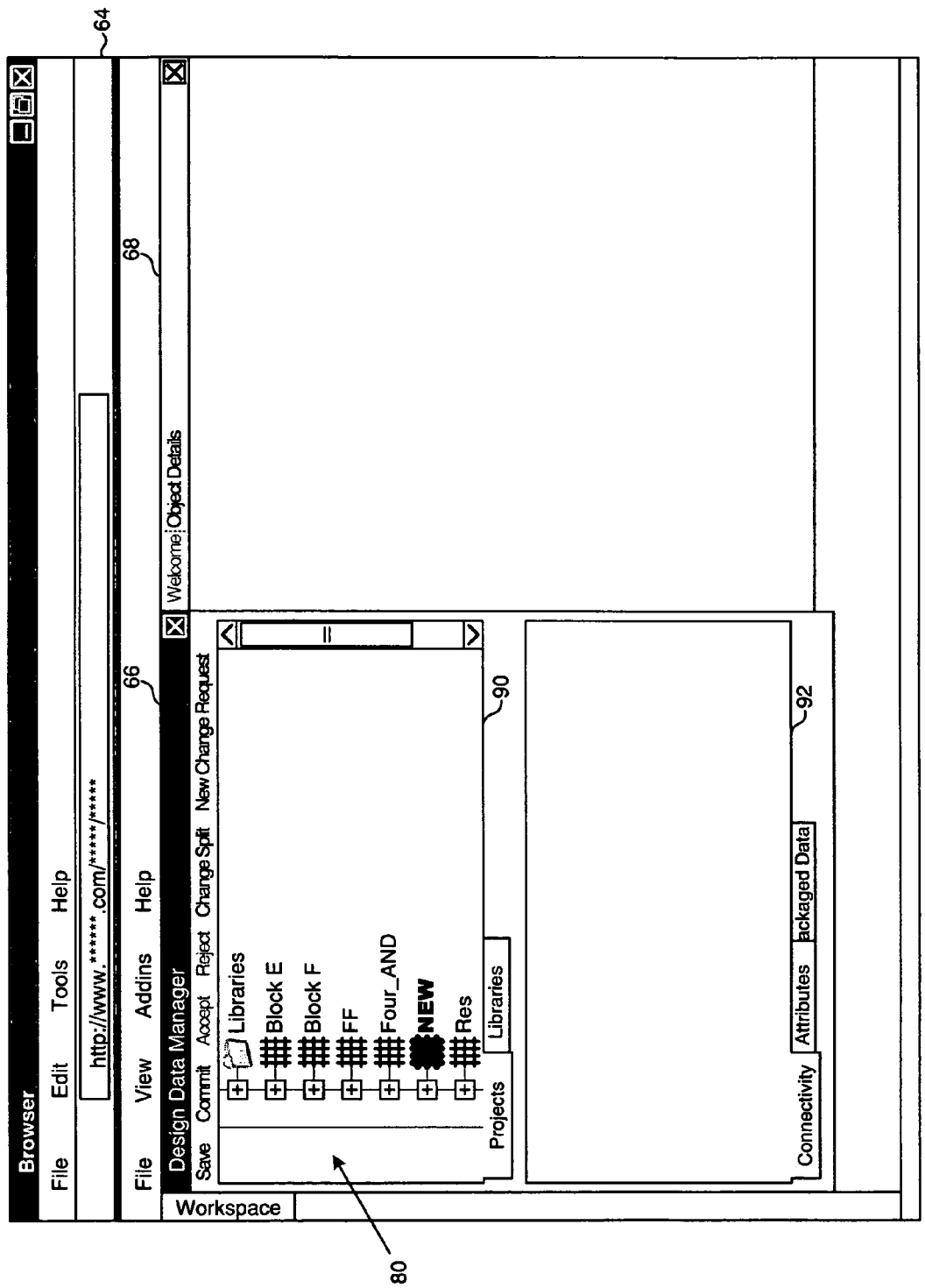
FIG. 9 is a user interface, according to at least some embodiments of the invention, displaying an uncommitted design data change.

In FIG. 9, a user has modified the "Design 1" Project object by adding a new Cell object ("New"). The associated design data changes have not been incorporated into design database 50 (FIG. 7) at this point, and are thus shown in a different color in projects tree 80. If the user wishes the changes to be incorporated into design database 50, the user can select the "Commit" command. Upon doing so, a transaction containing the requested changes is sent from the client to DOS 58, as described below. If the user wishes to save the changes, but does not yet wish to make those changes part of design database 50, the user can select the "Save" command. Saved changes are stored by DOS 58 and can be retrieved by the user for further consideration and/or modification. Upon later retrieval of the saved changes, the user can commit those changes, further edit those changes, or discard those changes. The "Change Request" button is described below.

In at least some embodiments of the invention, each editing action by a user at a client is tracked by DOS 58. When a first user at a first client selects an object for editing, DOS 58 detects that selection and sends a message to other clients. DDM plug-ins at those other clients then lock the object. Users at those other clients are prevented from editing the selected object while it is locked. As the first user makes design data edits pertaining to the selected object, each edit is detected by DOS 58 and cached in a temporary memory. When the first user decides to incorporate those edits into design database 50 and selects the "Commit" command, a transaction manager plug-in on the first client forwards a transaction to DOS 58 instructing that those changes (which have been cached by DOS 58) be updated to design database 50. After DOS 58 does so, DOS 58 sends transactions to other clients instructing the DDM plug-ins at those clients to release the locked object, as well as providing information to the other clients, about the changes made by the first client. The other clients may then update their local copies of the design data to reflect those changes.

Figure 10A:
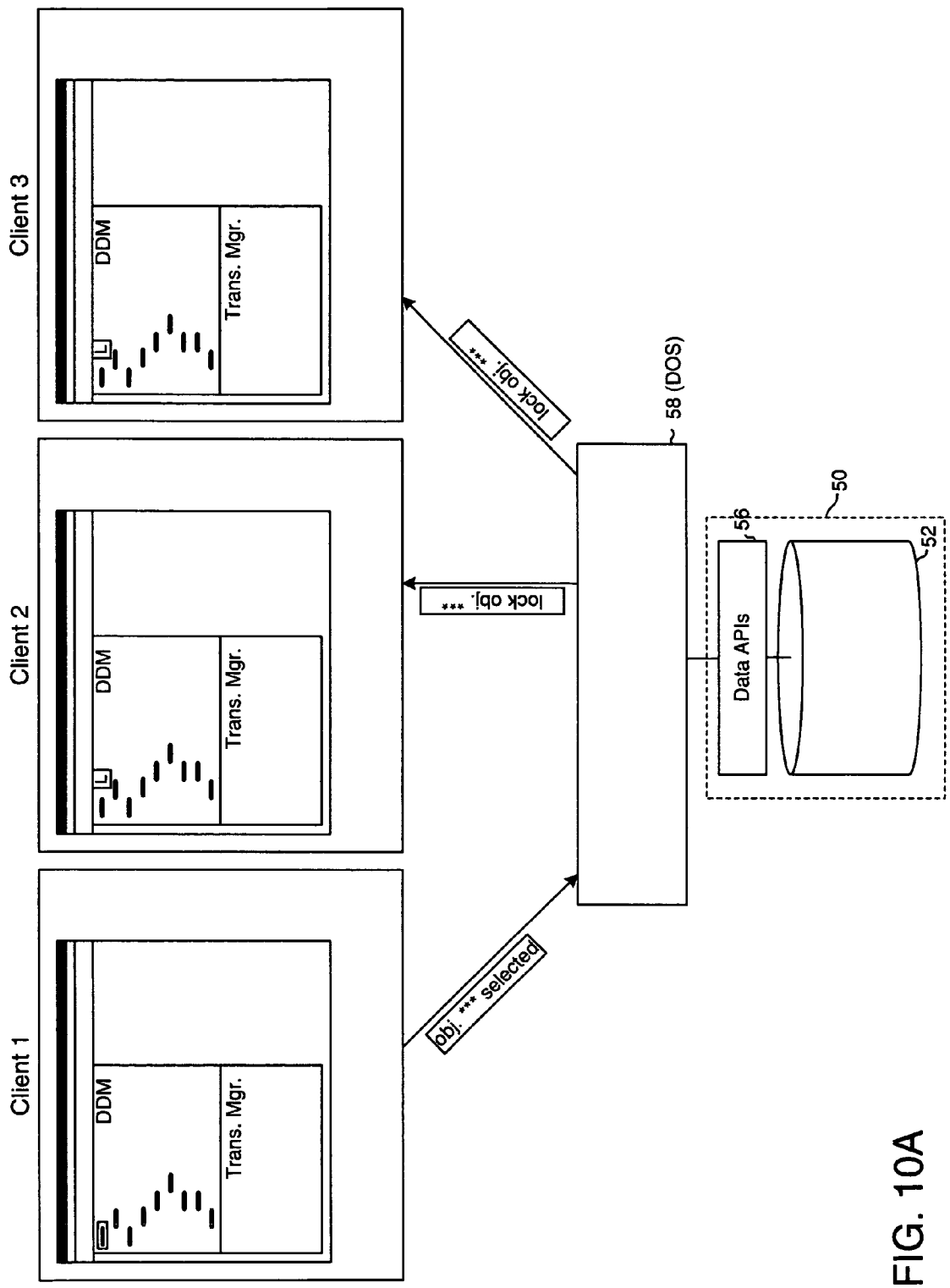
FIGS. 10A-10C illustrate communications between clients and a design object server according to at least some embodiments of the invention.
Figure 10B:
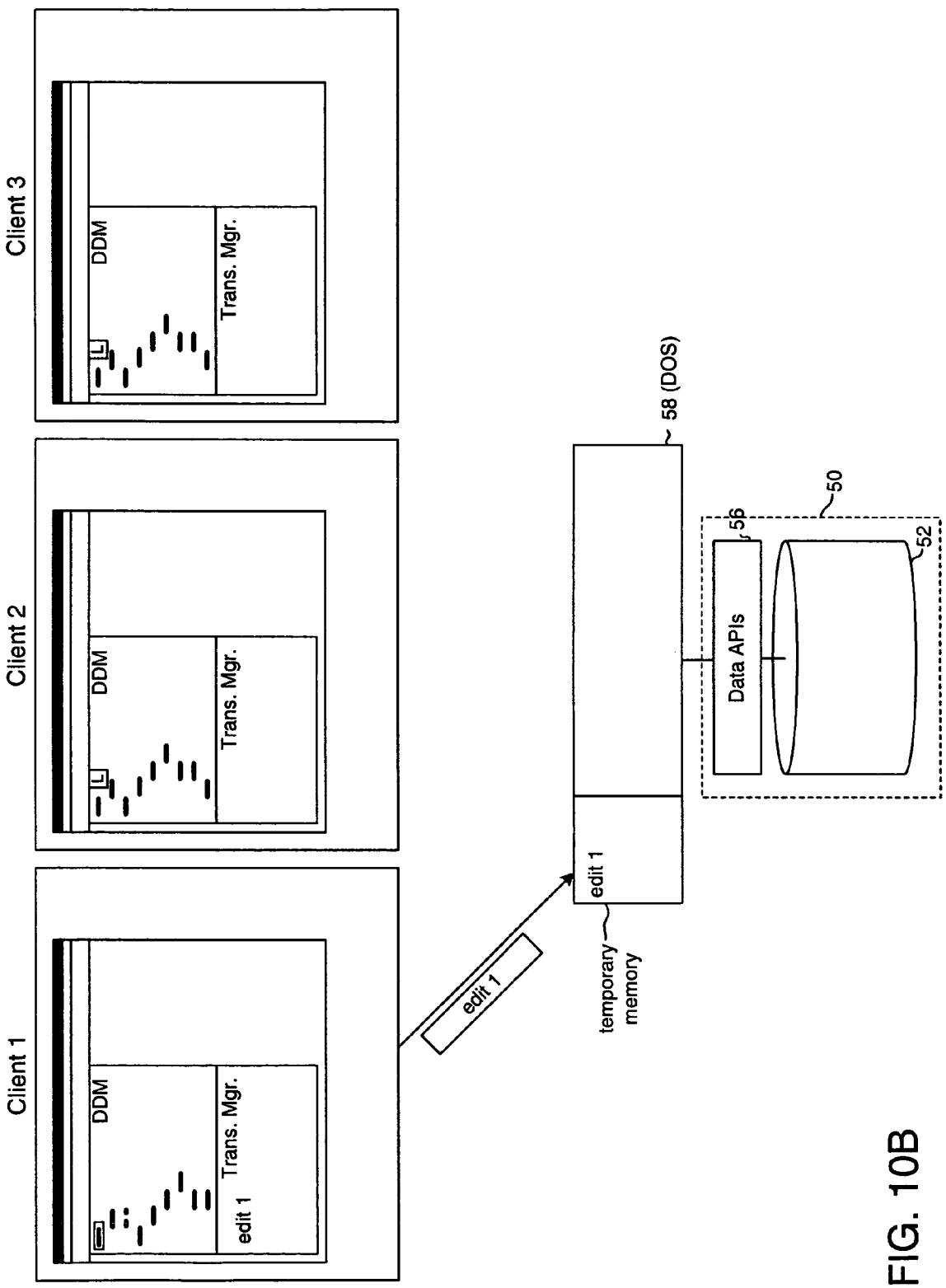
Figure 10C:
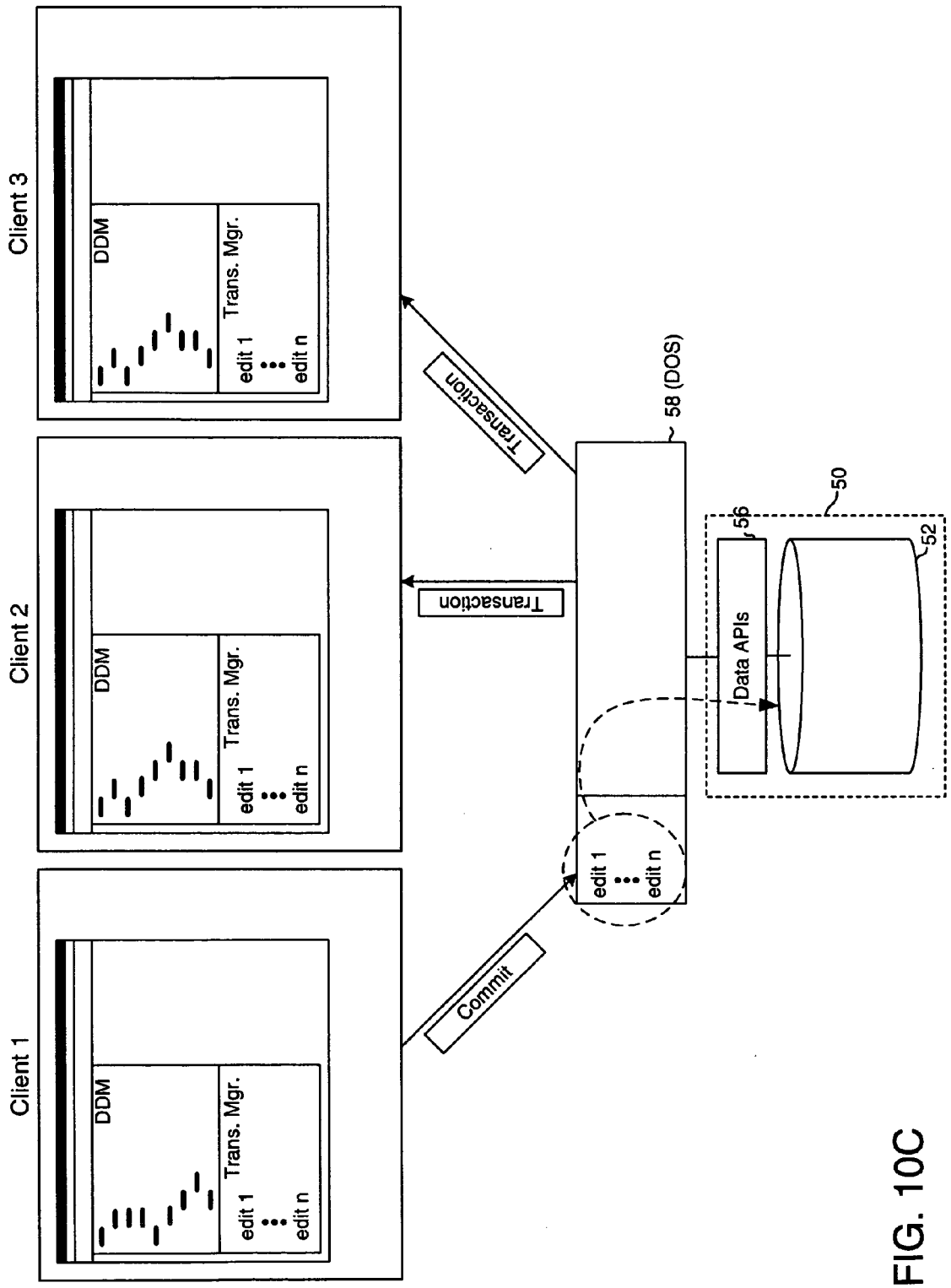

FIGS. 10A-10C are a sequence of diagrams illustrating these events. In FIG. 10A, the user at client 1 has selected an object in a projects tree. Although this selection is made within the DDM plug-in, the selection is also detected by a transaction manager plug-in (e.g., the mouse click event is detected by both the DDM and the transaction manager plug-ins). The transaction manager then sends a message to DOS 58 indicating the object has been selected. In response, DOS 58 sends messages to clients 2 and 3 indicating that the selected object should be locked. The DDM plug-ins at clients 2 and 3 lock the selected object and indicate this locked status with an icon adjacent to the object in the projects tree (shown as a boxed "L" in FIG. 10A) or in another suitable manner. If a user at client 2 or client 3 selects one of the locked objects, the user will be informed (via a document viewer plug-in, via a pop-up dialog, or otherwise) that the object is locked (i.e., read-only) and cannot currently be edited.

In FIG. 10B, the client 1 user has made a first edit ("edit 1") using the DDM plug-in. The user may have added a new object that is associated with the selected object, may have modified the connectivity or an attribute of the selected object, or may have performed numerous other types of editing tasks. The user does not yet wish to incorporate the edit into design database 50. The client 1 transaction manager plug-in also detects the edit, notes same, and sends a message advising DOS 58 of the edit. DOS 58 caches the edit in temporary memory, but does not notify other clients or attempt to update the edit to design database 50. Activity then proceeds in a similar manner with regard to additional edits. In alternate embodiments (not shown in FIGS. 10A-10C), modifications to DDOM objects are not transmitted to DOS 58 until a user decides to incorporate those changes into the design database.

In FIG. 10C, the client 1 user has made n edits ("edit 1" through "edit n"). If the client 1 user had decided not to incorporate edits 1 through n into design database 50, but still wanted to save those edits for future consideration, the client 1 user could have selected the "Save" command. The edits cached by DOS 58 would then be saved to a file storage system or other non-volatile storage (not shown in FIG. 10C), and would be available for future retrieval by the client 1 user, but would not be incorporated into design database 50. In the current example, the client 1 user decides to incorporate edits 1 through n into design database 50. Upon selecting the Commit command in the client 1 DDM plug-in, the client 1 transaction manager plug-in sends a transaction to DOS 58 instructing that edits 1 through n be incorporated into design database 50. DOS 58 does so via data APIs 56. DOS 58 also sends transactions to clients 2 and 3 containing edits 1 through n (e.g., copies of objects modified or added, scripts containing instructions to delete objects that may have been deleted, etc.), as well as an instruction to release locked objects.

Figure 11A:
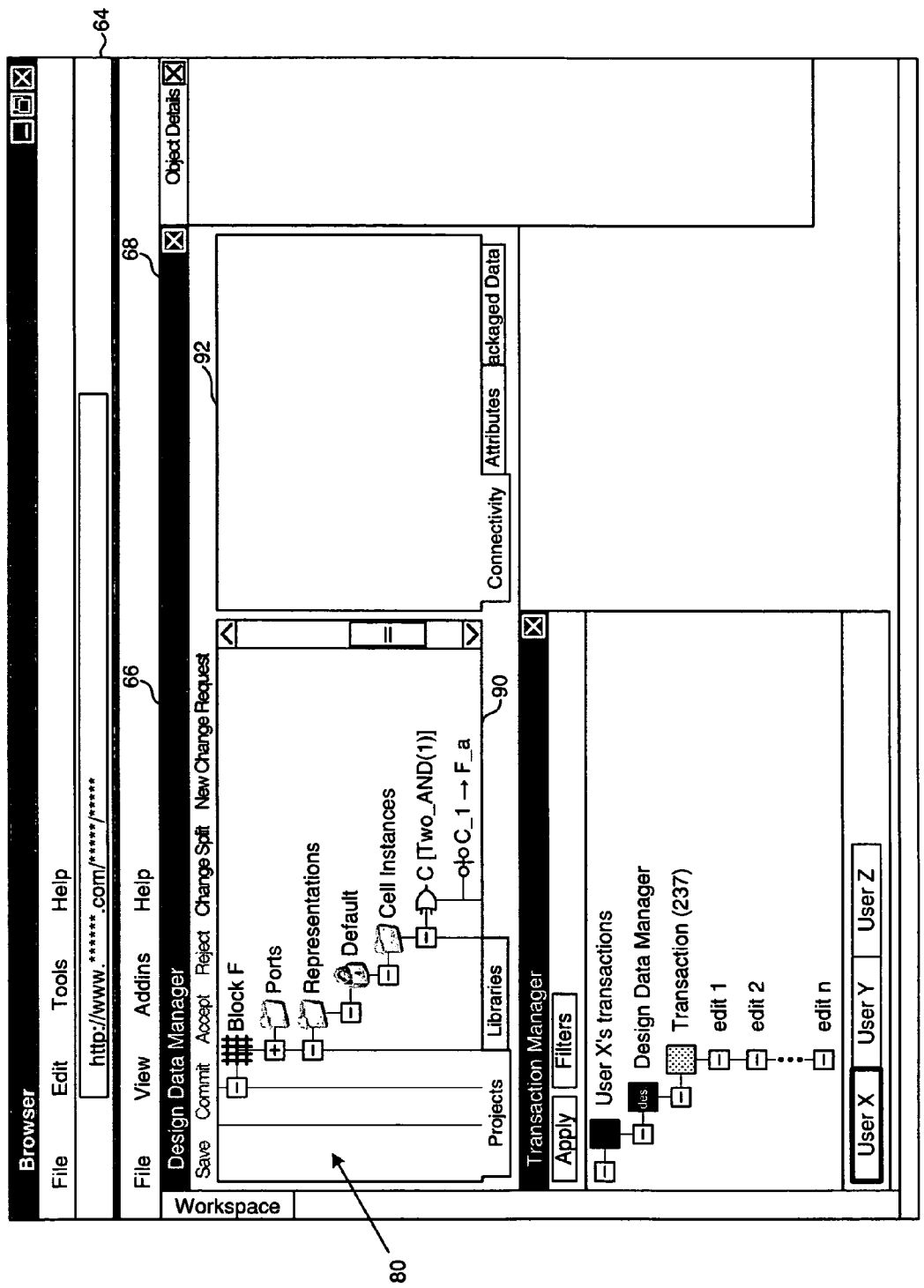
FIG. 11A shows a transaction manager user interface according to at least some embodiments of the invention.
Figure 11B:
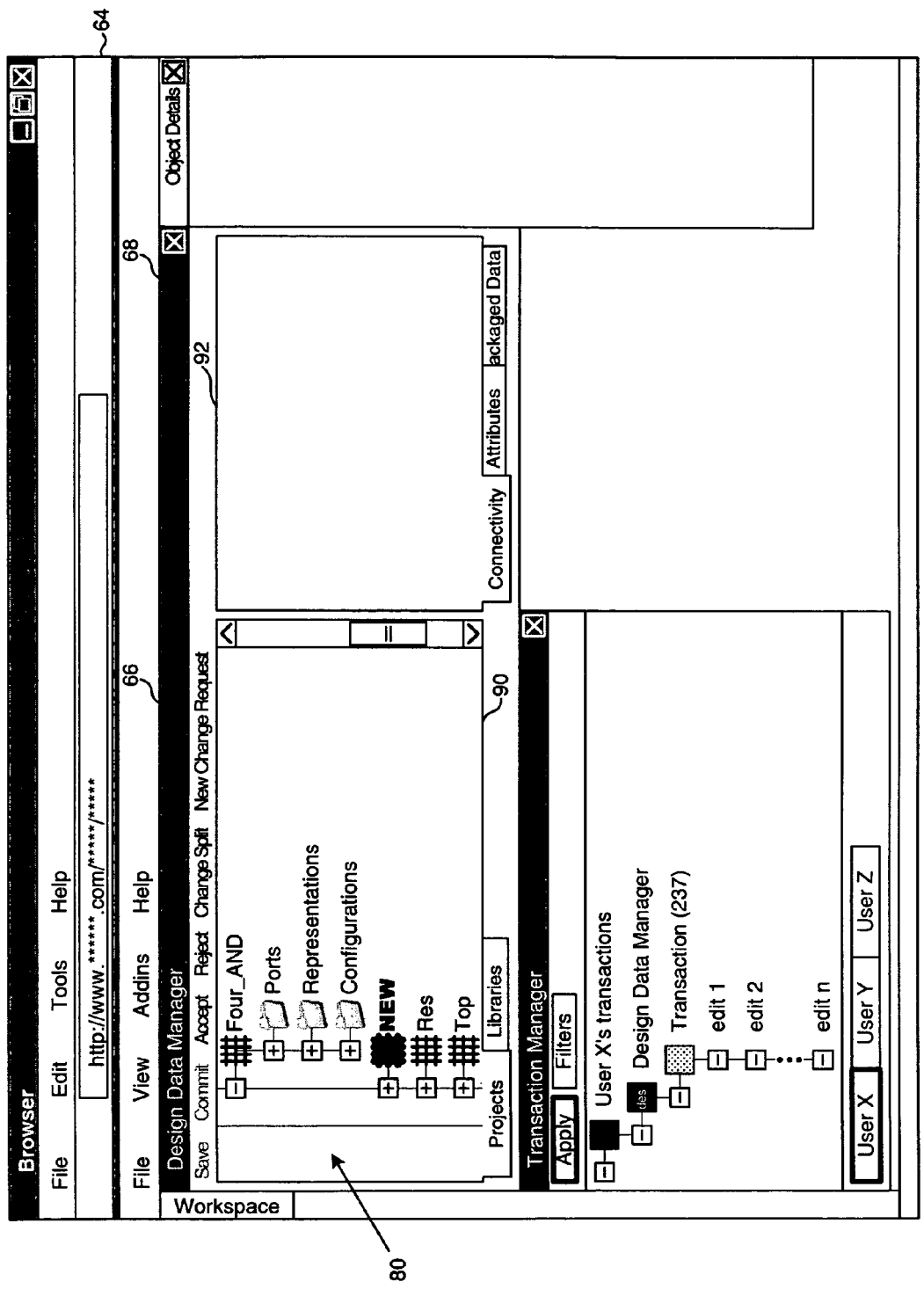
FIG. 11B shows an interface, according to at least some embodiments of the invention, displaying applied but unaccepted changes from a transaction.

Upon receiving the transaction from DOS 58, the transaction manager plug-ins executing at clients 2 and 3 provide information about the transaction to users of clients 2 and 3. The information may include a description of the transaction and the changes made, as well as the identity of the user submitting the transaction. However, the transaction managers at clients 2 and 3 do not automatically incorporate edits 1 through n into the local design data at clients 2 and 3. Instead, the client 2 and client 3 users may choose to apply the design changes made by the client 1 user to the local design data at client 2 and at client 3. FIG. 11A shows, according to at least some embodiments of the invention, a user interface for a transaction manager application executing on client 2 after the transaction of FIG. 10C has been received. The transaction manager user interface has a button or tab for each currently active user. By selecting a tab for a particular user, the client 2 user is able to see the transactions submitted by other users, as well as the individual design changes in each transaction. In FIG. 11A, for example, the client 2 user has selected the button for the client 1 user ("User X") and sees information regarding the transaction of FIG. 10C submitted by user X. Listed below that transaction are the individual design changes included in the transaction. For simplicity, those changes are depicted generically in FIG. 11A as "edit 1" through "edit n." In at least some embodiments, a description of the changes would be included (e.g., "add Cell New"). If the client 2 user presses the "Apply" button, the changes in the transaction are shown in the projects tree of the DDM plug-in. Those changes are shown in a different color or otherwise differentiated from other parts of the design (FIG. 11B). Fur purposes of example, FIG. 11B assumes that one of "edit 1" through "edit n" is addition of a Cell object named "New." If the client 2 user is satisfied with those changes, he or she can select the "Accept" command in the DDM plug-in. Upon doing so, the selected changes are incorporated into the local copy of the design data stored at client 2. If the user selects the Reject command, the changes are not made to the local design data copy at client 2, and the projects tree is returned to its previous condition.

Although only a single transaction is submitted to clients 2 and 3 in FIG. 10C, this need not be the case. If client 1 had submitted additional transactions, for example, each of those transactions could be displayed in the client 2 (or client 3) transaction manager (e.g., as separate "transaction" nodes in the transaction manager window). If the client 2 user chooses not to accept changes from the transactions regarding the client 1 user, the client 2 user may still accept those changes at a later time. The client 2 user may also save the local design data stored at client 2 in design database 50 as a separate version, which separate version may not include some or all of the changes made by other users. Even if the client 2 user does not accept all changes made by other users, the design data loaded by the client 2 user at the next logon will include those changes. If the client 2 user has saved a separate version lacking those changes, however, the user may retrieve that version.

In at least some embodiments, a transaction manager is configurable to filter design changes reported to a client. For example, one user may only be concerned with other users' changes to specific areas of the design data, and may not care what is occurring in other areas. As another example, a user may be concerned with changes to certain types of design elements, but less concerned about changes to other types of design elements. By appropriately setting a filter within the transaction manager plug-in, the transaction manager will only report transactions (or changes within transactions) affecting design elements within the filter settings. In at least some embodiments, a user may also set the transaction manager to automatically apply the filtered changes (i.e., the changes excluded by the filter settings) to the local design data copy at the user's client.

Figure 12:
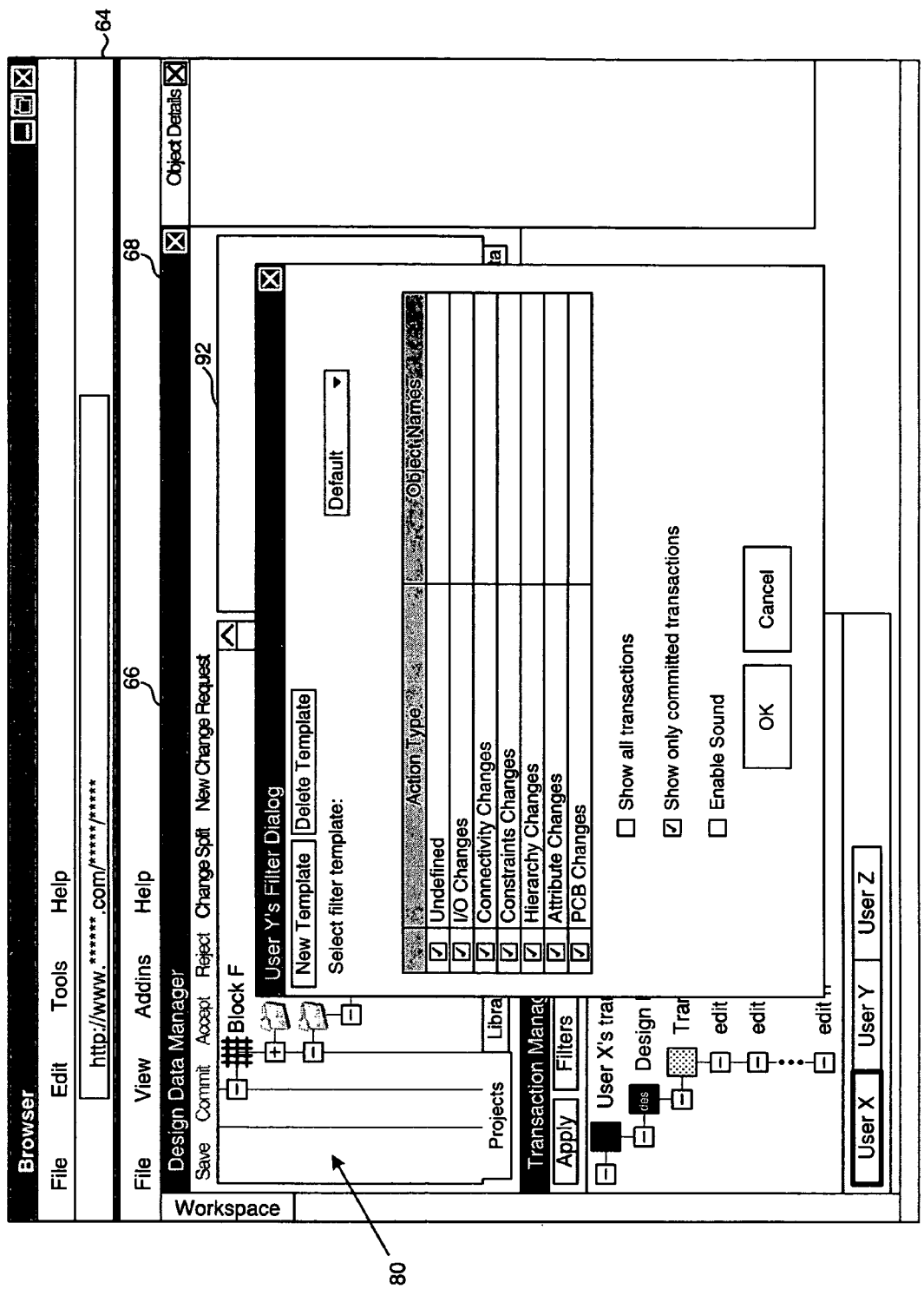
FIG. 12 shows a filter dialog user interface according to at least some embodiments of the invention.

FIG. 12 shows a filter dialog according to at least some embodiments of the invention. A user may have multiple filter "templates," each of which permits different types of design data transactions to be reported and excludes reporting of other types. When creating a new template (or modifying an existing template), the user may specify an "action type" for design data changes to be reported. The user may further specify, in the "object names" column, particular objects for which transactions should be reported. By selecting "show only committed transactions," the user would only receive transactions that other users have committed to design database 50. Conversely, selecting "all transactions" results in a user being notified of changes cached by DOS 58 but not yet updated to database 50 (see FIG. 10B). "Enable sound" allows the user to receive a beep or other audible alarm when a new transaction is received.

In at least some embodiments, some or all of the data for a design can be subject to additional restrictions regarding who may edit the data, and/or under what circumstances that data may be edited. For example, a company may not wish to change a design (or portions thereof) for a device currently being produced without taking additional steps to ensure the change is warranted. In such a circumstance, the corresponding data in design database 50 is assigned a lifecycle state of "In Production." If a user selects design elements having an In Production state, the DDM application at the user's client will not allow the user to submit a normal transaction regarding those elements. Instead, the user must initiate a Change Request. Only after the Change Request obtains required approvals can the requested design changes proceed.

Figure 13A:
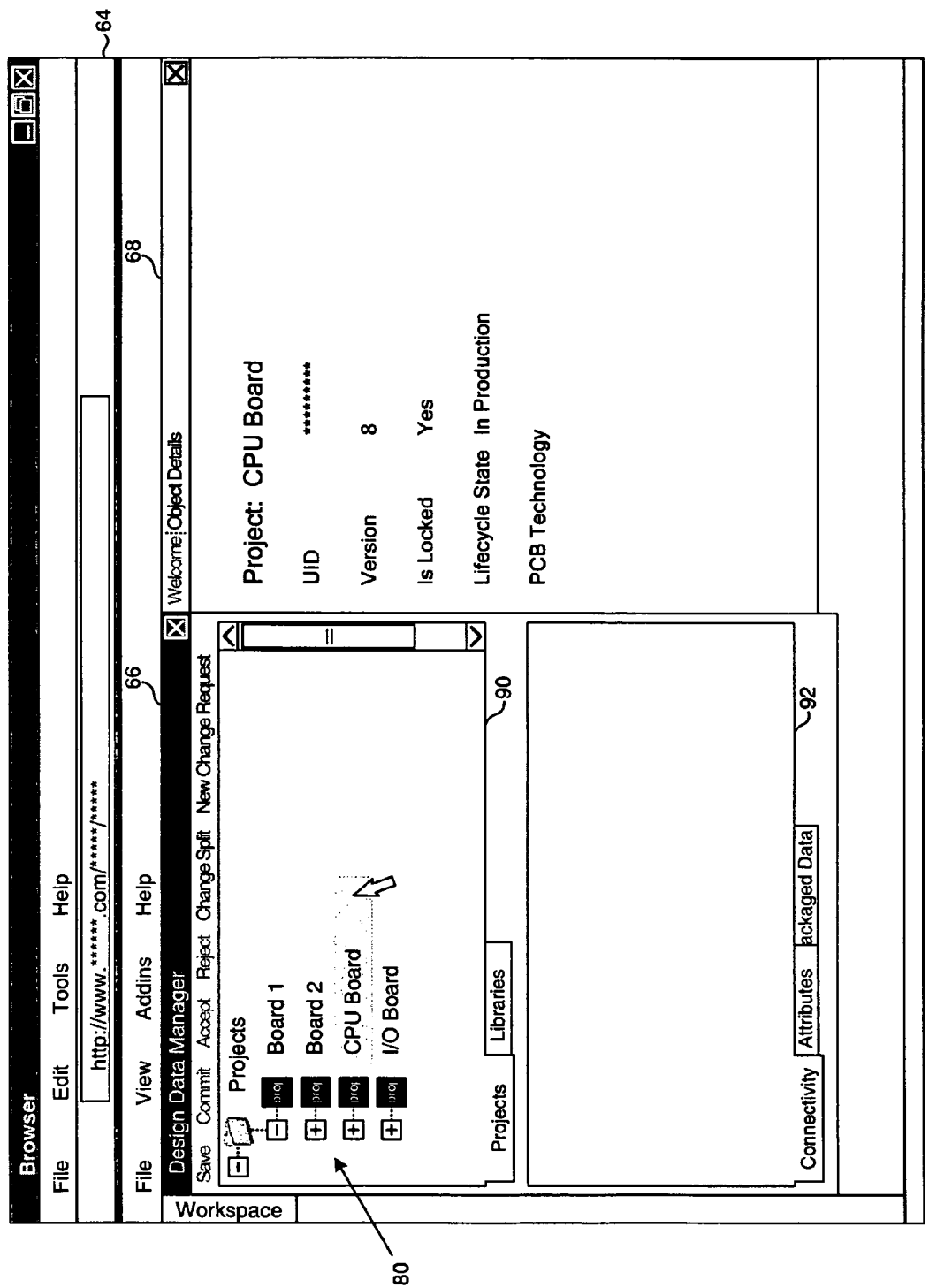
Figure 13B:
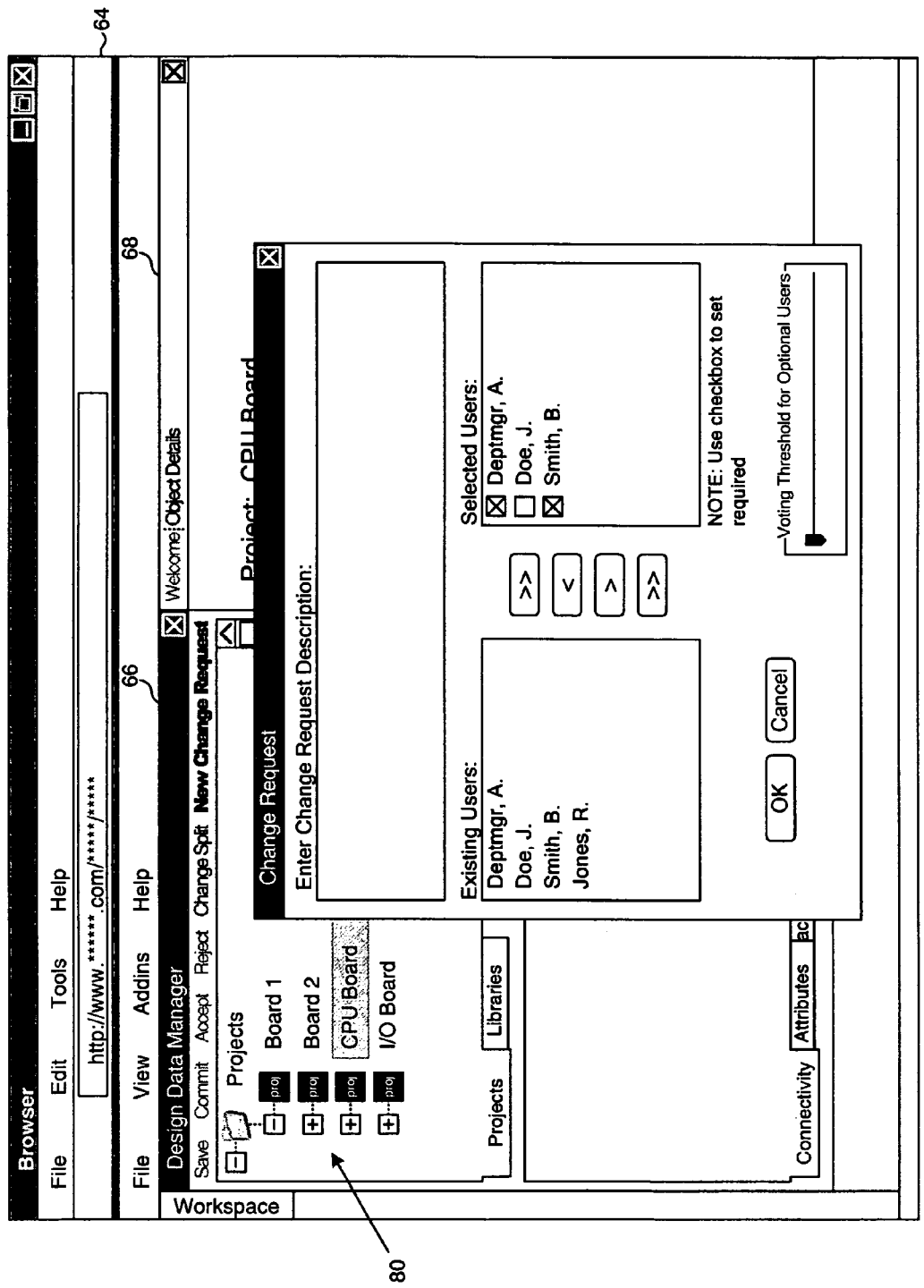

In FIG. 13A, a user has selected a design ("CPU Board") having a lifecycle state of In Production. If the user invoked a context menu, all of the editing options would be shown in gray, indicating those options are not currently available. If the user attempts to edit the object in another manner (e.g., dragging and dropping an object from a parts viewer), the user is notified that the design can only be modified using a Change Request. Accordingly, the user initiates a Change Request dialog, shown in FIG. 13B. Upon initiating the Change Request, the user may then minimize or move the Change Request dialog and proceed to edit the selected object. As such changes are made, a description is automatically added to the description field. The user may also modify that description by restoring the dialog window and typing in the description field. When all of the desired changes have been made, the user can then cause the change request to be transmitted to other users by selecting "Ok." As seen in FIG. 13B, the Change Request dialog can include a listing of other users. The listed users may not currently be connected to DOS 58. The change requestor may select from the listed users the persons to which the Change Request should be forwarded. Those selected users' names will be copied to the Selected Users field. In some embodiments, the permission of certain users (e.g., department managers, etc.) may be required for a particular change order and automatically included in the Selected Users field. In some embodiments, the user may also specify a voting threshold of the selected users required to approve the Change Request, or indicate (by checking the required checkbox under "Selected Users") that the Change Request should not be approved unless specific users approve.

After the initiating user presses the "OK" button, and as shown in FIG. 13C, an e-mail message is sent to the selected users indicating that the initiating user has sent a Change Request. If a receiving user wishes to approve the change request, he or she may select the "Yes" hyperlink. In at least some embodiments, and as shown in FIG. 13C, the e-mail recipient is also provided a hyperlink ("Click here") to a web page (not shown) containing information about other pending change requests. The web page may also include additional details of those change requests, as well as a check box or other UI that can be used to indicate approval or rejection of the Change Request.

Once the required approvals are received, the Change Request is automatically processed similar to the transaction of FIG. 10C. In this case, however, the notification of the changes (i.e., the transaction containing the new/modified objects and information about the changes) is also sent to user initiating the Change Request. Because the initiating user does not know if the desired design changes would be allowed until other users respond to the Change Request, those design changes are not made to the initiating user's local design data copy at the time of preparing a Change Request. If the Change Request is not approved (e.g., a required user rejects the change, a sufficiently large number of optional users reject the change, etc.), the initiating user is notified via an e-mail (not shown).

Although the preceding description of change requests has focused upon "In Production" designs, the invention is not limited to this particular context. For example, a user may be able to edit a design or a portion thereof, but not wish to do so until other persons have had the opportunity to review the proposed changes. Moreover, a Change Request can be used to change numerous aspects of a design. For example, changing lifecycle state for a design could be implemented using (or could require) a Change Request. If a Change Request is required before an object can be edited, the requirement can be built into the object itself. For example, the DDM plug-in (and/or other plug-ins) can be configured to examine a "lifecycle state" attribute and not allow editing, without a Change Request, if that attribute has an "In Production" or other specified value. A user could also prepare a Change Request while other edits (not implicating a Change Request) are in process. For example, after making several edits outside of a Change Request (which edits are being recorded in a transaction by the transaction manager), the user could initiate a Change Request. Upon doing so, the transaction containing those edits is temporarily put aside, and a new transaction begun for the Change Request. When the Change Request is completed and sent out for approval (i.e., the "Ok" button is pressed in FIG. 13B), the previously set aside transaction once again becomes the active transaction.

Communication Between Front and Back End Designers

The discussion thus far has focused upon front end design, and in particular, the creation, modification and storage of design data for elements in the logical domain. Ultimately, however, logical design data will be used to generate physical design data during the layout (or "back end") design process. In particular, actual electronic components providing the desired function of one or more logical design elements are identified and are placed on one or more printed circuit boards (PCBs). Interconnections between pins of these components are then made based on the required connections set forth in the logical design data. In many cases, logical and layout design are performed by different teams of individuals. In some cases, those individuals may work for different companies. Often, layout designers will perform their tasks using a different set of software applications than were used by the front end designers.

Although layout design may be based upon information generated during the logical design process, there is often not a one-to-one correspondence between data types in the front and back ends. As seen in FIG. 2, for example, the signal path from port A_3 to port C_1 includes three nets: E_c, Net11 and F_a. In the layout domain, however, this is a single net. As another example, cells E and F will generally have little meaning or use in the layout domain. In other words, a hierarchical logical design must be "flattened" into a collection of parts at the same level. As yet another example, and as previously described, multiple logical elements could be implemented as different slots of the same physical element.

Using existing methods, transition from front to back end design is traditionally performed in a batch processing fashion. In other words, the front end design would be completed and provided to the back end designers. The back end designers would then convert the logical data to another form (or forms) in order to extract design information needed to perform layout. In addition to being time consuming, this method inhibits design changes. If it becomes necessary to make a few front end design modifications after layout has already begun, the entire front end design data must often be reconverted to a form usable by layout designers, who must then determine which aspects have changed. Similar problems occur when design changes are made in the back end. For example, a layout designer may decide to add a part (e.g., a filter capacitor) during the layout process. This newly added part should be included in the logical design data, but doing so requires converting layout data for the entire design to a form usable by the front end designers, determining what has been changed, and then updating the logical data accordingly.

In at least some embodiments of the invention, mapping between front and back end design data is performed dynamically. In other words, as changes are made to the logical design data, corresponding changes are made to certain data objects having significance to back end designers. These data objects are then communicated to the back end designers and usable for layout purposes. Conversely, design changes made during the layout process are also incorporated into these data objects, which then make corresponding changes to logical design data objects.

Figure 14A:
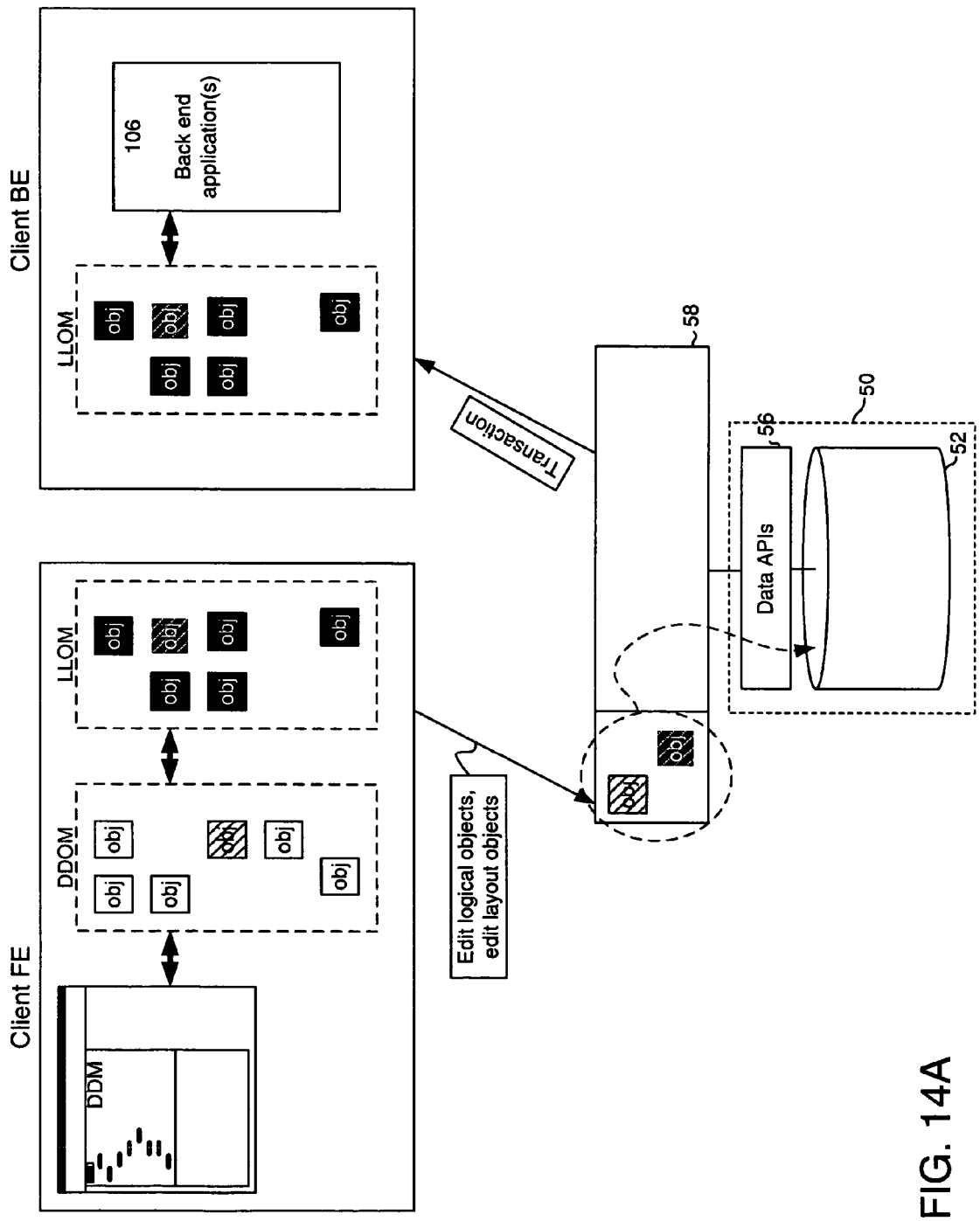
FIGS. 14A and 14B are diagrams showing interaction between a Design Data Object Model (DDOM) and a Layout Logical Object Model (LLOM) according to at least some embodiments of the invention.
Figure 14B:
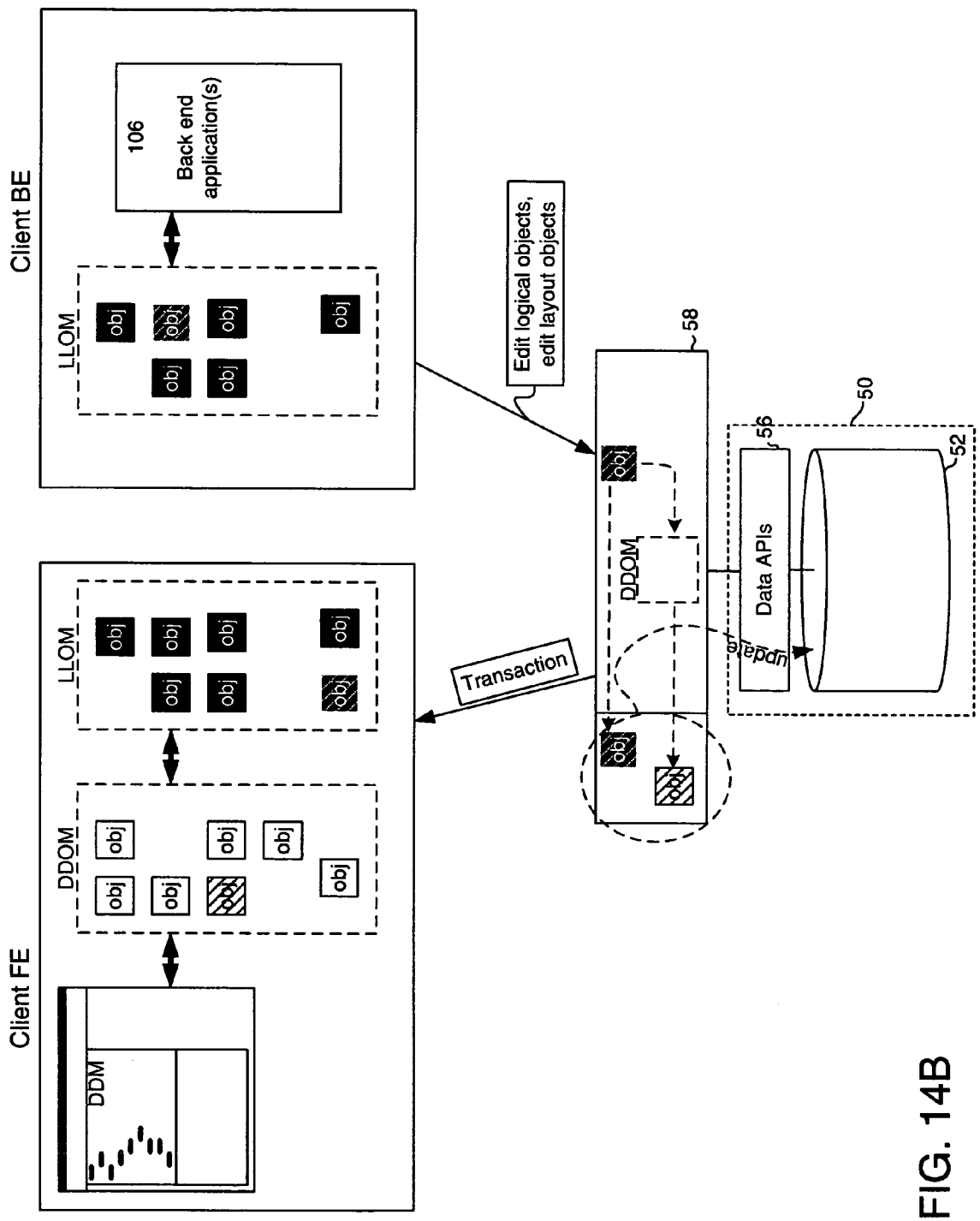

This is shown schematically in FIGS. 14A and 14B. In FIG. 14A, client FE is performing editing operations to logical design data using a DDM plug-in. As these edits are made, DDOM objects are added, deleted and/or modified. In addition to the DDOM objects, a collection of Layout Logical Object Model (LLOM) objects is also loaded. The LLOM, as is described in more detail below, is a collection of interrelated objects used to describe various physical design aspects of one or more designs. In response to DDOM editing events, methods within various LLOM objects add, delete and/or otherwise modify LLOM objects. DOS 58 monitors the actions by the user at client FE and caches DDOM and LLOM changes in a temporary memory. When the designer at client FE wishes to commit a group of logical and layout design data changes to design database 50, a corresponding transaction is sent to DOS 58. In response to that transaction, DOS 58 updates design database 50 to include the DDOM and LLOM changes in the DOS temporary memory.

Upon updating design database 50 to include changes to objects to logical (DDOM) and layout (LLOM) data, DOS 58 also sends a transaction containing the changes to back end client BE. Client BE maintains a local copy of LLOM objects. Client BE also executes one or more back end applications 106 for performing various layout design tasks (e.g., locating components on a printed circuit board, routing connections between those components, generating machining and other manufacturing information, performing simulation or analysis, etc.). Back end applications 106 may not be browser-based. Indeed, back end applications 106 may be written in a different programming language than plug-ins executing at client FE, may be designed for a different operating system than that used by client FE, may have a different data model than the front end design system, and may otherwise function in a different computing environment. However, back end applications are able to access LLOM objects via APIs within those objects. Upon receiving a transaction from DOS 58, back end applications 106 are notified of changes to LLOM objects. The precise form of this notification will vary between back end applications. Upon receiving such notice, back end applications 106 process the new layout data as may be appropriate. In some cases, back end applications may permit a user to accept or reject the changes in a manner similar to that described in connection with FIGS. 11A and 11B.

Certain changes to design data by the back end designer are also communicated to the front end designer. As indicated above, it is sometimes necessary for a back end designer to add a component to a circuit that might not be included in the logical design data. As shown in FIG. 14B, certain design changes made using back end applications 106 invoke various APIs within locally stored LLOM objects. Those APIs cause changes to be made to LLOM objects so as to reflect design changes made using back end applications 106. As with activity at client FE, DOS 58 monitors the actions by the user at client BE and caches LLOM changes in a temporary memory. DOS 58 also caches DDOM changes corresponding to these LLOM changes. Such DDOM changes are generated by a copy of the DDOM at DOS 58. When the back end designer wishes to update design database 50 to include the layout changes that have been made, a transaction is sent from client BE to DOS 58 (not shown). Upon receiving that transaction, DOS 58 updates design database 50 to include those layout and logical design changes. DOS 58 also forwards those changes to client FE in a transaction. Upon receiving that transaction, client FE processes it as described in connection with FIGS. 11A and 11B.

Figure 15:
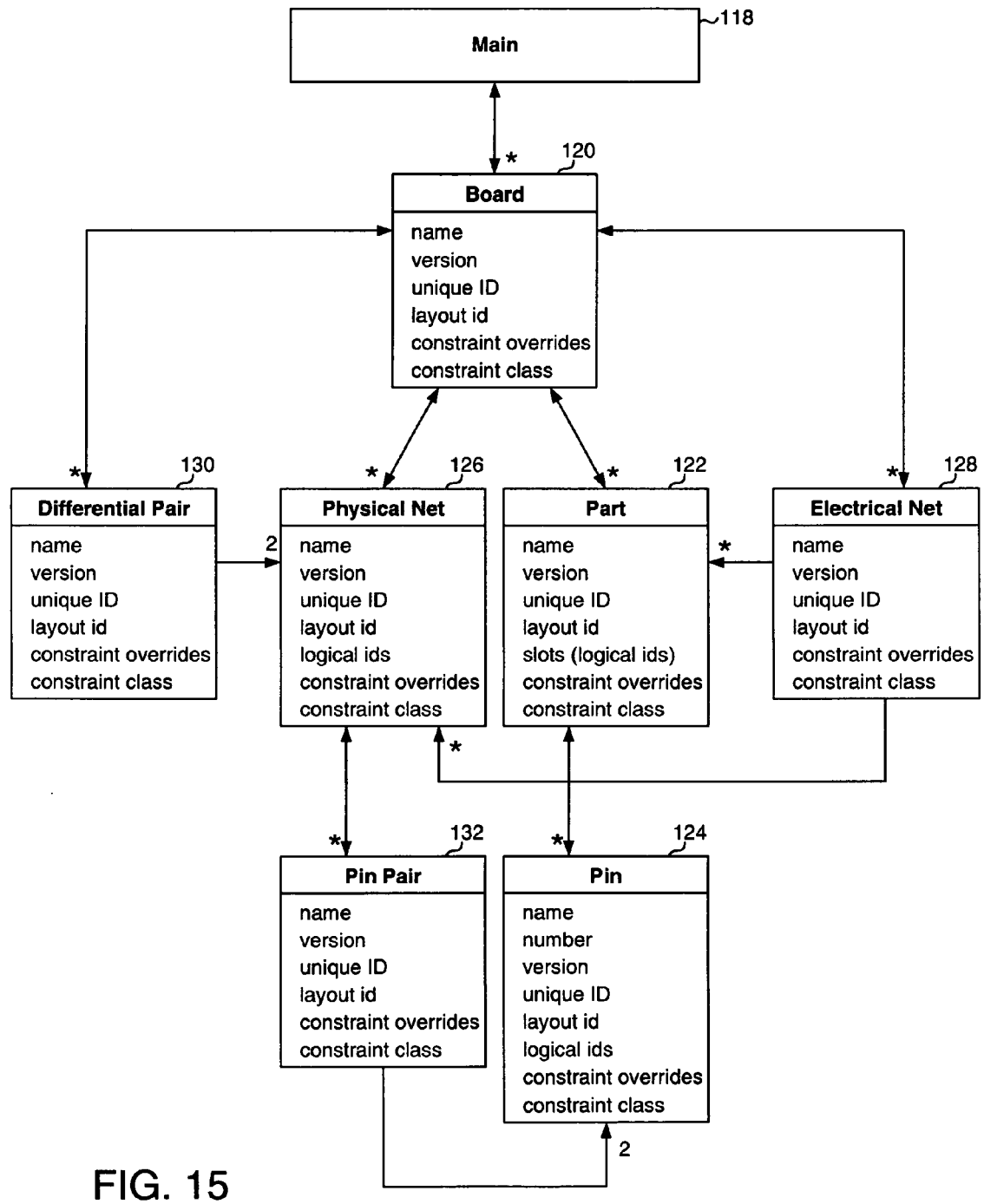
FIG. 15 is an object diagram for a Layout Logical Object Model according to at least some embodiments of the invention.

FIG. 15 is an object diagram for a layout logical object model (LLOM) according to at least some embodiments of the invention, and illustrates the relationships between various layout data objects. The LLOM generally represents the collection of data objects used to describe "package data," which includes data relating to physical aspects of one or more designs. As explained below, the LLOM also stores a mapping between logical and layout objects by use of unique ids for LLOM and DDOM objects. The LLOM may not, and in the described embodiment does not, contain all physical design data. For example, the actual location (e.g., x and y coordinates) of an IC or other electronic component, or of a PCB trace or via, is not contained in the LLOM. As with the DDOM described above, objects of the LLOM are implemented using the JAVA programming language in at least some embodiments of the invention. A line between two blocks in FIG. 15 having an arrow at both ends indicates a two-way association between those two blocks. In other words, a data object of the type at one end of the double-arrow line refers to a data object of the type at the other end of that line. An asterisk (*) on one end of a line indicates that there may be one or more objects of the type at the end of the line having the asterisk. Unlike FIG. 4, a line in FIG. 15 having an arrow at only one end indicates that an object of the type at the headless end of the line references object(s) of the type (and in the number) indicated at the other end of the line. In other words, a single headed arrow in FIG. 15 does not indicate that an object is an instance of another object.

Beginning at the top of FIG. 15, the LLOM includes a main object 118. The main object can be analogized to a container for other objects of the LLOM. Main object 118 is often the starting point from which other objects are accessed. For example, when initially loading layout data for one or more designs, main object 118 is first accessed so as to determine what other LLOM objects may be available. In some cases, main object 118 also detects various events that occur in a program for editing logical or layout design data. In response, main object 118 passes necessary data to one or more other LLOM objects and/or appropriate methods within other LLOM objects.

The LLOM generally includes one or more Board objects (block 120). Each board corresponds to layout data for a particular PCB. Each board has name, version and unique id fields. The board name is the name assigned to that PCB within the layout application (e.g., "Board 1," etc.). Each board also has a version. As with logical data, one or more back end designers may generate multiple versions of layout data for a board so as to, e.g., maintain information about alternative layout designs. The unique id for a board object is an identifier used to reference the Board object by other data objects, by DOS 58 and by the design database 50. In some embodiments, this may be an alphanumeric string that is automatically assigned when the object is created. Each Board object additionally has a layout id field. The layout id is an identifier used by back end applications to reference the object, and may have no significance outside of the back end applications. Although the layout id may be the same as the object name, the object name will typically be chosen by a human so as to have significance to designers or other persons. The layout id may be automatically generated by the back end application(s). Each Board object further has constraint class and constraint overrides fields. These fields hold unique ids for ConstraintClass and ConstraintOverride objects. In general, constraints refer to limitations upon how a circuit may be physically arranged (e.g., minimum trace separation, maximum signal path length, etc.). Constraint-Class and ConstraintOverride objects are part of a Constraint Data Object Model (CDOM), which is discussed in more detail below.

Each Board object references one or more Part objects (block 122). Each Part object corresponds to an actual electronic component (e.g., an IC, resistor, capacitor, memory chip, etc.) to be placed on a PCB. Each Part object also has name, version, unique id, layout id, constraint overrides and constraint class fields. In the case of a Part object, the name is typically a reference designator (e.g., "U1") for the part in the layout system. In addition, each Part object has one or more slot fields. A "slot" field is used to hold an identifier of a design element in the logical domain (DDOM). If, for example, a Part object corresponds to CellInstance object "A" of FIG. 6K, a slot field for that Part object would contain the unique id for CellInstance "A." The slot field also holds context information for a particular CellInstance object. As explained above in connection with FIG. 6T, a particular CellInstance object may be reachable through multiple paths through the design hierarchy. In FIG. 6T, there are two instances of the "Block E" Cell object, each of which lists CellInstance objects "A," "B" and "R." The context information for a Part object corresponding to CellInstance object "A," "B" or "R" would indicate the path through the hierarchy (i.e., via E1 or via E2) used to reach the CellInstance object. For example, one slot field of a Part object would have the unique id for CellInstance A and information corresponding to the E1 context, while another slot field of the same (or a different) Part object would have the CellInstance A unique id and information corresponding to the E2 context.

In some cases, a Part object has multiple slot fields. For example, and as shown in FIG. 16, a single chip may actually contain multiple components. In the example of FIG. 16, chip 150 contains four AND gates, each of which connects to separate pins of the chip. A Part object corresponding to chip 150 would thus have four slot fields. If the Part object corresponded to CellInstance "C" (FIG. 6L), one of those slots would be mapped to (and thus hold the unique id and context information for) CellInstance "C." If CellInstance "C" is located in multiple parts of the design (e.g., similar to CellInstances "A" and "B" in FIG. 6T), one slot may be mapped to CellInstance "C" with a first context information value, and another slot mapped to CellInstance "C" with a second context value.

Each Part object references one or more Pin objects (block 124). Each Pin object corresponds to a pin of an actual electronic component (i.e., of the component corresponding to the parent Part object). Each Pin object also has name, version, unique id, layout id, constraint overrides and constraint class fields. In the case of a Pin object, the name is a name such as "Clk," "Reset," etc. retrieved from a database for the component. The "number" field of a Pin object contains a pin number assigned by a manufacturer of the component corresponding to the Part object with which the Pin Object is associated. The logical id field of a Pin object contains the unique id for a design element in the logical domain (i.e., a PortInstance object), as well as context information for that logical design element. As with a CellInstance object, a PortInstance object can appear in numerous locations in a design hierarchy; the context information identifies how a PortInstance object is reached through the design hierarchy.

In addition to Part Objects, each Board object references one or more Physical Net objects (block 126). Each Physical Net object corresponds to one or more logical nets that make up an entire signal path. For example, and as shown in FIG. 2, the signal path from port A_3 to port C_1 include nets E_c, Net11 and F_a. A Physical Net object for this signal path would correspond to Net objects for nets E_c, Net11 and F_a. The "logical ids" field of the Physical Net object would contain the unique ids for the E_c, Net11 and F_a net objects, as well as context information for those objects. Similar to other LLOM objects, a Physical Net object also includes name, version, unique id, layout id, constraint overrides and constraint class fields.

Each Board object may also reference one or more Electrical Net objects (block 128). Unlike a Physical Net object, which often corresponds to a signal path between two circuit components, an Electrical Net object corresponds to a signal path that includes one or more components. An example could include two signal paths connected by a resistor, as shown in FIG. 17. The input signal is essentially the same as the output signal, except for a reduction in voltage. An Electrical Net object, which would typically be used for analysis purposes (e.g., evaluating crosstalk), references one or more Part objects and one or more Physical Net objects. Similar to other LLOM objects, an Electrical Net object also includes name, version, unique id, layout id, constraint overrides and constraint class fields.

Each Board object may further reference one or more Differential Pair objects (block 130). Each Differential Pair object references two Physical Net objects, thereby corresponding to a pair of nets in a circuit. Differential Pair objects, which are typically used for trace routing and/or analysis purposes, include name, version, unique id, layout id, constraint overrides and constraint class fields.

The remaining object shown in FIG. 15 is a Pin Pair object (block 132). A Pin Pair object corresponds to a pair of component pins (usually of different components) connected by a net of a circuit. Accordingly, a Physical Net object references one or more Pin Pair objects, each of which in turn reference two Pin Objects. A Pin Pair object also has name, version, unique id, layout id, constraint overrides and constraint class fields.

FIGS. 18A-18D are flow charts showing modification of the LLOM in response to DDOM changes, and vice versa. Although FIGS. 18A-18D are described in terms of actions being performed by the DDOM or LLOM, persons skilled in the art will appreciate that the steps described are carried out by one or more of the objects within the DDOM and LLOM in response to events generated by user actions or by other DDOM or LLOM objects.

Figures 18A, 18B:
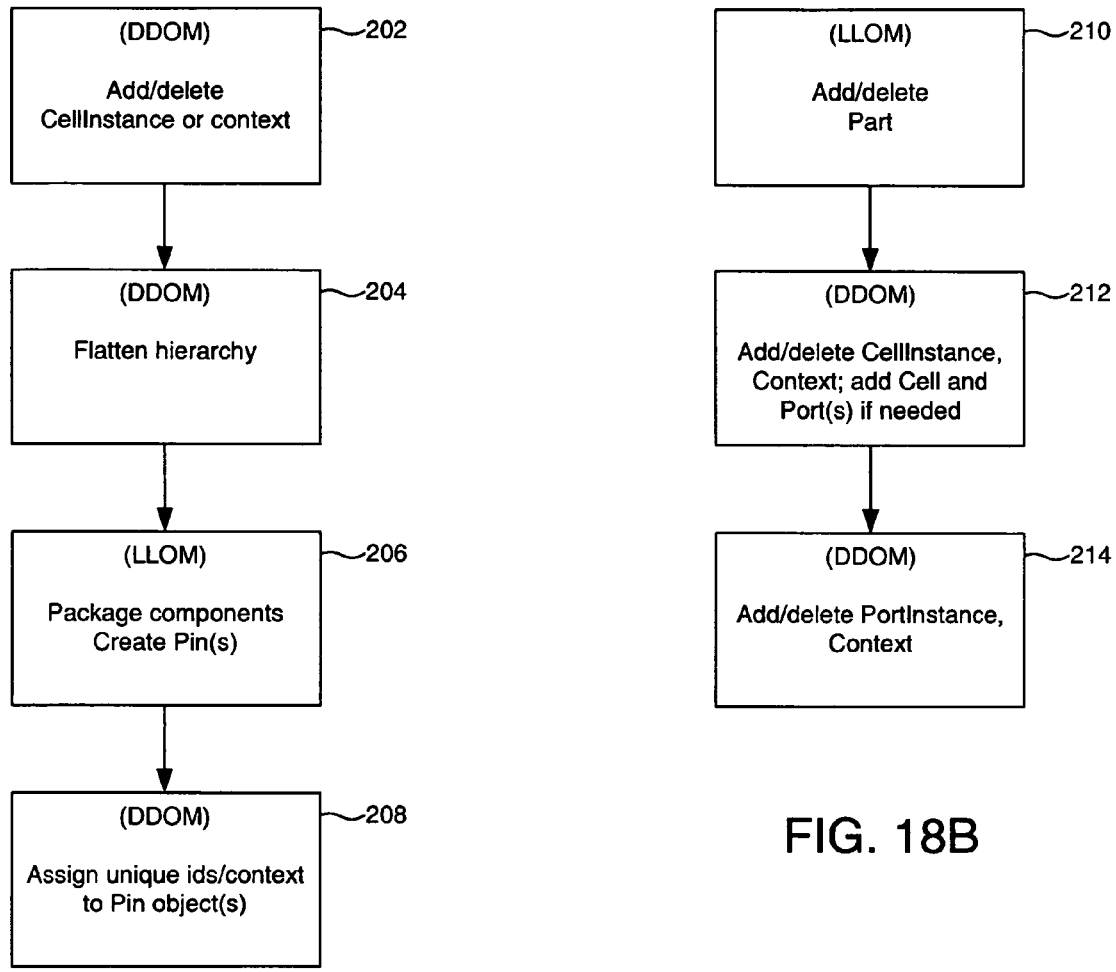
FIG. 18A is a flow chart showing generation of LLOM data in response to editing of DDOM data.
FIG. 18B is a flow chart showing generation of DDOM data in response to editing of LLOM data.

FIG. 18A is a flow chart describing how layout data (LLOM) changes are generated in response to adding or deleting a CellInstance object (or a context for a CellInstance object) in the logical design data (DDOM). Beginning at block 202, a CellInstance object is added or deleted, or context for a CellInstance object is added or deleted. In block 204, the DDOM "flattens" the affected portions of the logical data. In particular, the DDOM traverses the design hierarchy, through all branches, and determines how many actual parts must be added to (or removed from) a PCB corresponding to the logical design. For example, and depending on the representation, adding an instance of the "Block E" Cell object would require addition of at least two actual parts (i.e., two flip flops). A CellInstance may be added to a Cell object which is itself instantiated in multiple places, and the DDOM thus determines the number of added parts as it traverses all branches of the design hierarchy.

At block 206, the LLOM packages the logical elements of the flattened design hierarchy. In other words, after the DDOM determines how many parts must be added, the LLOM assigns the unique ids and context information corresponding to those new parts to available slots of existing Part objects. If no slots are available, the LLOM creates new Part objects and assigns the unique ids and context information to slots of those new objects. If the LLOM creates new Part objects, associated Pin objects are also created. If a part was added or slot filled in step 206, the flow proceeds to block 208. At block 208, the DDOM assigns to the appropriate Pin objects the unique id and context information for the PortInstance objects associated with the new CellInstance objects (or with new contexts for pre-existing CellInstance objects).

FIG. 18B is a flow chart showing how DDOM changes are generated in response to addition or deletion of parts in the LLOM. Beginning in block 210, a part is deleted or added in the back end system. In response, a Part object is created or deleted and/or a slot of an existing Part object is filled or cleared. If a Part object is created or deleted, associated Pin objects are also created or deleted. In block 212, the DDOM takes various actions if a part has been added or a slot filled. If there is an existing Cell object corresponding to the type of added part, that Cell object is instantiated and placed in the default representation of the top level Cell object. If there is no existing Cell object corresponding to the new part, a Cell object is first created. If a part was deleted or a slot cleared, the DDOM deletes a CellInstance object (or a context for a CellInstance object) that corresponds to the deleted part/cleared slot. In some cases, such deletion may require automatic generation of a new Cell object and/or of a new Representation object. In block 214, the DDOM adds or deletes PortInstance objects (or contexts of PortInstance objects) associated with the added or deleted CellInstance objects or CellInstance object contexts.

Figures 18C, 18D:
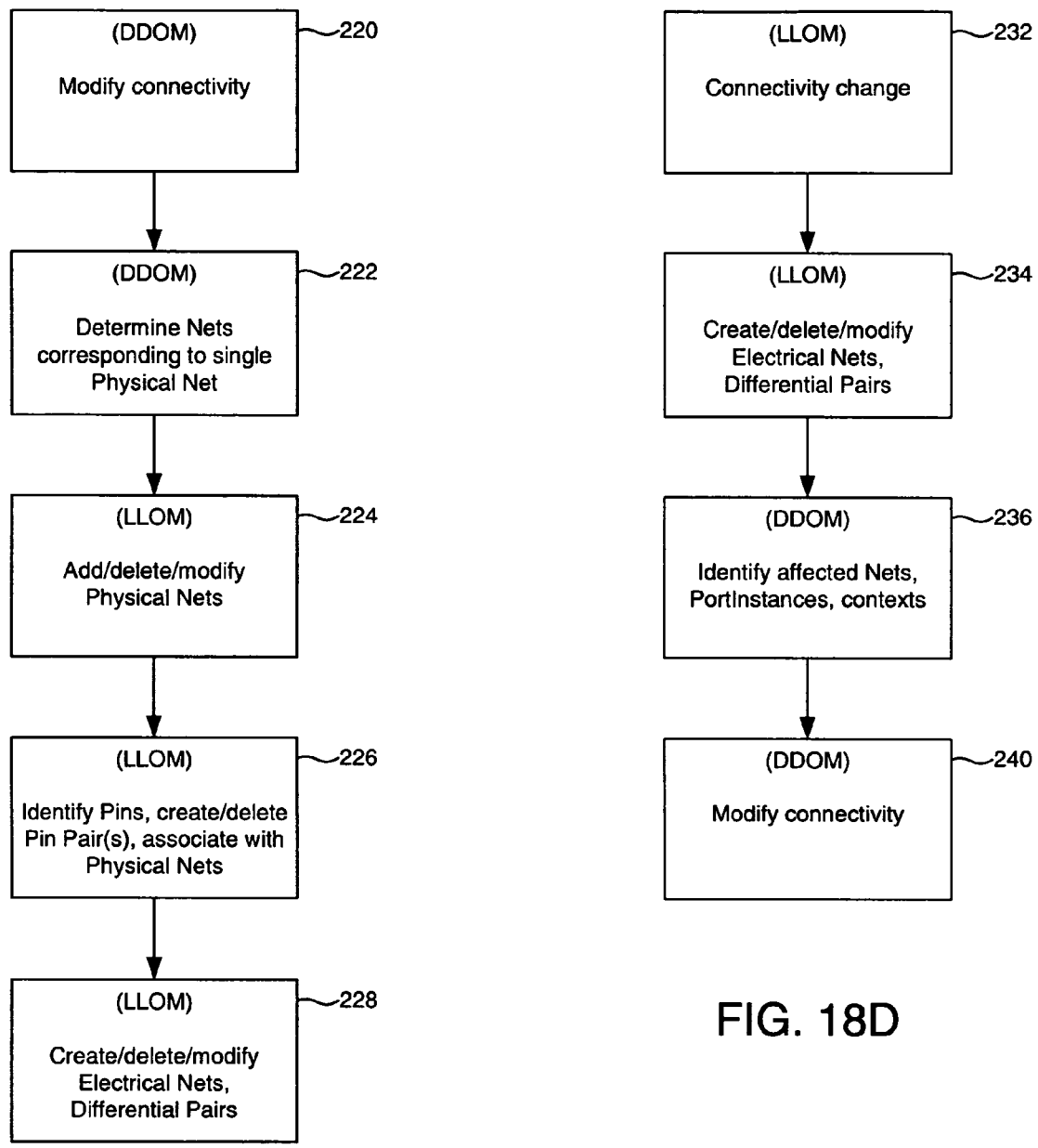
FIG. 18C is a flow chart showing generation of LLOM data in response to editing of DDOM data.
FIG. 18D is a flow chart showing generation of DDOM data in response to editing of LLOM data.

FIG. 18C is a flow chart showing how LLOM changes are generated in response to altering connectivity in the DDOM. At block 220, one or more connectivity changes are made in the DDOM. Net objects or Net object contexts may be added or deleted. Connection objects or Connection object contexts may be added or deleted. At block 222 the DDOM determines, for all Net objects or Net object contexts added or deleted, all the Net objects (and contexts) which correspond to a single physical net. At block 224, the LLOM modifies, adds and/or deletes Physical Net objects based on the information from block 222. For example, the LLOM may add or delete a Net object unique id and context value from the logical ids field of a Physical Net. A new Physical Net object may be created if the DDOM changes do not correspond to an existing physical net. A Physical Net object may be deleted if there are no longer and Net object unique ids and context values in the Physical Net object's logical ids field.

At block 226, the LLOM identifies Pin objects corresponding to the PortInstance objects (and contexts thereof) associated with the Connection objects (and/or contexts) that were added and/or deleted in the DDOM. The LLOM then creates and/or deletes new Pin Pair objects as is required. The LLOM then associates new Pin Pairs with the appropriate Physical net object. In some cases, the LLOM may associate an existing Pin Pair object with a different Physical Net object or vice versa. At block 228, the LLOM creates, deletes and/or modifies associations for Differential Pair and Electrical Net objects based on the connectivity changes.

FIG. 18D is a flow chart showing how DDOM changes are generated in response to altered connectivity in the LLOM. At block 232, a connectivity change is made in the LLOM. Physical Nets objects may be added or deleted. Associations between Physical Net objects and Pin Pair objects may be changed. At block 234, the LLOM creates, deletes and/or modifies associations for Differential Pair and Electrical Net objects based on the connectivity changes. At block 236, the DDOM determines the Net objects (and contexts) and PortInstance objects (and contexts) affected by the LLOM connectivity changes. Unique ids and context information for the affected Net and PortInstance objects are derived from the logical id fields of the affected Physical Net and Pin objects (in turn derived from affected Pin Pair objects) in the LLOM. At block 240, the DDOM modifies its connectivity data based on the LLOM changes. In some cases, block 240 may include automatic generation of a new Cell object and/or automatic generation of a new Representation object.

In at least some embodiments, the processes described by FIGS. 18A and 18B are performed on the fly. In other words, as each DDOM change is made, the corresponding LLOM changes are made (and vice versa). In certain embodiments, the processes described by FIGS. 18C and 18D are performed as periodic updates.

In some embodiments, a Board object is created by a user selecting a command from a context menu generated by selecting a Configuration object in a projects tree (not shown in the FIGS.). As previously discussed, a Cell object in the DDOM can have multiple configurations. In some cases, a separate set of LLOM objects is generated for different configurations of the same Cell object.

By mapping logical domain design objects to physical domain design objects, a front end designer is also able to access physical domain data more conveniently. For example, a front end designer may wish to know what reference designator is being used in the back end design system to refer to a particular logical design element. By searching LLOM objects for Part, Pin or Physical Net objects having the logical element's unique id, this can quickly (and automatically) be determined. By frequently mapping DDOM objects to LLOM objects, numerous problems associated with synchronizing data between front and back ends are avoided.

Figure 19A:
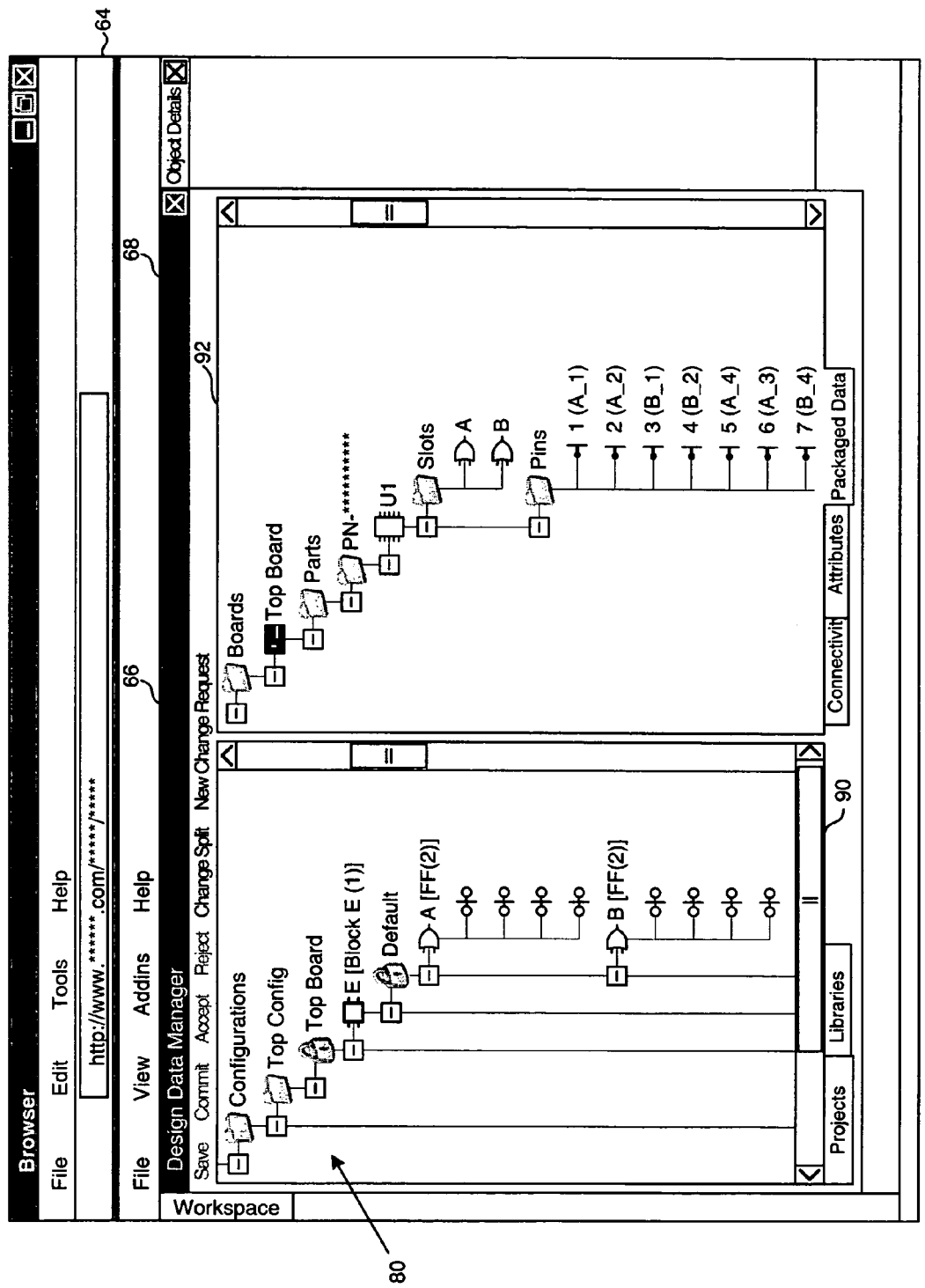
FIGS. 19A and 19B are a user interface, according to at least some embodiments of the invention, for selection of LLOM and DDOM objects.
Figure 19B:
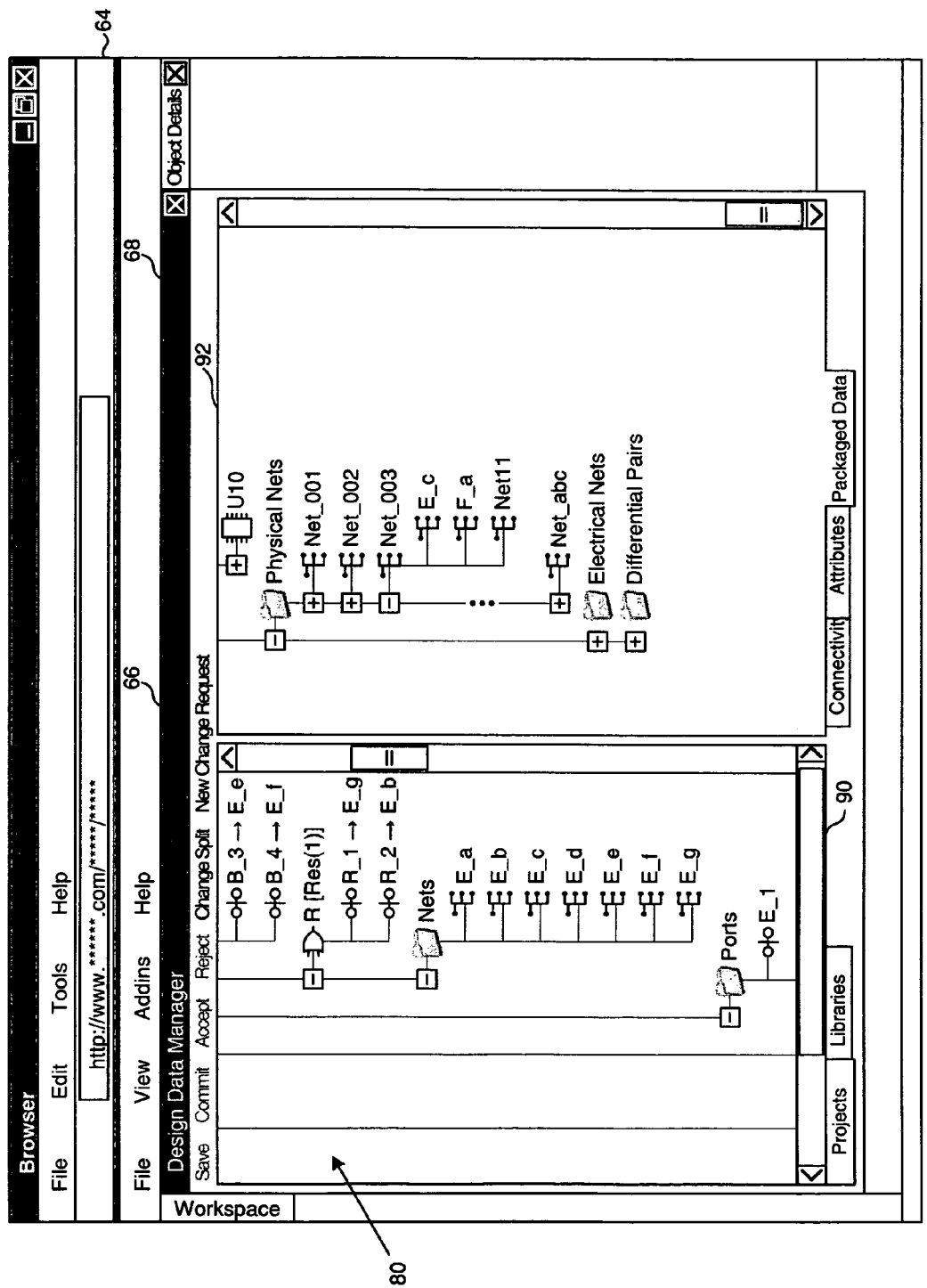

FIGS. 19A and 19B shows selection of an object in a projects tree displayed in pane 90 of DDM plug-in 66. The "packaged data" tab is selected in pane 92, displaying the Board object associated with the active configurations for all the Cell objects related to a particular hierarchy. If a Part object slot, Pin object or a Physical Net object is selected in pane 92, the corresponding logical object(s) is (are) automatically selected in pane 90. Similarly, selection of a CellInstance, PortInstance or Net object in pane 90 will cause selection of the corresponding element(s) in pane 92. For convenience, FIG. 19B shows a vertical ellipsis to indicate that there may be additional Physical Net objects.

Constraint Data

In at least some embodiments of the invention, and as previously indicated, constraint data is mapped to layout data and is accessible by front end designers. Although constraints (e.g., maximum signal path length, minimum separation between nets, etc.) are often applied by a back end designer when laying out a board, a front end designer may establish or otherwise provide input to those constraints. In known prior art systems, constraint data is stored in multiple places, often resulting in data synchronization problems, and there is often no established method for transferring constraint information between front and back end designers. Conversely, embodiments of the present invention store constraint data in a collection of objects (a Constraint Data Object Model, or CDOM) accessible by both front and back end designers, and which can be easily associated with logical design elements through related layout data.

Figure 20A:
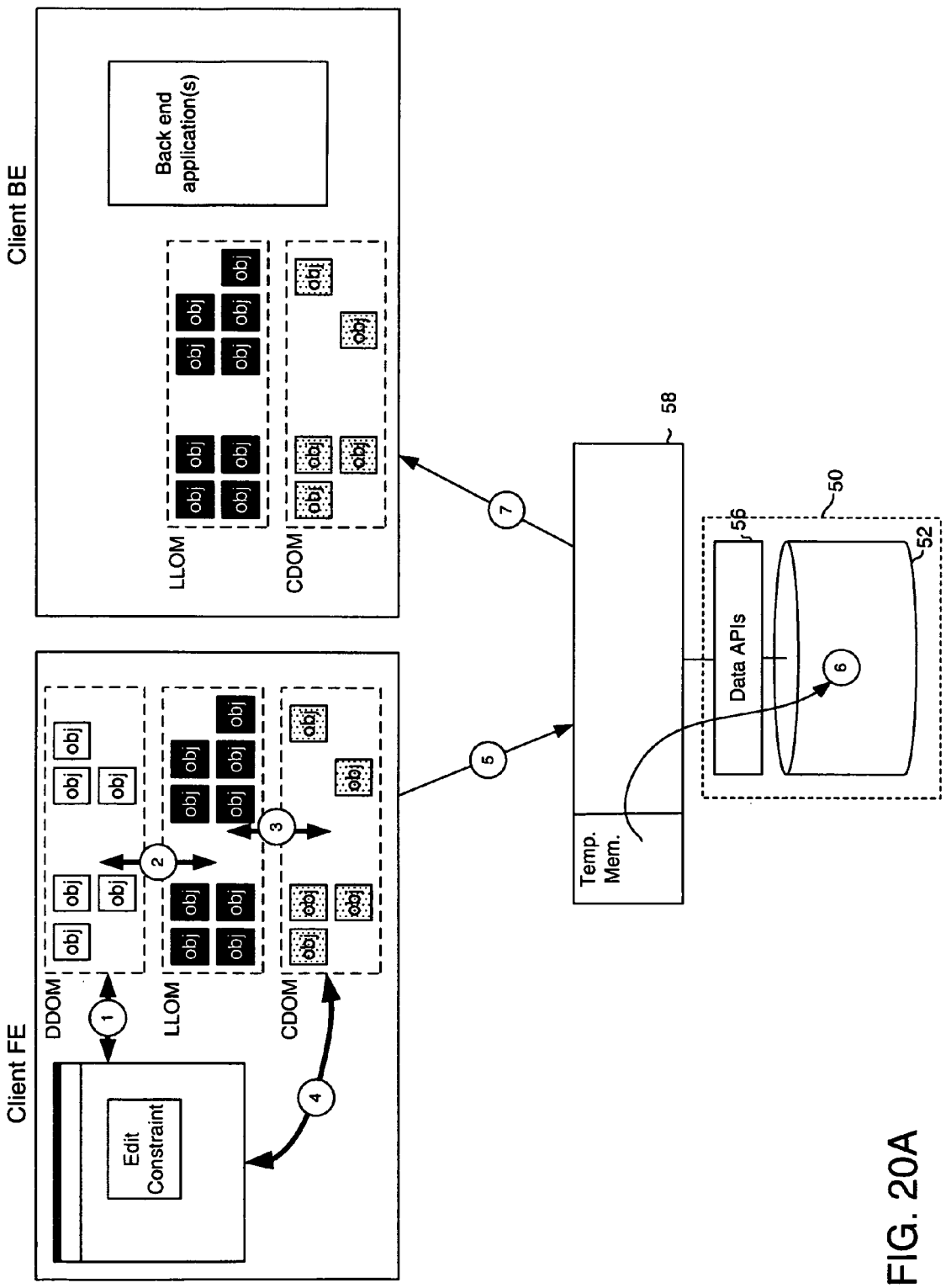
FIGS. 20A and 20B are block diagrams showing communication of constraint data according to at least some embodiments of the invention.

FIG. 20A is a diagram illustrating how, according to some embodiments of the invention, a front end designer might impose or modify a constraint upon the layout of certain logical design components. In FIG. 20A, a user at front end client FE accesses constraints using one or more plug-ins within a browser. In order to do so, one or more logical design elements, and thus one or more DDOM objects is identified (arrow 1). Based on the identified DDOM objects, corresponding layout data is identified by locating LLOM objects associated with the identified DDOM objects (arrow 2). LLOM objects, as discussed above, can have associated constraint (CDOM) objects (arrow 3). Based on the identified LLOM objects, and as shown by arrow 4, a plug-in identifies existing constraint objects and modifies same and/or creates new constraint objects.

As with logical design changes previously discussed, DOS 58 monitors the actions by the user at client FE and caches CDOM changes in a temporary memory. When the designer at client FE wishes to commit a group of constraint changes to design database 50, a corresponding transaction is sent to DOS 58 (step 5). In response to that transaction, DOS 58 updates design database 50 to include the CDOM changes in the temporary memory (step 6). Upon updating design database 50 to include those CDOM changes, DOS 58 also sends a transaction containing the changes to back end client BE (step 7). Client BE maintains a local copy of LLOM objects and of CDOM objects. Client BE also executes one or more back end applications for performing various layout design tasks (e.g., locating components on a printed circuit board, routing connections between those components, generating machining and other manufacturing information, performing simulation or analysis, etc.). Upon receiving a transaction from DOS 58, the back end applications are notified of changes to CDOM objects. The precise form of this notification will vary between back end applications. Upon receiving such notice, the back end applications process the new constraint data as may be appropriate. In some cases, back end applications may permit a user to accept or reject the changes in a manner similar to that described in connection with FIGS. 11A-11B.

Figure 20B:
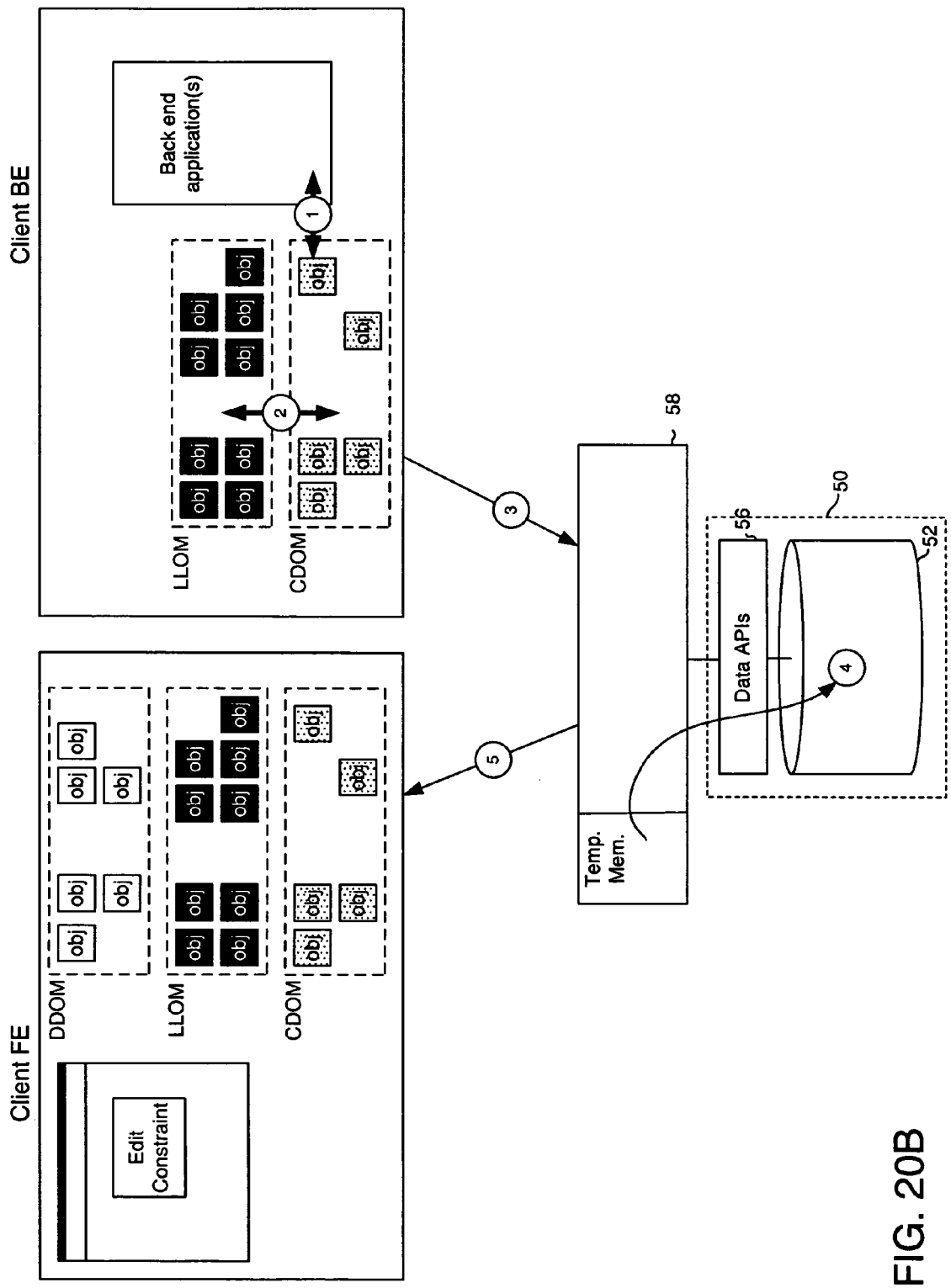

In at least some embodiments, a back end designer may also modify or impose a constraint. As shown in FIG. 20B, certain design changes made using back end applications invoke various APIs within locally stored CDOM objects (step 1). Those APIs cause changes to be made to CDOM objects that reflect design changes made using back end applications; corresponding changes may also be made to LLOM objects (step 2). As with activity at a front end client, DOS 58 monitors the actions by the user at the back end client and caches CDOM changes in a temporary memory. When the back end designer wishes to update design database 50 to include the constraint changes that have been made, a transaction is sent from the back end client to DOS 58 (step 3). Upon receiving that transaction, DOS 58 updates design database 50 to include those constraint changes (step 4). DOS 58 also forwards those changes to the front end client (step 5). Upon receiving that transaction, the front end client processes it as described in connection with FIGS. 11A-11B.

Figure 21:
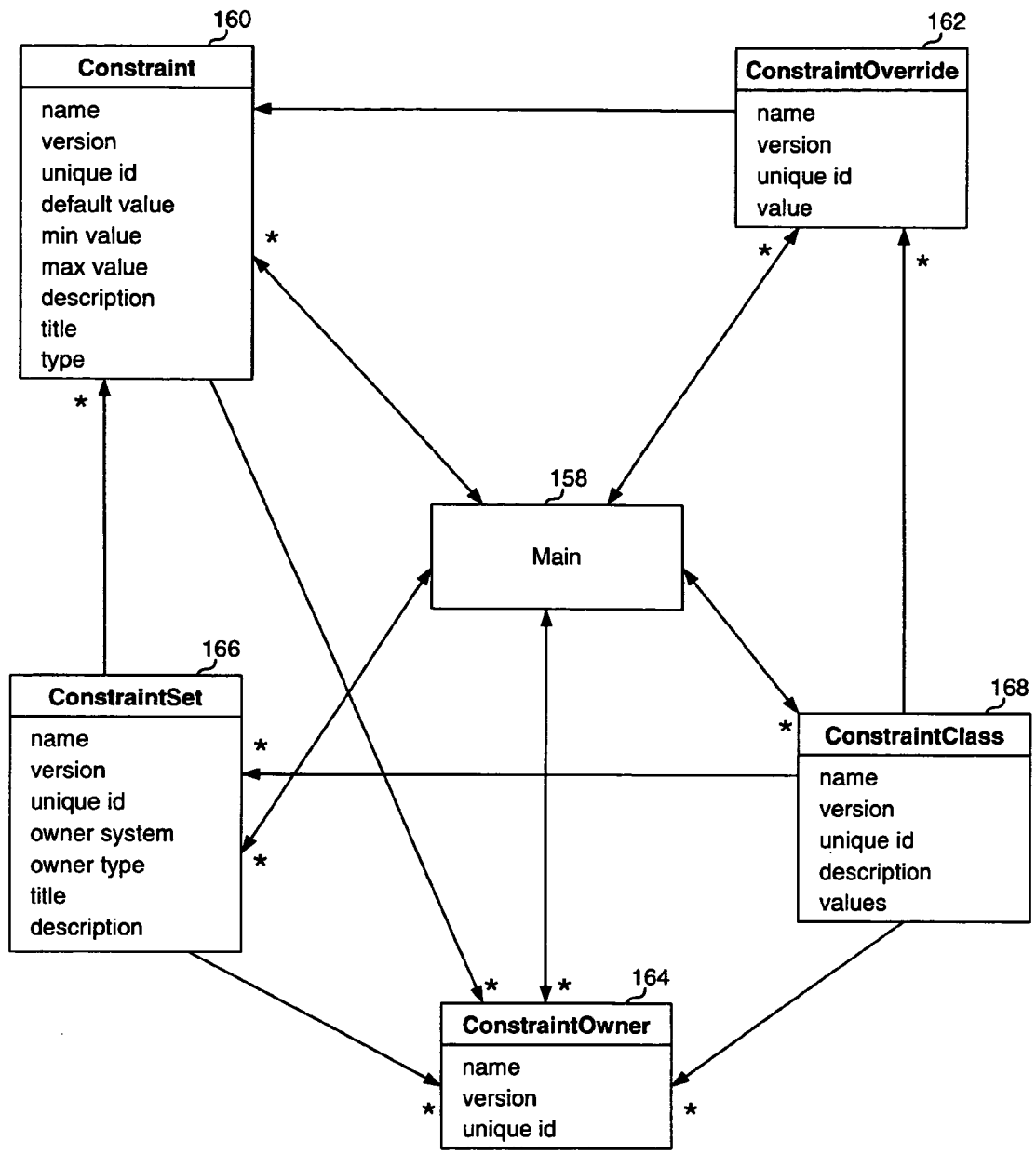
FIG. 21 is an object diagram for a Constraint Data Object Model (CDOM) according to at least some embodiments of the invention.

FIG. 21 is an object diagram for a Constraint Data Object Model (CDOM) according to at least some embodiments of the invention, and illustrates the relationships between various constraint data objects. The CDOM generally represents the collection of data objects used to describe constraints applied to one or more physical design aspects. As with the LLOM and DDOM described above, objects of the CDOM are implemented using the JAVA programming language in at least some embodiments of the invention. A double-headed arrow indicates a two-way association between an object of the type on one end of the arrow with objects of the type indicated and in the number indicated (an asterisk (*) means one or many; no asterisk means one) on the other end. A single headed arrow indicates a one-way association between an object of the type at the trailing end of the arrow with objects of the type and in the number indicated at the leading end of the arrow. Unlike the diagram of FIG. 4, a single-headed arrow in FIG. 21 does not indicate an object of one type is an instantiation of an object of another type.

Beginning at the center of FIG. 21, the CDOM includes a main object 158. The main object can be analogized to a container for other objects of the CDOM. Main object 158 is often the starting point from which other objects are accessed. For example, when initially loading constraint data for one or more designs, main object 158 is first accessed so as to determine what other CDOM objects may be available. In some cases, main object 158 also detects various events that occur in a program for editing constraint or other data. In response, main object 118 passes necessary data to one or more other CDOM objects and/or invokes methods within other CDOM objects.

Associated with main object 158 are one or more Constraint objects (block 160). A Constraint object corresponds to a constraint to be applied to an aspect of the physical design (e.g., maximum length for a signal path, etc.). The Constraint object includes name, version, unique id, default value, min value, max value, title and type fields. The name field may be used to hold a constraint name assigned by a user (e.g., "MIN_TRACE_WIDTH"). The version and unique id fields are similar to the version and unique id fields in DDOM and LLOM objects. The "default value" field holds a value that is automatically used for the constraint unless an override is set (overrides are described below). The "min value" and "max value" fields hold, respectively, minimum and maximum values between which the constraint can be varied through use of an override. The "description" field holds a textual description of the constraint. The "title" field holds additional description of the constraint. The "type" field indicates a data type for the constraint. The data type can include "integer", "floating point" and "choice." A "choice" data type indicates that the constraint is one several discrete values (e.g., top or bottom; left, right or middle; etc.).

A ConstraintOverride object (block 162) is used to specify a particular value, or override, for an associated Constraint object. For example, the default, minimum and maximum values for a net separation constraint may be 10, 8 and 15 millimeters, respectively. A ConstraintOverride object might (via the "value" field) specify that the default constraint value should be overridden by a value of 12 millimeters. A ConstraintOverride object also includes name, version and unique id fields.

A Constraint Object references one or more ConstraintOwner objects (block 164). A ConstraintOwner object corresponds to the particular LLOM object (e.g., Pin, Part, Differential Pair, etc.) to which the constraint is to be applied. A ConstraintOwner object has name, version and unique id fields. The ConstraintOwner object is used, when working with constraint data, to indicate the type of LLOM object with which a particular Constraint object is associated. In at least some embodiments, ConstraintOwner objects are hard coded in database 50, as are the associations for ConstraintOwner objects. For example, a ConstraintOwner object associated with a Constraint object for a net would have a hard-coded association with LLOM Physical Net objects.

One or more Constraint objects are referenced by a ConstraintSet object (block 166). A single Constraint Object can be referenced by multiple ConstraintSet objects. A ConstraintSet object includes name, version, unique id, title and description fields. The description and title fields may contain information describing the Constraint objects associated with the ConstraintSet object (e.g., a textual description of the constraints within the constraint set). An "owner system" field contains the name of the front end or back end system that created the ConstraintSet object. An "owner type" field contains an indication of whether the owner system is a front end or back end system.

A ConstraintClass object (block 168) references one or more ConstraintSet objects and may reference one or more Constraint Override objects. In addition to name, version and unique id fields, a ConstraintClass object includes a description field that may be used to hold a textual description of the constraints and constraint overrides contained within the object. The "values" field contains values which override values in the ConstraintOverride objects associated with the ConstraintClass object.

Returning to FIG. 15, LLOM objects have fields for "constraint classes" and "constraint overrides." A constraint class field holds unique ids for one or more ConstraintClass objects. Similarly, a constraint override field may hold unique ids for one or more ConstraintOverride objects. When a particular LLOM object is accessed by a back end design application, the values in the constraint class and constraint override fields for that object are used to reference the appropriate CDOM objects so that constraint data associated with a particular LLOM object may be retrieved.

Common Data Object Model (CoDOM)

In at least some embodiments of the invention, object models for layout data and constraint data are combined into a single object model known as a Common Data Object Model (CoDOM). FIGS. 28A-28D are an object diagram for a CoDOM according to at least some of those embodiments. Lines connecting blocks across pages are linked with like off-page connectors (e.g., connector Co1 in FIG. 28A and connector Co1 in FIG. 28B). As with other data models described above, CoDOM objects are implemented (in at least some embodiments) using the JAVA programming language. A line between two blocks in FIGS. 28A-28D having an arrow at both ends indicates a two-way association between those two blocks. In other words, a data object of the type at one end of the double-arrow line refers to a data object of the type at the other end of that line. An asterisk (*) on one end of a line indicates that there may be one or more objects of the type at the end of the line having the asterisk; a line without an asterisk indicates there is one object of the type at one end associated with another object of a type at the other end. Unlike FIG. 4, a line in FIGS. 28A-28D having an arrow at only one end indicates that an object of the type at the headless end of the line references an object of the type indicated at the other end of the line, but does not indicate that an object is an instance of another object. For lines connecting blocks across two pages, the type of object association (i.e., one-way or two-way) is determined based on the ends of the lines opposite the off-page connectors. For example, a CoBoard object (block 304, FIG. 28A) has a two-way association with one or more CoTVForScheme objects (block 322, FIG. 28B); a CoNetClass object (block 316, FIG. 28A) has a one-way association with one or more CoDiffPairProps object (block 342, FIG. 28C).

Figure 28A:
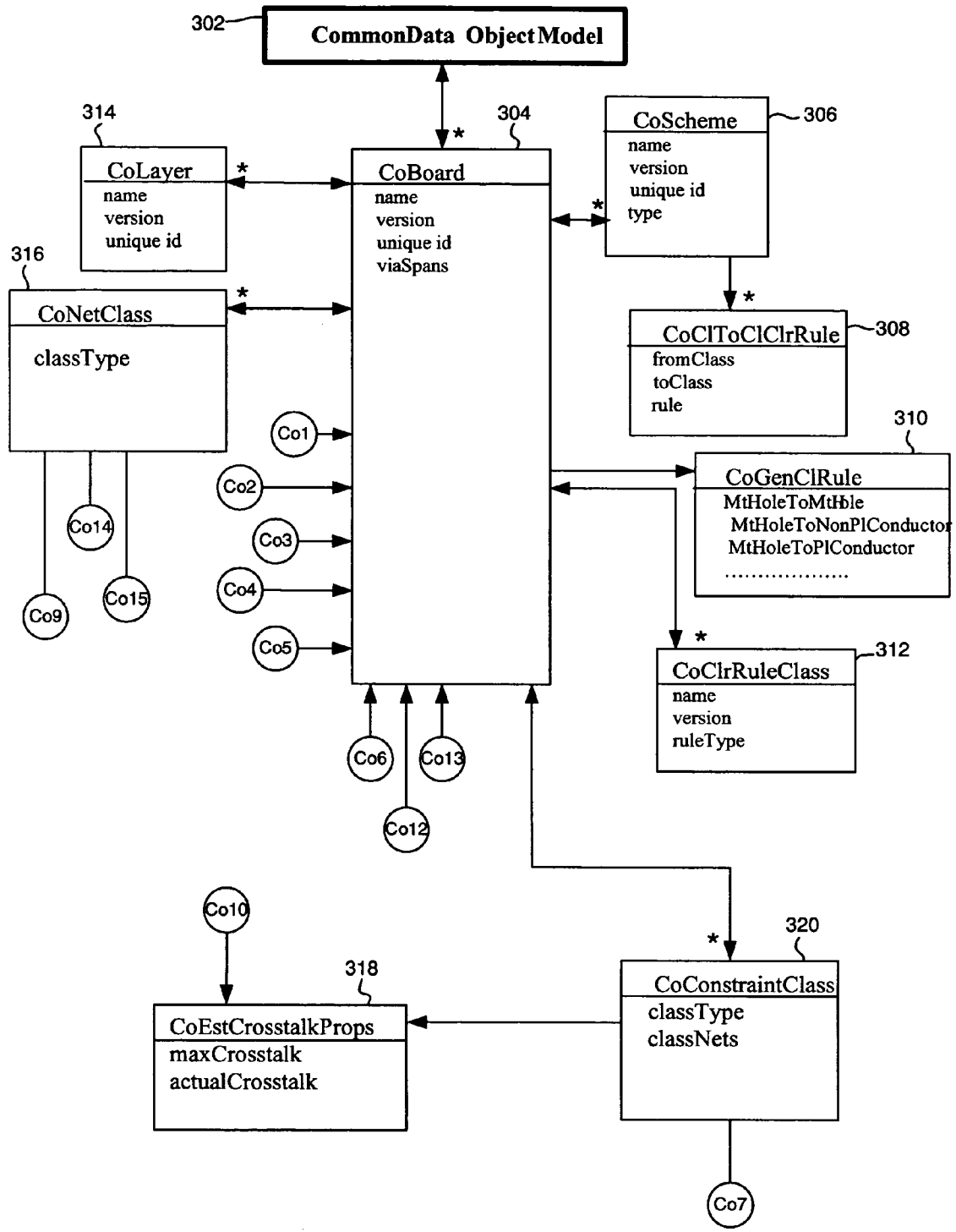
FIGS. 28A-28D are an object diagram for a Combined Data Object Model (CoDOM) according to at least some embodiments of the invention.

Beginning at the top of FIG. 28A, the CoDOM includes a main object 302. The main object can be analogized to a container for other objects of the CoDOM. Main object 302 is often the starting point from which other objects are accessed. For example, when initially loading layout and constraint data for one or more designs, main object 302 is first accessed so as to determine what other CoDOM objects may be available. In some cases, main object 302 also detects various events that occur in a program for editing logical, layout or constraint data. In response, main object 302 passes necessary data to one or more other CoDOM objects and/or appropriate methods within other CoDOM objects.

Associated with main object 302 are one or more CoBoard objects (block 304). A CoBoard object has name, version and unique id fields which are used in a manner similar to the name, version and unique id fields previously described for other object models. Although not specifically shown in each block, other object types described in FIGS. 28A-28D also include name, version and unique id fields. A CoBoard object may reference one or more viaSpan objects (shown within block 304 for simplicity). A viaSpan object (not shown in FIGS. 28A-28D as a separate block) could contain information regarding a via in a PCB. Also associated with a CoBoard object may be one or more CoLayer objects (block 314) containing information regarding one or more PCB layers. A CoBoard object is also associated with one or more CoNetClass objects (block 316). A CoNetClass object is used to group together specific types of nets (e.g., based on function or level of importance within a design) so that one or more rules can more easily be applied to all objects in the group. A CoNetClass object, which includes data indicating a type of class ("classType"), thus has one-way associations with one or more CoNet objects (by off-page connector Co14 to block 334 on FIG. 28C), with one or more CoDiffPair objects (by off-page connector Co15 to block 340 on FIG. 28C) and a CoDiffPairProps object (by off-page connector Co9 to block 342 on FIG. 28C). A CoDiffPairProps object contains differential pair constraints assigned to a CoNetClass object.

Returning to block 304, a CoBoard object may also be associated with one or more CoScheme objects (block 306). A scheme represents distinct rule areas on a PCB. A CoScheme object includes information regarding a scheme type, and has a one-way association with one or more CoClToClClrRule objects (block 308). A CoClToClClrRule object contains information establishing a rule for clearance to be maintained, as to a scheme, between collections of objects that have been grouped into net classes (e.g., a CoNetClass object). A CoClToClClrRule object is thus associated with two CoNetClass objects (shown inside block 308 as "fromClass" and "toClass" in lieu of an arrow connecting blocks 308 and 316).

A CoBoard object may also be associated with a CoGenClRule object (block 310). A CoGenClRule object specifies a default set of clearance rules that are used initially by each net class created. After a net class is created, the general clearance rules can be modified per the specifications of that net class. A CoGenClRule object may specify default clearance values between mounting holes ("MtHoleToMtHole"), between mounting holes and a non-plane conductor ("MtHoleToNonPlConductor"), between mounting holes and a plane conductor ("MtHoleToPlConductor"), etc. A CoBoard object may also be associated with one or more CoClrRuleClass objects (block 312), which contains (or references) various clearance rules.

Continuing around block 304, a CoBoard object may also be associated with one or more CoConstraintClass objects (block 320). A CoConstraintClass object groups specific nets together so that the same electrical rules can be applied to all nets within the constraint class. For example, a CoConstraintClass object may reference, by connector Co7 to FIG. 28C, a CoNetProps object (block 338) and may references a CoEstCrosstalkProps object (block 318, FIG. 28A).

Figure 28B:
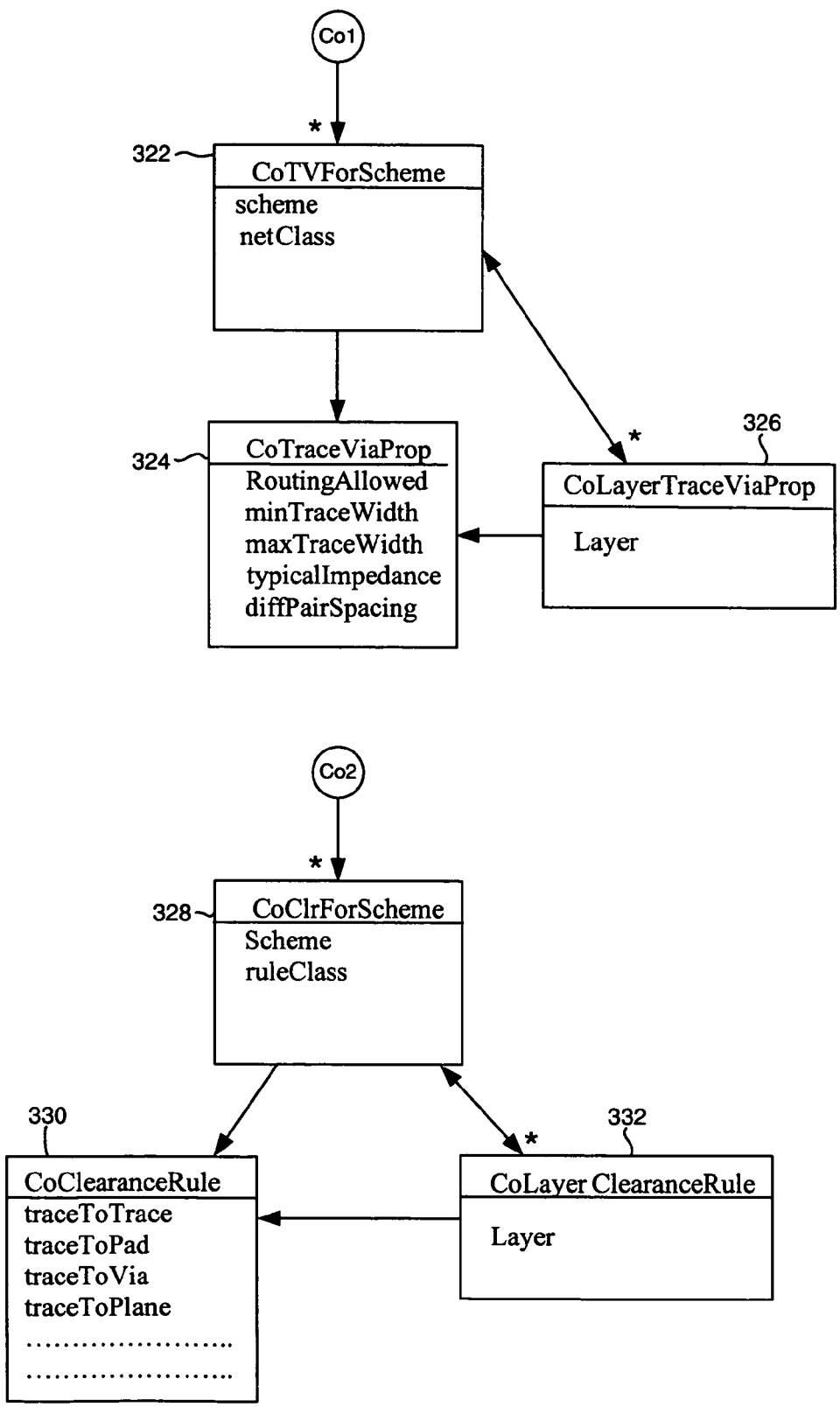
Figure 28C:
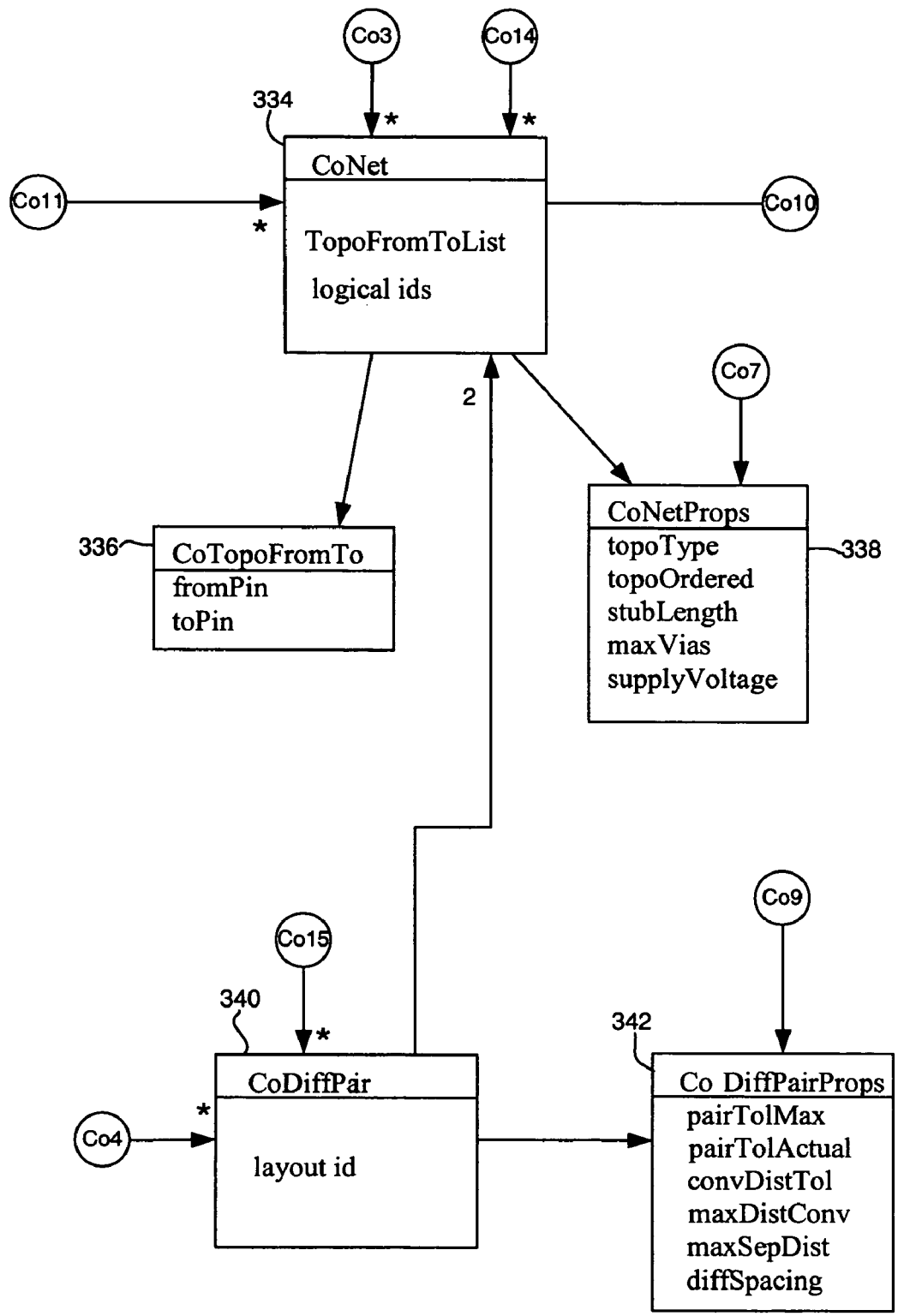
Figure 28D:
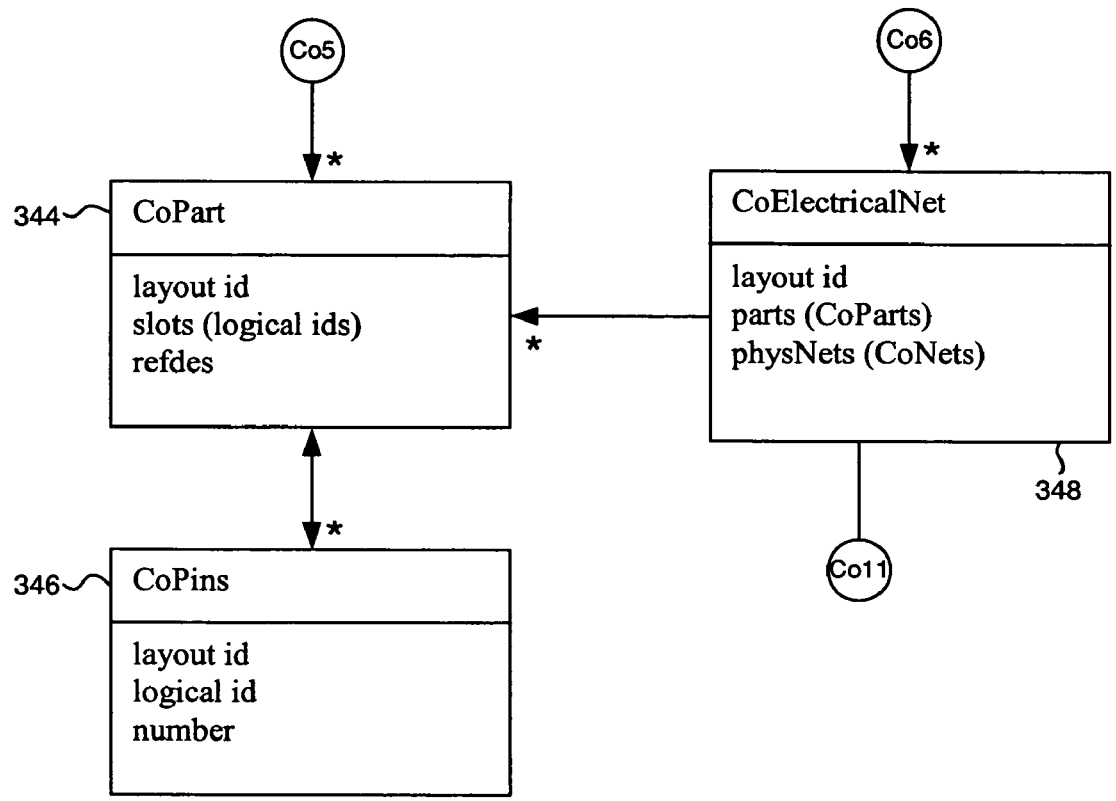
Figure 28D:
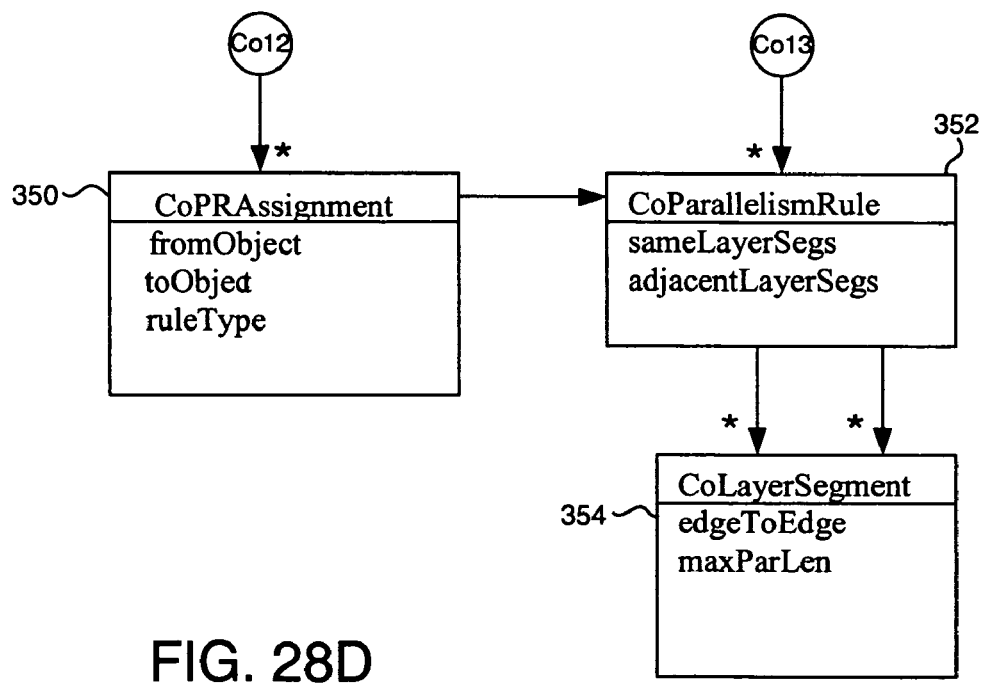

Again returning to block 304, a CoBoard object may be associated with one or more CoPRAssignment objects (connector Co12 to block 350 in FIG. 28D) and one or more CoParallelismRule objects (connector Co13 to block 352 in FIG. 28D). Parallelism rules allow definition of pairings of net properties that specify acceptable distances and parallelism run lengths between specific nets and net classes. For example, rules can be created to define parallelism for net segments that are on the same layer, adjacent layers, or both. When a rule is created, specification is made of a combination of edge-to-edge spacing between segments and the maximum length that segments can run in parallel without violation. Defining parallelism rules can help control the amount of crosstalk by restricting excessive segment parallelism. The two arrows connecting block 352 and 354 indicate that both sameLayerSegs and adjacentLayerSegs information is stored as CoLayerSegment objects. A CoPRAssignment object (block 350) references a CoParallelismRule object, and specifies the net or net class objects for which the referenced CoParallelismRule object rule is to be applied.

Also associated with a CoBoard object (FIG. 28A) may be one or more CoTVForScheme objects (connector Co1 to block 322, FIG. 28B). A CoTVForScheme object references a CoScheme object and a CoNetClass object (shown as "scheme" and "netClass" within block 322 in lieu of connecting arrows to blocks 316 and 306). A CoTVForScheme object also references a CoTraceViaProp object (block 324), which includes fields having information regarding allowable parameters for vias and traces, such as whether routing is allowed through a PCB via ("RoutingAllowed"), minimum and maximum trace widths ("minTraceWidth" and "maxTraceWidth"), impedance for a signal passing through a via or trace ("typicalImpedance") and spacing between differential pairs ("diffPairSpacing"). A CoTVForScheme object may also reference one or more CoLayerTraceViaProp objects (block 326). A CoLayerTraceViaProp object references a CoLayer object (shown as "Layer" in block 326 in lieu of a connecting arrow to block 314) and a CoTraceViaProp object.

Again returning to FIG. 28A, a CoBoard object further references one or more CoClrForScheme objects (connector Co2 to block 328 in FIG. 28B). A CoClrForScheme object references a CoScheme object and a CoClrRuleClass object (shown as "Scheme" and "ruleClass" in block 328 in lieu of connecting arrows to blocks 306 and 312), as well as a CoClearanceRule object (block 330). A CoClearanceRule object contains fields establishing various clearance rules between traces ("traceToTrace"), between traces and pads ("traceToPad"), between traces and vias ("traceToVia"), between traces and planes ("traceToPlane"), etc. A CoClrForScheme object references one or more CoLayerClearanceRule objects (block 332). A CoLayerClearanceRule object references a CoLayer object (shown as "Layer" in block 332 in lieu of a connecting arrow to block 314 in FIG. 28A) and a CoClearanceRule object.

As seen by connector Co3 linking block 304 (FIG. 28A) with block 334 (FIG. 28C), a CoBoard object references one or more CoNet objects. A CoNet object includes a field for listing logical domain nets that form a physical net ("logical ids"). A CoNet object also includes a field "TopoFromToList" holding (as CoTopoFromTo objects) from-to pairs defining how the net should be routed. Although not shown, a CoNet object could also reference one or more pin pair objects. A CoNet object also references a CoNetProps object (block 338). A CoNetProps object contains fields providing various information about a particular net, such as the type of net topology ("topoType"), whether the topology has been ordered if it is a custom topology ("topoOrdered"); the maximum distance between a net junction and a component lead ("stubLength"), the maximum number of vias allowed ("maxVias"), the supply voltage ("supplyVoltage"), etc. A CoNetProps object is referenced by a CoConstraintClass object (connector Co7 to block 320 in FIG. 28A). A CoNet object (block 334 in FIG. 28C) also references a CoEstCrosstalkProps object (connector Co10 to block 318 in FIG. 28A).

As seen by connector Co4 linking block 304 (FIG. 28A) and block 340 (FIG. 28C), a CoBoard object references one or more CoDiffPair objects. A CoDiffPair object represents a pair of physical nets and is typically used for trace routing and/or analysis purposes. A CoDiffPair object thus references two CoNet objects (see arrow to block 334). A CoDiffPair object includes a "layout id" field holding an identifier used by back end applications to reference the object. A CoDiffPair object references a CoDiffPairProps object (block 342). A CoDiffPairProps object includes "pairTolMax" and "pairTolActual" fields for pair tolerance, i.e., the length of delay tolerance for the pair. For example, if a set of differential pairs needs to be routed to a matched length or time of flight delay, this rule can be used to define a very tight pair tolerance, but also define a more loose matched group tolerance. A "convDistTol" field holds a convergence distance tolerance (i.e., a maximum allowed difference in trace length distance from a pad to the point where the traces start routing differentially at the Differential Spacing). A "maxDistConv" field holds a maximum distance to convergence (i.e., the maximum allowed trace distance from a pad to the point where the traces start routing differentially at Differential Spacing). A "max- SepDist" field holds the maximum separation distance (i.e., maximum allowed distance that differential traces are allowed to be routed at a spacing greater or less than Differential Spacing). A diffspacing field holds the Differential Spacing (i.e., the spacing at which differential pair traces must be routed). In some embodiments, differential spacing is defined by layer, and may be a read-only field.

Finally, a CoBoard object (FIG. 28A) also references one or more CoPart objects (connector Co5 to block 344 in FIG. 28D) and one or more CoElectricalNet objects (connector Co6 to block 348 in FIG. 28D). A CoPart object has a fields for layout id (holding an identifier used by back end applications), slots (holding identifiers for components in the logical domain, similar to the "slots" field of the Part object in the LLOM of FIG. 15) and reference designator ("refdes"). A CoPart object references one or more CoPins objects (block 346). The CoPins object includes fields for layout id, logical id (holding an identifier for a PortInstance in the DDOM) and number (containing a pin number assigned by a manufacturer of a component corresponding to the CoPart object with which the CoPin Object is associated). A CoElectricalNet object (block 348) references one or more CoPart objects and one or more CoNet objects (connector Co11 to block 334 in FIG. 28C).

Objects of the CoDOM may be substituted for corresponding LLOM and/or CDOM objects in various operations described herein (e.g., operations described in connection with FIGS. 14A, 14B and 18A-20B).

Scripting

In at least some embodiments of the invention, some or all of the DDOM, LLOM, CDOM and CoDOM objects are exposed to scripting. As is known in the art, a script is a collection of commands in a scripting language (e.g., the VBScript, Jscript and JavaScript languages). When executed by a browser, a script can be used to configure a plug-in, to open a connection with DOS 58, to create/delete/modify a DDOM, LLOM, CDOM or CoDOM object, and numerous other functions. One or more scripts can be associated with an object, either automatically or by user action. In at least some embodiments, scripts are used to create parameterized objects, i.e., objects which can be specially configured in response to certain parameter values a user provides during script execution.

Figure 22:
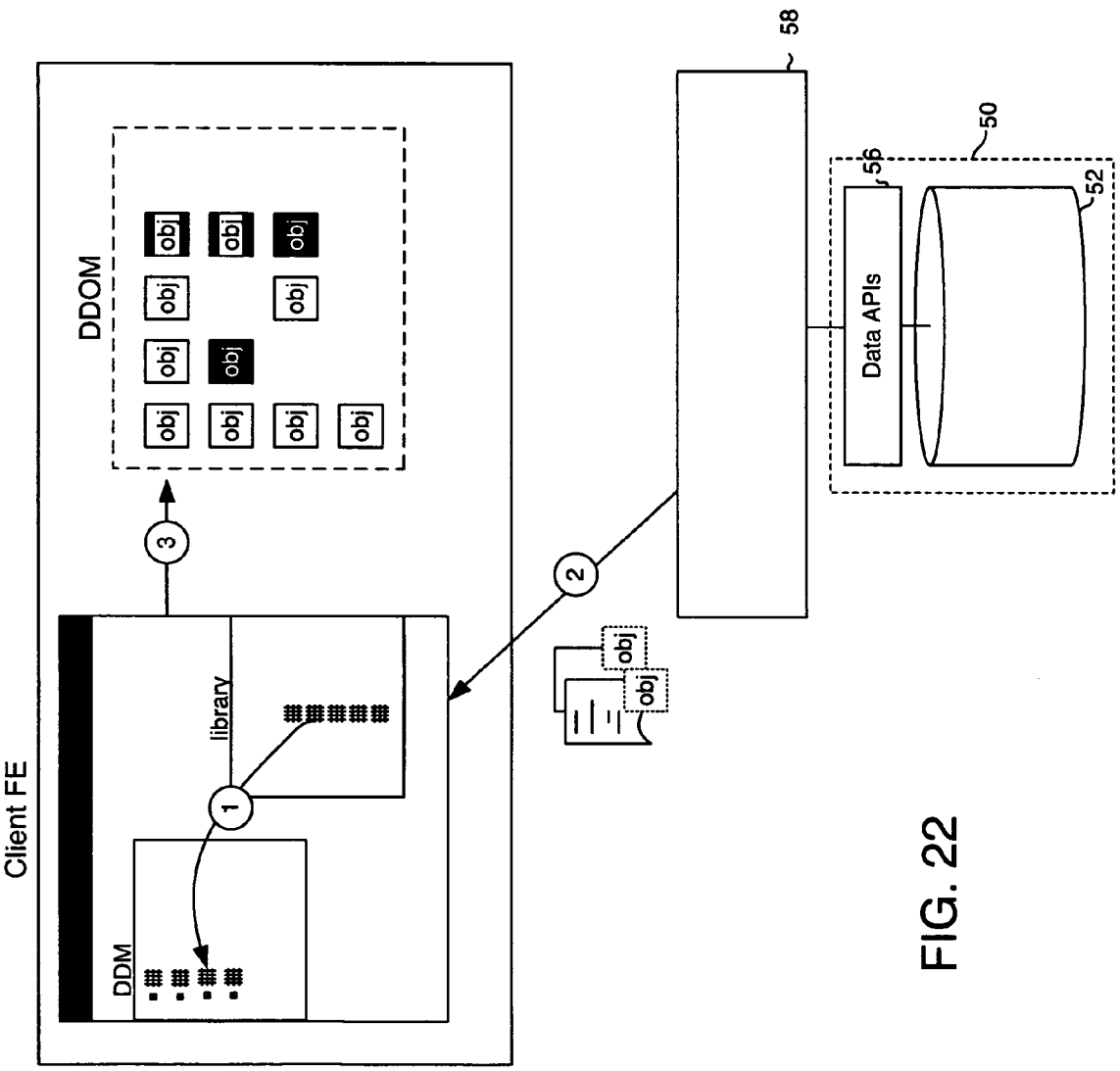
FIG. 22 is a block diagram describing parameterized objects according to at least some embodiments of the invention.

Scripted objects are shown generally in the block diagram of FIG. 22. In step 1 a user at client FE selects one or more parameterized objects from a library and places the object(s) in a projects tree of a DDM. The selection is noted by DOS 58, which responds at step 2 by transmitting one or more "blank" objects and one or more scripts. The blank objects could be partially configured, with remaining configuration to be performed during script execution. At step 3, the browser runs the script. The script may automatically configure the new object based on information from the projects tree. In some cases, a script may generate a dialog or other user interface which obtains necessary information from the user. As a result of executing the script(s), one or more new objects are created (black object boxes in FIG. 22), modified (partially blackened object boxes) and/or deleted in the local copy of the DDOM at the client. Related LLOM (or CODOM) changes may also be made (not shown). Addition of new objects, and modification and deletion of existing objects, are monitored by a transaction manager plug-in at the client (not shown) and by DOS 58, as previously described in connection with FIG. 10B. The user may then "Commit" the data changes (i.e., instruct DOS 58 to update to database 50 the new and/or modified and/or deleted objects resulting from script execution), discard the changes, save the changes, or continue making more changes.

Figure 23A:
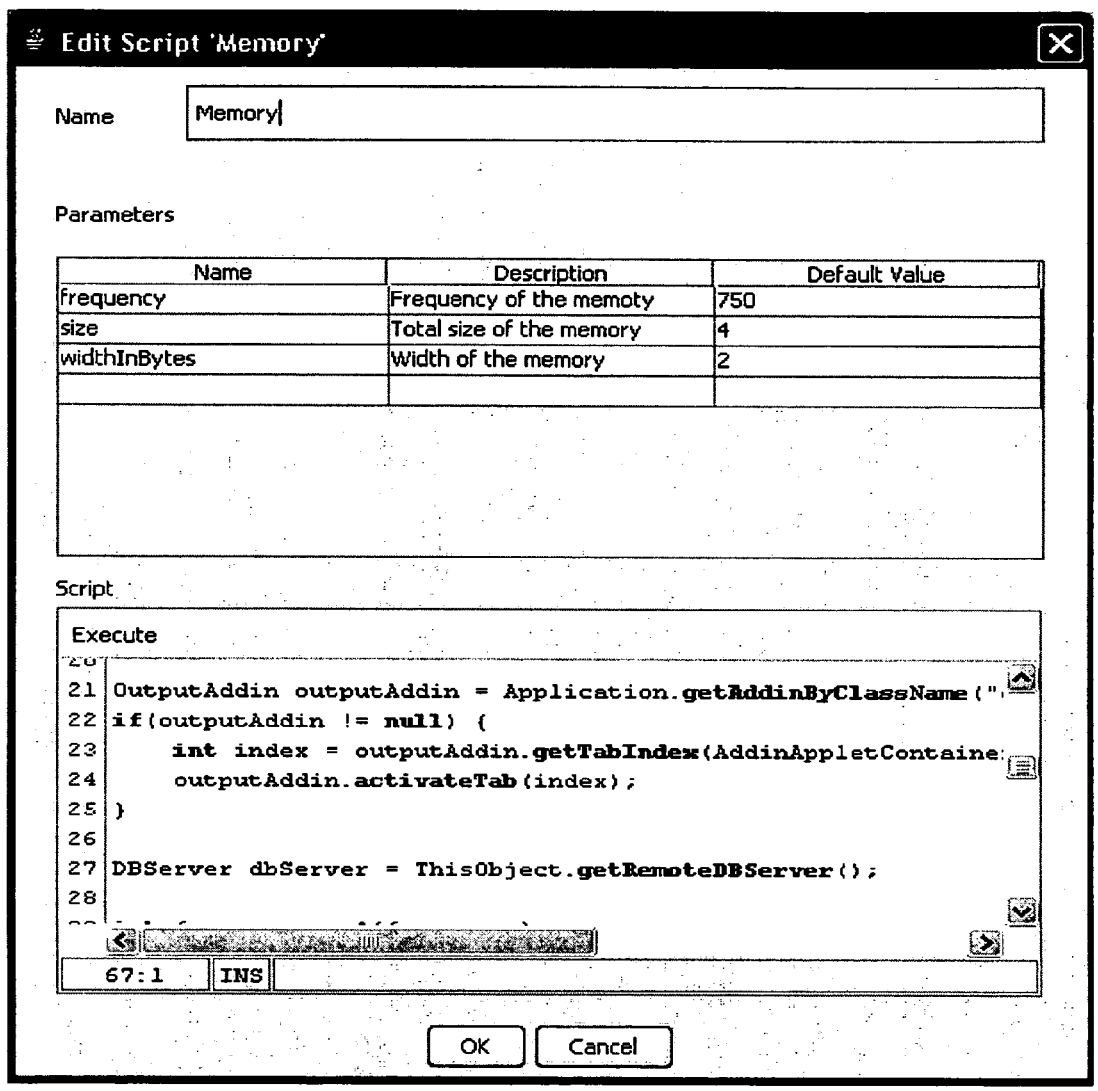
FIGS. 23A and 23B are examples of user interfaces in connection with a scripted object according to at least some embodiments of the invention.
Figure 23B:
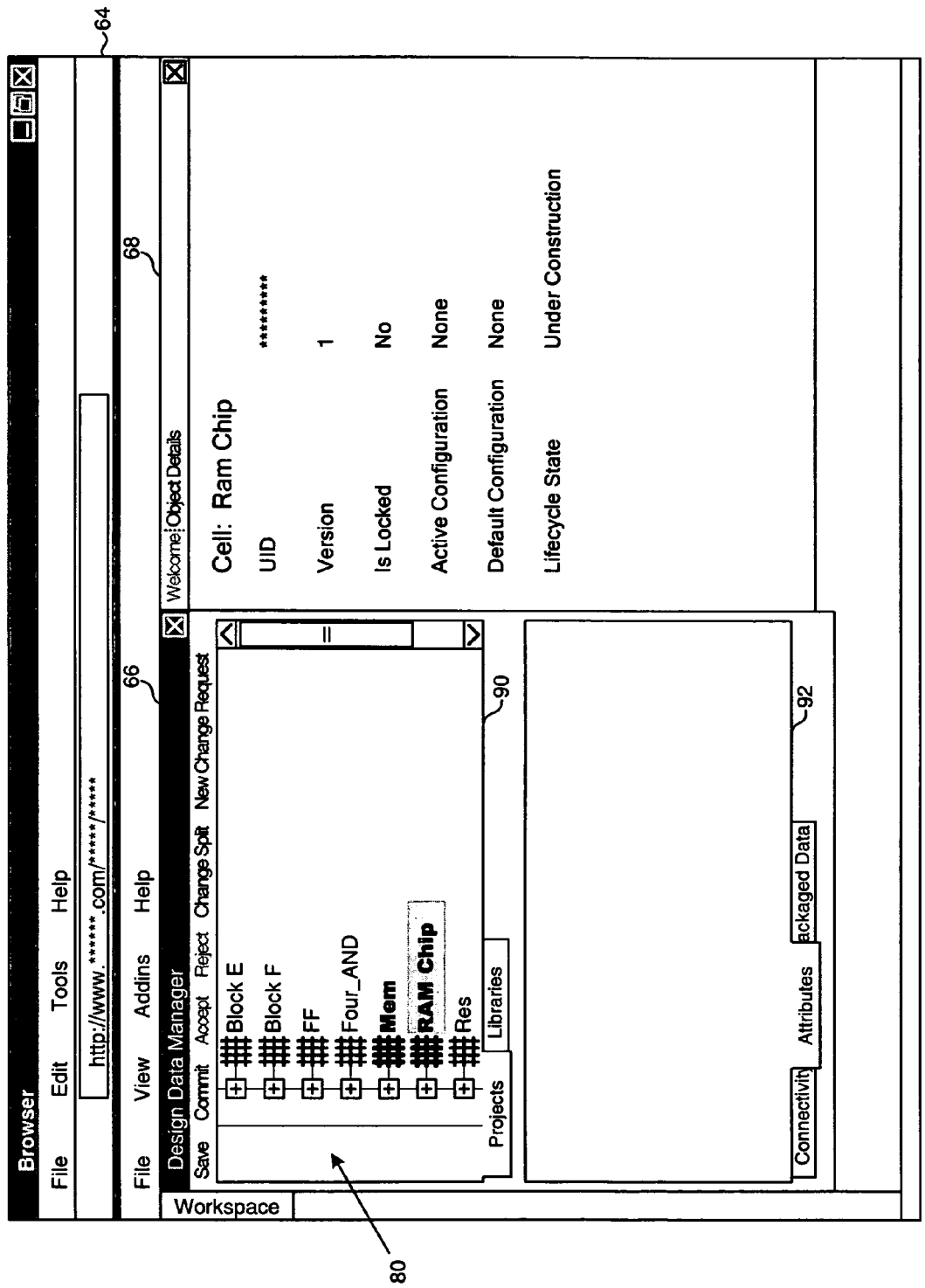

FIGS. 23A and 23B are examples of user interfaces in connection with a parameterized object used to create a memory block in a design. The user initially selects a parameterized Memory Cell object from a library and places an icon for that object in a projects tree (not shown). The user then invokes a script for the Memory Cell object, and a dialog user interface is presented (FIG. 23A). The user inputs values for frequency of the memory, the size of the memory, and the width of the memory, and then selects "OK." Based on the input values, and as shown in FIG. 23B, a first Cell object ("RAM Chip") corresponding to a memory chip is generated and placed in the projects tree. A second Cell object (Mem) is also generated. The Mem Cell object contains a representation in which the RAM Chip object is instantiated as many times as is needed to create the desired memory. The script also generates the necessary PortInstance, Net and Connection objects.

Distributed Design Environment

Figure 24:
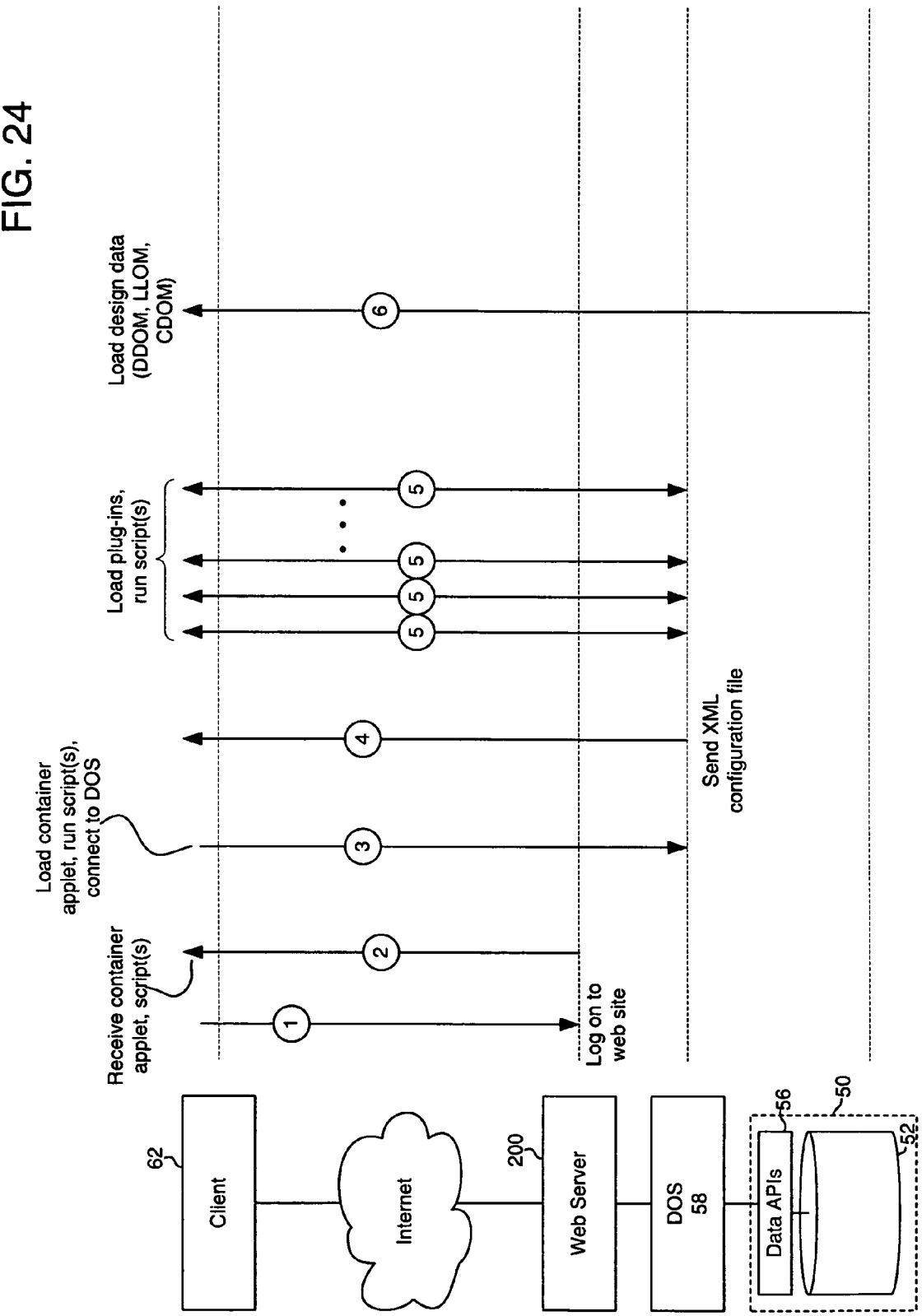
FIG. 24 is a block diagram showing loading of a design environment by a client computer according to at least some embodiments of the invention.

FIG. 24 is a diagram showing loading by a client computer of a design environment according to at least some embodiments of the invention. At the far left in FIG. 24 is a block representing a client computer 62. Directly underneath computer 62 is a cloud for the Internet, with which computer 62 is in communication. Below the Internet cloud is a block representing a web server 48 (which is also in communication with the Internet). Web server 48 is in communication with DOS 58. DOS 58 is in communication with a design database 50. Beginning at step 1, a user at client 62 logs onto a web site by opening a communication with web server 48. After successfully logging onto the web site, web server 48 sends client 62 a container applet and one or more scripts (step 2). At step 3, client 62 loads the container applet and executes one or more of the received scripts. As a result of executing the script(s), the container applet makes a connection to DOS 58 (via web server 48).

After the connection is made by client 62, DOS 58 downloads to client 62 an XML (extensible markup language) configuration file (step 4). This configuration file specifies additional plug-ins to be loaded within the container applet (e.g., a design data manager, a transaction manager, etc.). The plug-ins to be downloaded are controlled based on user roles and permissions, which are discussed below. For example, user A may be authorized to access one collection of plug-ins and user B may be authorized to access different plug-ins. When scripts in the configuration file execute, the identity of the client 62 user is determined (based on, e.g., the login i.d. used to connect to DOS 58), and based on that identity, user role determined. Once the user role is determined, plug-ins for that role and scripts for configuring those plug-ins are downloaded. In other embodiments, instead of a single configuration file for all users, each user may have a separate XML configuration file which is sent to a client based on the user i.d. of the client user connecting to DOS 58. A configuration file may also contain information regarding one or more "workspaces" which have been specified for a user. Because the amount of space available within a container applet window is limited, certain plug-in windows are automatically set to certain sizes, some plug-in panes may be minimized, etc.

In step 5, the client downloads one or more plug-ins (as specified by the configuration file from step 4) and scripts related to those plug-ins. As each plug-in is loaded, an event (on load) is generated, in response to which one or more scripts may be executed. These scripts configure the plug-in for the user. For example, the commands, menus and other features available to the user may be limited based on the user's role. After all plug-ins are loaded and configured, the user may then download from database 50 data for one or more projects (e.g., DDOM, LLOM and/or CDOM objects) (step 6). In some embodiments, CoDOM objects are downloaded instead of LLOM and CDOM objects. The projects for which a user may retrieve project data is similarly controlled based on user role. Once project data has been loaded, the user may begin editing.

Figure 25:
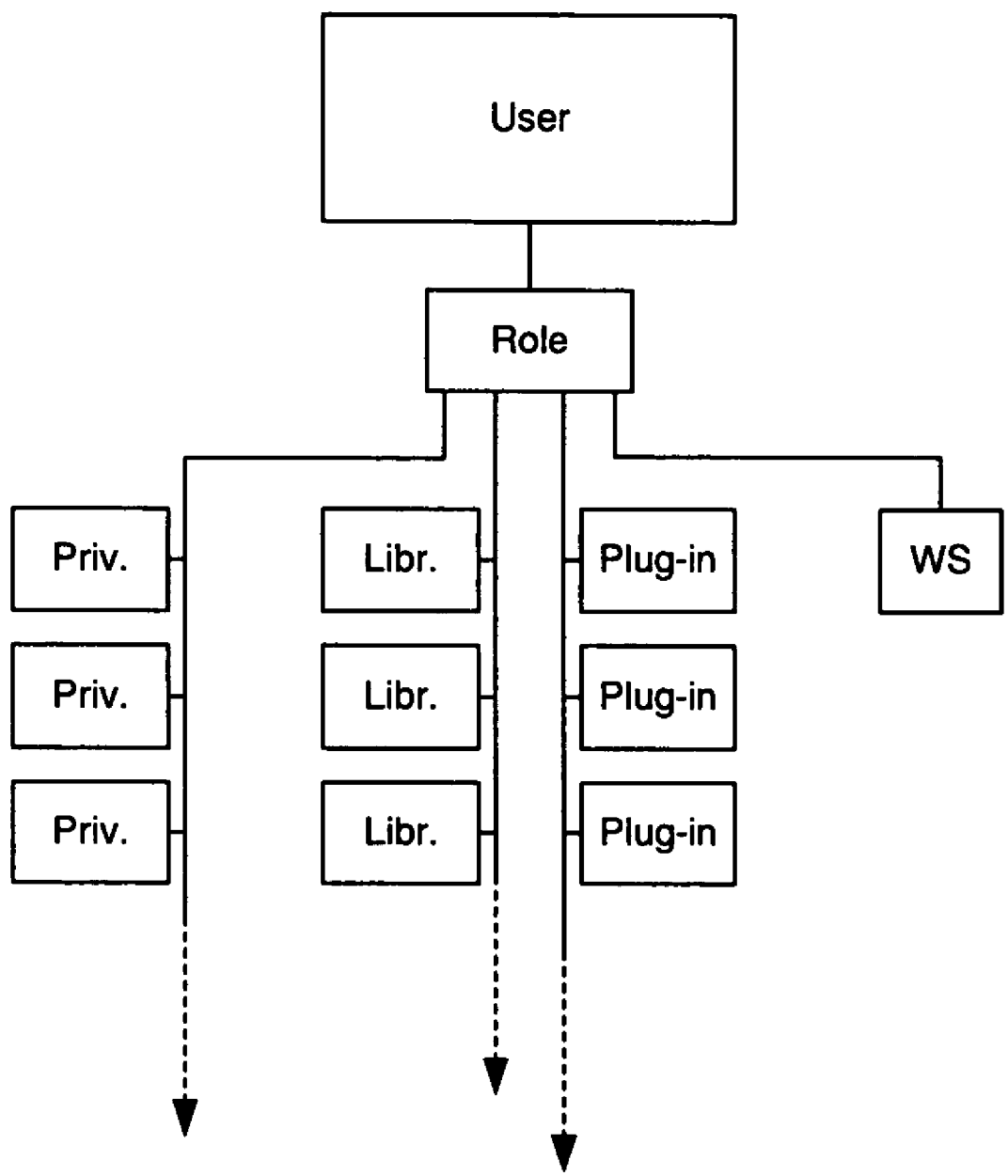
FIG. 25 is a block diagram showing user roles according to at least some embodiments of the invention.

FIG. 25 is a block diagram illustrating user roles according to at least some embodiments of the invention. As shown in FIG. 25, each user has an associated role. Associated with a role are one or more privileges, one or more preferred libraries, one or more plug-ins, and a workspace. User roles may include such things as design engineer, manufacturing engineer, purchasing agent, layout engineer, service technician, and system administrator. These are only examples, and numerous variations are possible. For example a "design engineer 1" role could correspond to a group of engineers working on RF communication circuitry, a "design engineer 2" role could correspond to persons working on computer design, and an "outside design engineer" role could correspond to outside contractors working on some aspect of a project. In at least some embodiments, a single user can have more than one role.

Associated with a user role is one or more privileges. Each privilege defines some action (or group of actions) a user may take. Examples include editing data for a specific project, editing certain types of data in a specific project, viewing data in a specific project, creating a project, deleting a project, approving a change request, assigning a role to a user, creating a role, editing a role, creating a library, adding or deleting a component or Cell from a library, etc.

One or more preferred libraries are also associated with each role. In some cases, a preferred library will include electrical components that are appropriate for design tasks of a given user role. For example, a design engineer 2 role (computer designer) may be associated with preferred libraries that include such things as memory chips, processors, etc. A preferred library may also include previously created functional blocks (i.e., previously-created Cell objects) that are typically used in particular field. In some embodiments, a user can access libraries in addition to those associated with his or her role(s). In other embodiments, a user may only access preferred libraries associated with his or her role(s).

One or more plug-ins are also associated with a role. A user may only download from DOS 58 the plug-ins associated with that user's role(s). Plug-ins for a design engineer role could include a design data manager, transaction manager, output window, viewer, schematic editor, HDL editor, and parts viewer. Plug-ins for a manufacturing engineer could include a DDM, transaction manager, a schematic viewer, and one or more plug-ins to program manufacturing equipment. A purchasing agent role may have a DDM plug-in, a parts viewer and a schematic viewer.

Figure 26:
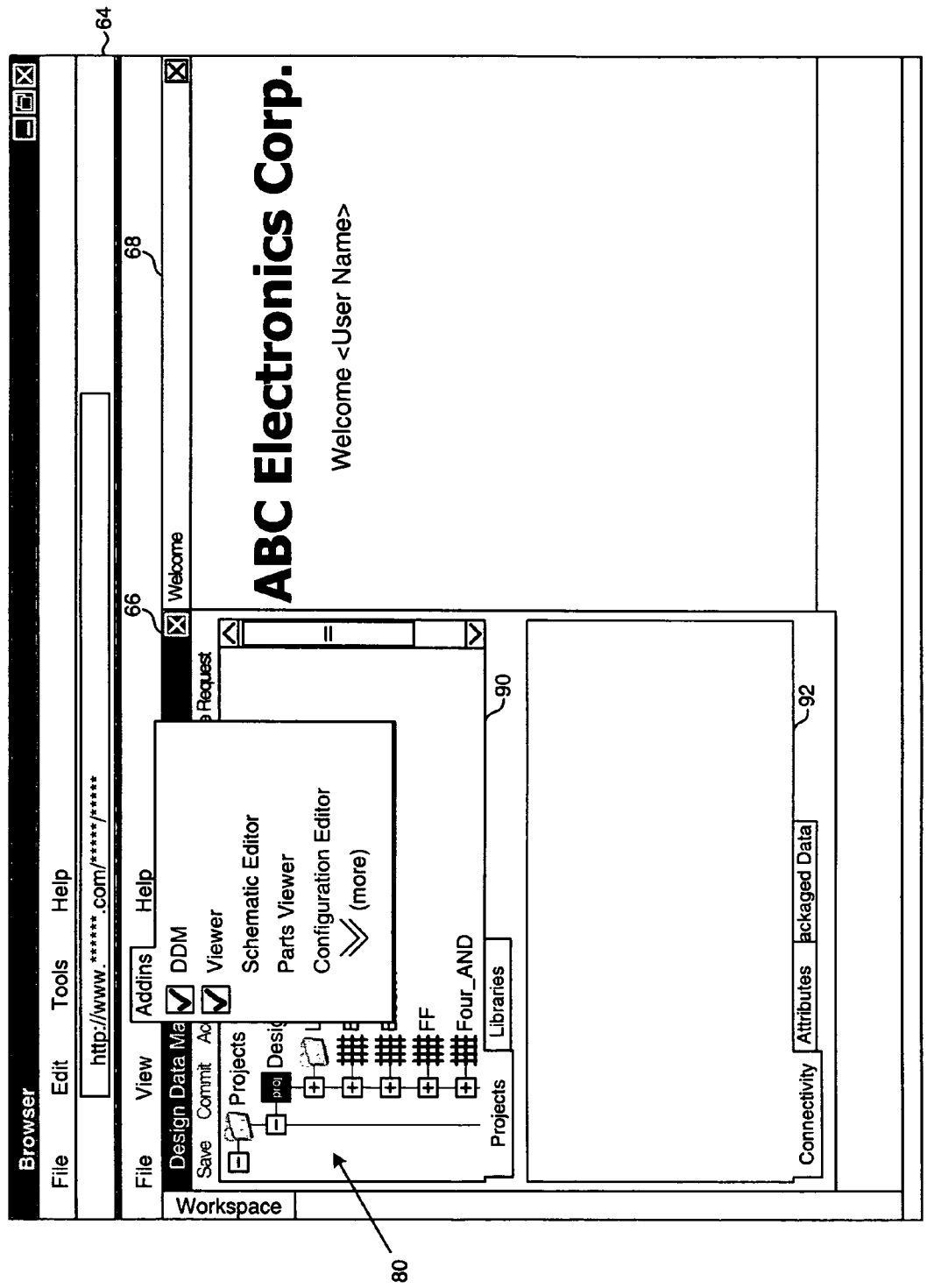
FIG. 26 is a block diagram showing a user interface for opening or closing plug-ins according to at least some embodiments of the invention.

The workspace associated with a role defines which of the plug-ins for that role are initially loaded when a user having that role connects a client computer to DOS 58 (see, e.g., FIGS. 7 and 24). The workspace further defines how windows for those initially-loaded plug-ins will be sized and arranged on a client display. If the user wishes to close an opened plug-in or open a new plug-in, the user can uncheck (to close) or check (to open) the appropriate plug-in in a pull-down menu, as shown in FIG. 26. Listed in the "add-in" pull-down menu are all plug-ins associated with a user's role(s). The user may also resize and/or rearrange plug-in windows.

Figure 27:
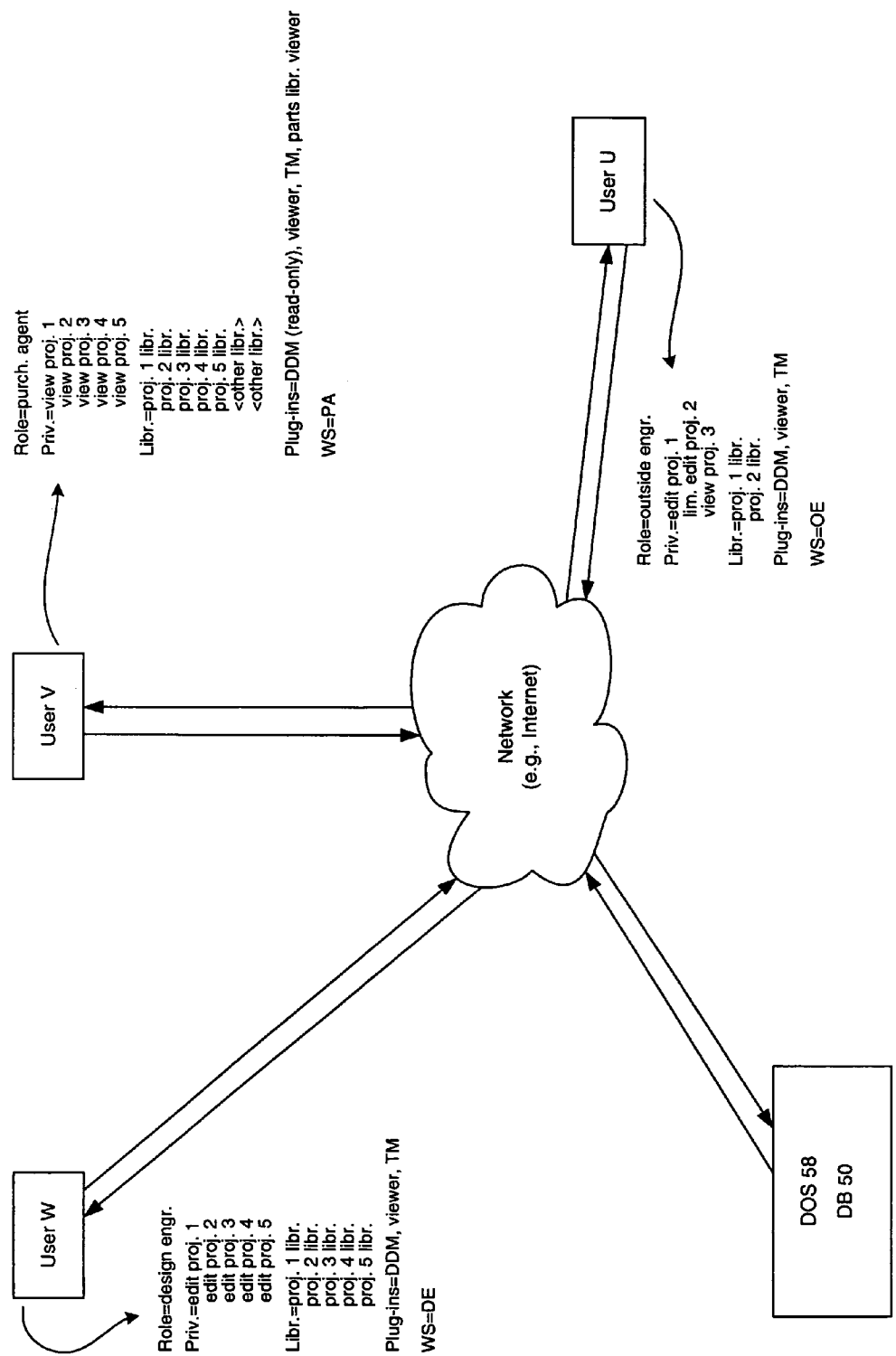
FIG. 27 is a block diagram showing distribution, according to at least some embodiments of the invention, of design data and software tools for editing design data.

FIG. 27 is a block diagram showing, according to at least some embodiments, accessing of design data by multiple users having various roles. DOS 58 and design database 50 are represented collectively as a single block. Users W and V work for an electronics manufacturer that operates DOS 58 and database 50. User U is an outside contractor the manufacturer has hired to assist with a specific design task. User W has a design engineer role. User W is able to edit data for projects 1 through 5 (e.g., data objects associated with of otherwise linked to specified Project objects), and accesses libraries (Library objects and associated Cell objects) applicable to each of those projects. User W's plug-ins include a DDM, a viewer, and a transaction manager, each of which is initially sized and arranged as defined by workspace DE. User V has a purchasing agent role. User V is able to view design data for projects 1 through 5 and access libraries applicable to those designs, as well to access other libraries. User V's plug-ins include a read-only DDM, a schematic viewer, and a parts library viewer, each of which is sized and arranged as defined by workspace PA. User U has an outside engineer role. User U's privileges include editing project 1, limited editing of project 2 (e.g., only editing specified Cell objects), and read-only access of project 3. User U may access libraries applicable to projects 1 and 2, and has DDM, viewer and transaction manager plug-ins (initially sized and arranged as defined by workspace OE).

In at least some embodiments of the invention, a design environment loaded upon a client is in a language specific to a given user. For example, Users W and V may speak English, but User U may speak Japanese. Accordingly, when User U connects a client computer to DOS 58/database 50, the plug-ins and design data are displayed in Japanese. Transactions, system messages, etc. are also in Japanese. In at least some embodiments implemented using the JAVA programming language, support for different languages is implemented using JAVA internationalization. JAVA internationalization is known in the art (see, e.g., <http://java.sun.com/docs/books/tutorial/i18n/intro/index.html>), and thus not described in detail herein. In brief, each supported language has a resource bundle in which strings to be displayed at a client are localized in that supported language. A default language preference is stored as part of a user profile, and can be changed by the user.

Certain embodiments of the invention also implement technology filtering. In particular, a specific technology type may be associated with a particular project. Technology types can include PCB technology, embedded component technology, certain soldering or other manufacturing methods, RF communication technology, digital logic, etc. This list is not exhaustive, and there may be overlaps between technology types. Available libraries for use with a particular project are then filtered by the user's role and by the technology(ies) associated with the project. For example, a user role may allow that user to access all libraries, but the user will only be presented with libraries applicable to a particular project on which he or she is working.

CONCLUSION

Although several examples of carrying out the invention have been described, those skilled in the art will appreciate that there are numerous variations and permutations of the above described examples that fall within the spirit and scope of the invention as set forth in the appended claims. The algorithms, system configurations, user interfaces, object models and other aspects described are merely examples. Modifications of the described algorithms, systems, interfaces, object models and other aspects are within the scope of the invention, as are numerous other algorithms, configurations, interfaces, object models and aspects.

The invention claimed is:

1. A method for editing a printed circuit board (PCB) design, comprising:
storing logical design data for a PCB in a database;
receiving a request from a first of plural users to begin generating a description of an edit pertaining to one or more elements of the logical design data;
prohibiting the first user form proceeding with generating the description of the edit;
notifying the first user that a request for approval is required in order to modify the logical design data;
after said notifying, receiving initiation of an approval request;
in response to initiation of the approval request, permitting the first user to proceed with generating a description of the edit;
sending a message to others of the plural users corresponding to the initiated approval request and indentifying the described edit, wherein
the message is created as the first user generates a description of the edit, and
the message notifies the others of the plural users of an ability to approve the described edit; and
upon receiving approvals from at least two of the plural users receiving the message, automatically updating the database to include the described edit.

2. The method of claim 1, further comprising:
receiving an indication of a voting threshold, said voting threshold representing a minimum number of the plural users required to approved the described edit, and wherein said step of automatically updating comprises automatically updating the database upon receiving approvals from the minimum number of the plural users.

3. The method of claim 2, wherein the step of receiving the indication of a voting threshold comprises receiving that indication from the first of the plural users.

4. The method of claim 1, wherein the message comprises an email sent to each of the plural users.

5. The method of claim 4, wherein the email includes a hyperlink to a source of information concerning the described edit.

6. The method of claim 5, wherein the source of information includes information concerning multiple requested edits in addition to the described edit.

* * * * *

UNITED STATES PATENT AND TRADEMARK OFFICE
CERTIFICATE OF CORRECTION

PATENT NO. : 7,546,571 B2
APPLICATION NO. : 10/935749
DATED : June 9, 2009
INVENTOR(S) : Richard Mankin et al.

It is certified that error appears in the above-identified patent and that said Letters Patent is hereby corrected as shown below:

In Column 41, Claim 1, Line 11:
    Please delete "form" and insert --from--

In Column 42, Claim 2, Line 9:
    Please delete "approved" and insert --approve--

Signed and Sealed this

First Day of December, 2009

David J. Kappos
*Director of the United States Patent and Trademark Office*